(12) United States Patent (10) Patent No.: US 7,957,361 B2
Hanada et al. (45) Date of Patent: *Jun. 7, 2011

(54) TRANSMITTER, TRANSMITTING METHOD, RECEIVER, AND RECEIVING METHOD FOR MC-CDMA COMMUNICATION SYSTEM

(75) Inventors: Yukiko Hanada, Kanagawa-ken (JP); Kenichi Higuchi, Kanagawa-ken (JP); Mamoru Sawahashi, Kanagawa-ken (JP)

(73) Assignee: NTT DoCoMo, Inc., Tokyo (JP)

( * ) Notice: Subject to any disclaimer, the term of this patent is extended or adjusted under 35 U.S.C. 154(b) by 551 days.

This patent is subject to a terminal disclaimer.

(21) Appl. No.: 11/454,983

(22) Filed: Jun. 19, 2006

(65) Prior Publication Data

US 2006/0239233 A1 Oct. 26, 2006

Related U.S. Application Data

(62) Division of application No. 09/985,674, filed on Nov. 5, 2001, now Pat. No. 7,130,293.

(30) Foreign Application Priority Data

Nov. 6, 2000 (JP) ................................. 2000-337992
Aug. 28, 2001 (JP) ................................. 2001-258451

(51) Int. Cl.
*H04B 7/216* (2006.01)

(52) U.S. Cl. ........ 370/342; 370/335; 370/350; 370/328; 370/441; 370/503; 455/422.1; 455/464; 375/140; 375/145; 375/146; 375/147; 375/149

(58) Field of Classification Search .................. 370/342, 370/350, 335, 328, 441, 503; 375/140, 145–147, 375/149; 455/422.1, 464
See application file for complete search history.

(56) References Cited

U.S. PATENT DOCUMENTS 5,696,762 A * 12/1997 Natali et al. .................. 370/320
(Continued)

FOREIGN PATENT DOCUMENTS

EP 0 795 971 A2 9/1997
(Continued)

OTHER PUBLICATIONS

K. Higuchi, et al., "Fast Cell Search Algorithm in DS-CDMA Mobile Radio Using Long Spreading Codes", Vehicular Technology Conference, IEEE, XP-010229096, vol. 3, May 4, 1997, pp. 1430-1434.

(Continued)

*Primary Examiner* — Nghi H Ly
*Assistant Examiner* — Amancio Gonzalez
(74) *Attorney, Agent, or Firm* — Oblon, Spivak, McClelland, Maier & Neustadt, L.L.P.

(57) ABSTRACT

A reception step receives a multicarrier signal containing subcarriers, at least one of which a synchronization signal is transmitted therein, multiplied only by a synchronization signal spreading code, a correlation detection step detects correlation values between the received multicarrier signal and replicas of the synchronization signal, and a timing detection step detects a FFT timing and a long code received timing according to the correlation values.

5 Claims, 35 Drawing Sheets

U.S. PATENT DOCUMENTS

| | | | |
|---|---|---|---|
| 5,757,766 A | | 5/1998 | Sugita |
| 5,832,029 A | | 11/1998 | Mimura |
| 5,886,999 A | | 3/1999 | Kojima et al. |
| 5,933,424 A | * | 8/1999 | Muto .......................... 370/342 |
| 6,167,037 A | * | 12/2000 | Higuchi et al. ............... 370/335 |
| 6,246,675 B1 | | 6/2001 | Beasley et al. |
| 6,370,134 B1 | | 4/2002 | Aramaki |
| 6,445,713 B1 | * | 9/2002 | Nowara ....................... 370/441 |
| 6,646,980 B1 | | 11/2003 | Yamamoto et al. |
| 6,647,025 B1 | | 11/2003 | Sudo |
| 6,907,026 B2 | | 6/2005 | Akiyama |
| 6,980,539 B2 | * | 12/2005 | Hanada et al. ................ 370/342 |
| 7,130,293 B2 | * | 10/2006 | Hanada et al. ................ 370/342 |
| 2002/0136176 A1 | | 9/2002 | Abeta et al. |
| 2002/0181489 A1 | | 12/2002 | Kitagawa et al. |
| 2004/0141481 A1 | | 7/2004 | Lee et al. |
| 2004/0199554 A1 | | 10/2004 | Aslanis et al. |
| 2005/0180311 A1 | | 8/2005 | Wang et al. |

FOREIGN PATENT DOCUMENTS

| | | |
|---|---|---|
| EP | 0 944 178 | 9/1999 |
| JP | 11-340874 | 12/1999 |
| JP | 2000-22588 | 1/2000 |

OTHER PUBLICATIONS

Dong-Seog Han, et al., "On the Synchronization of MC-CDMA System for Indoor Wireless Communications", Vehicular Technology Conference, IEEE, XP-010353144, vol. 2, Sep. 19, 1999, pp. 693-697.

Sangjin Hong, et al., "An Efficient Timing Synchronization Technique for FFT Based Multi-Carrier Direct Sequence Spread Spectrum Transceiver", Military Communications Conference, XP10307937, vol. 3, Oct. 18-21, 1998, pp. 713-717.

Seunghyeon NAHM, et al., "A Synchronization Scheme for Multi-Carrier CDMA Systems", Communications IEEE, XP010284579, vol. 3, Jun. 7, 1998, pp. 1330-1334.

* cited by examiner

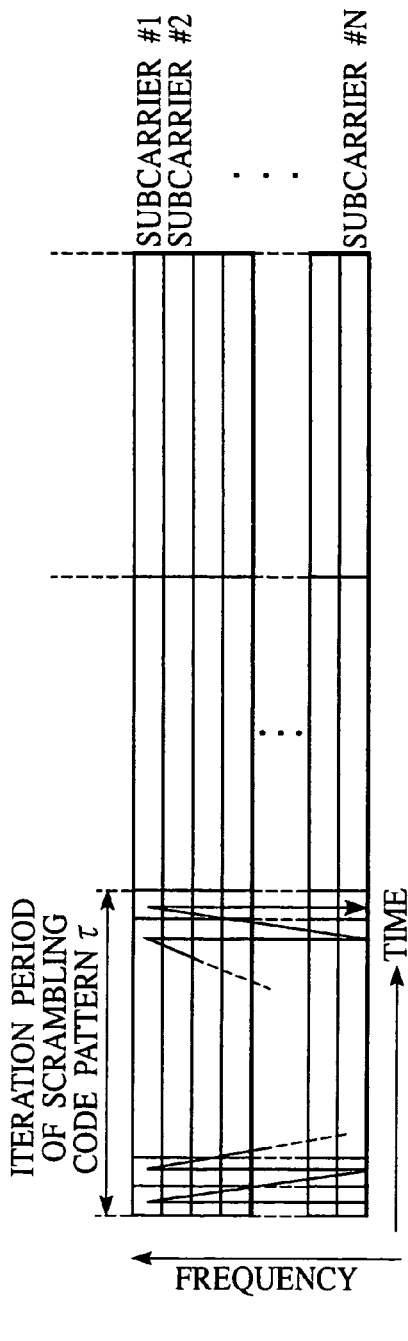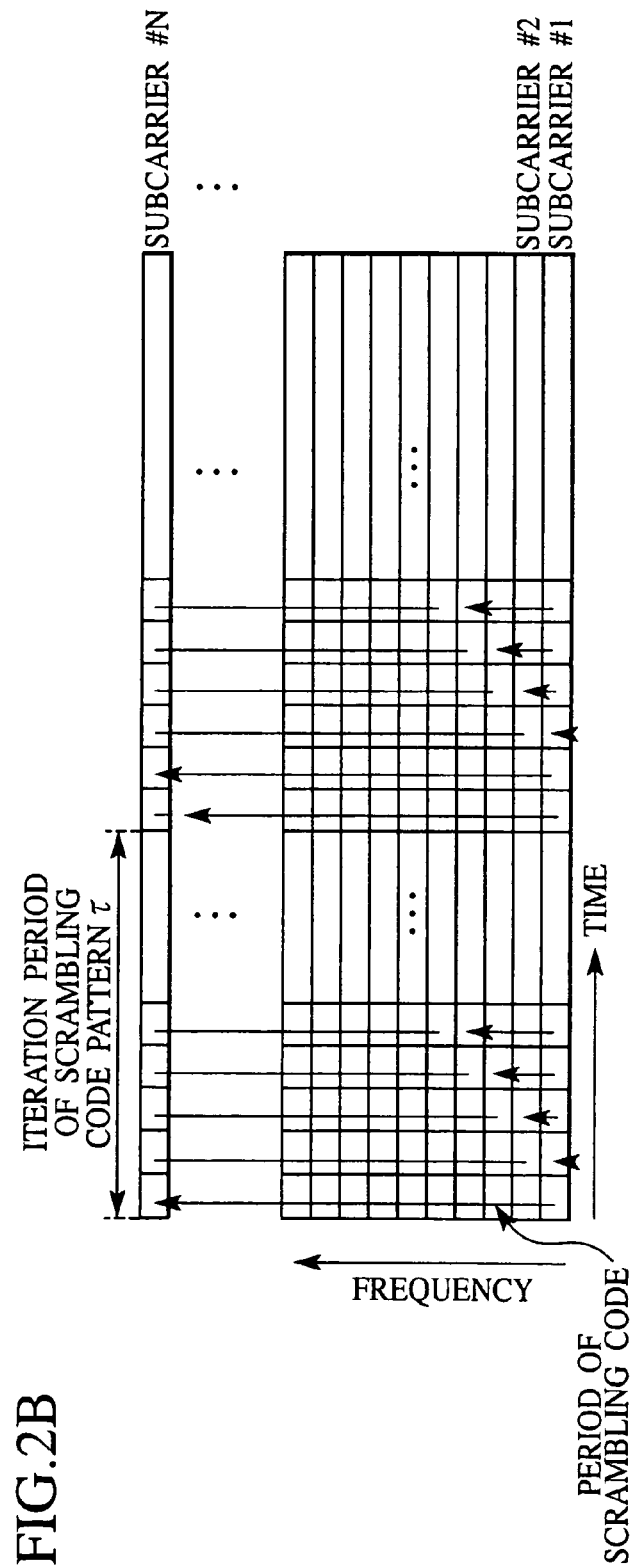
FIG.2A
FIG.2B

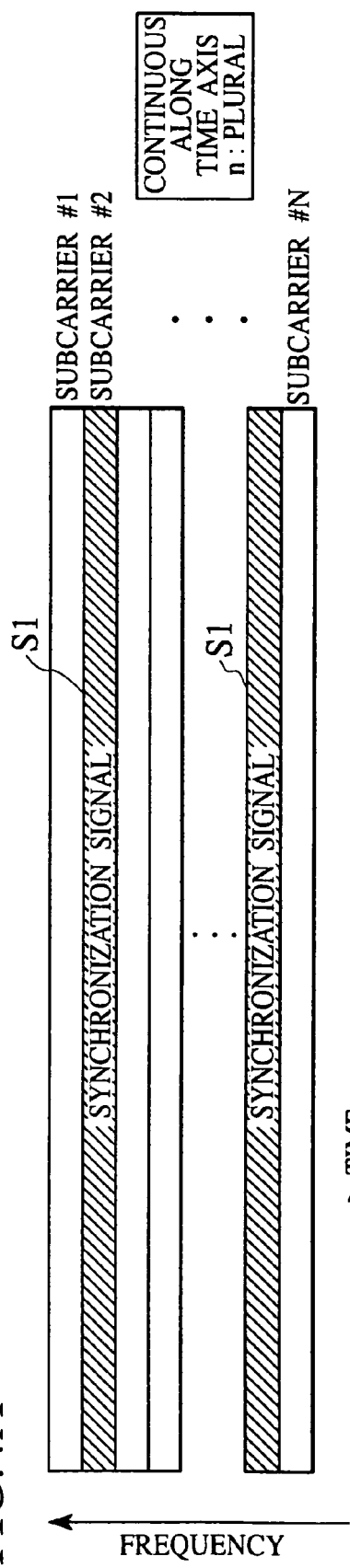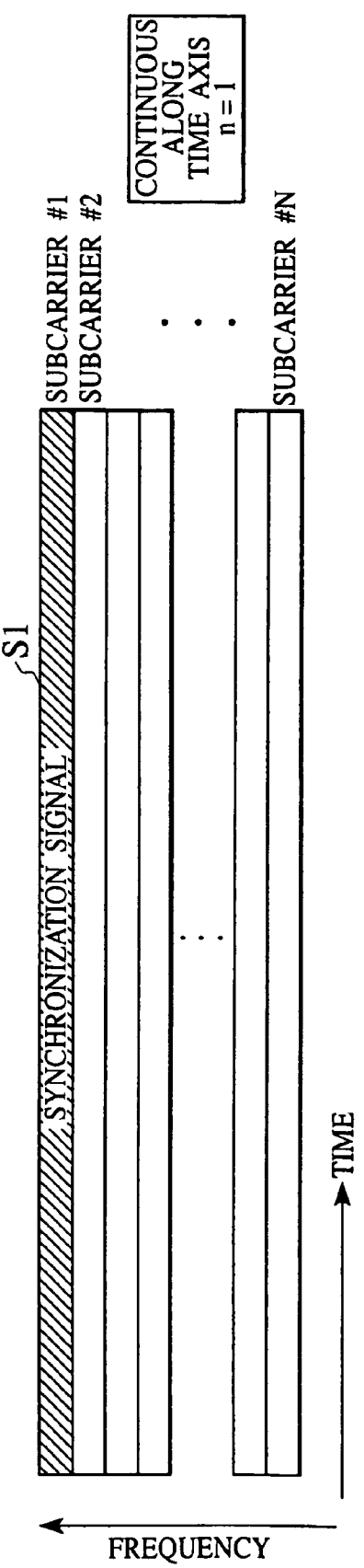

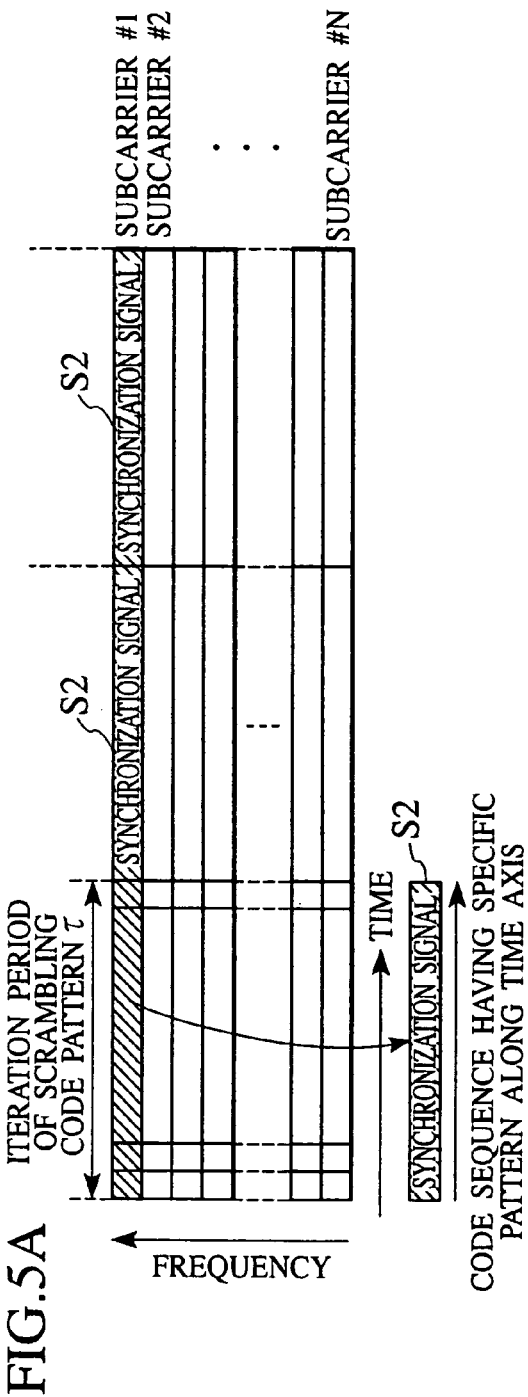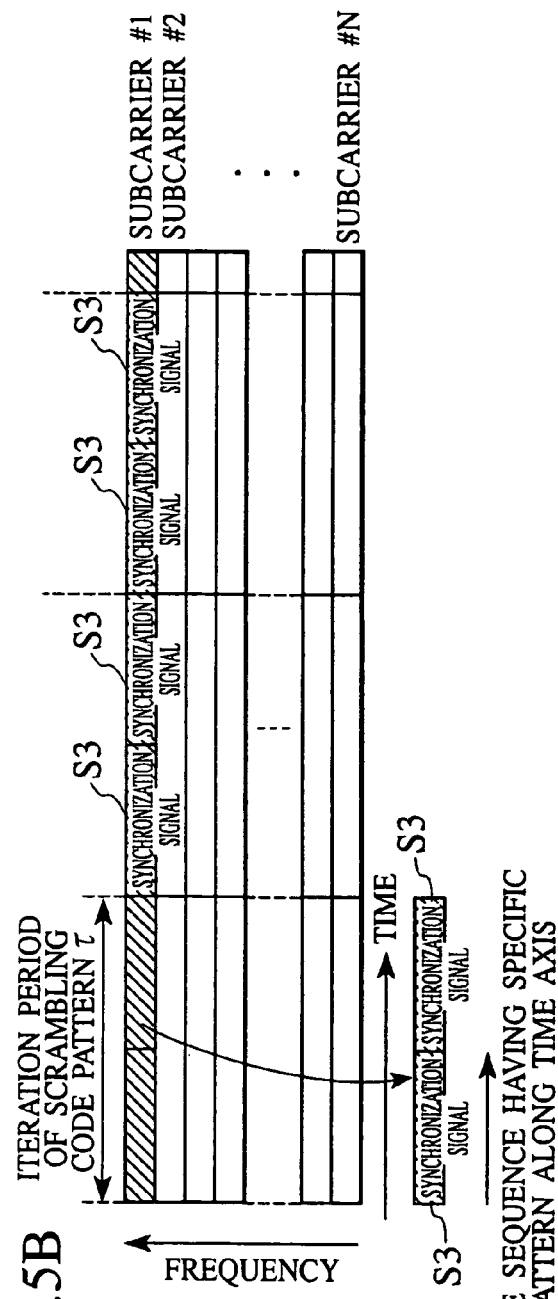

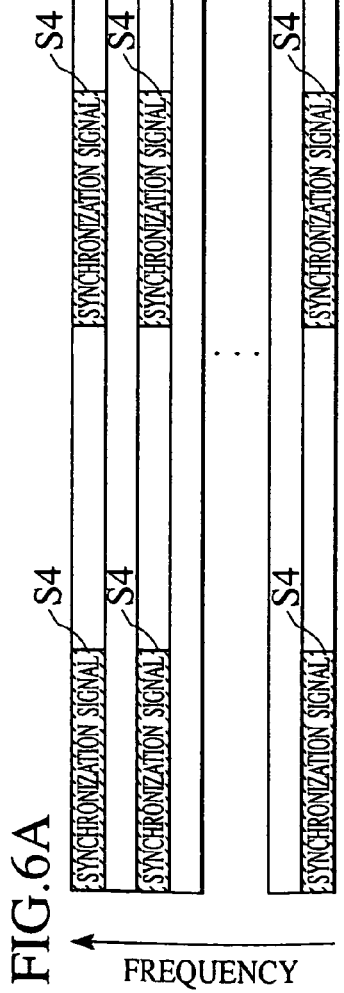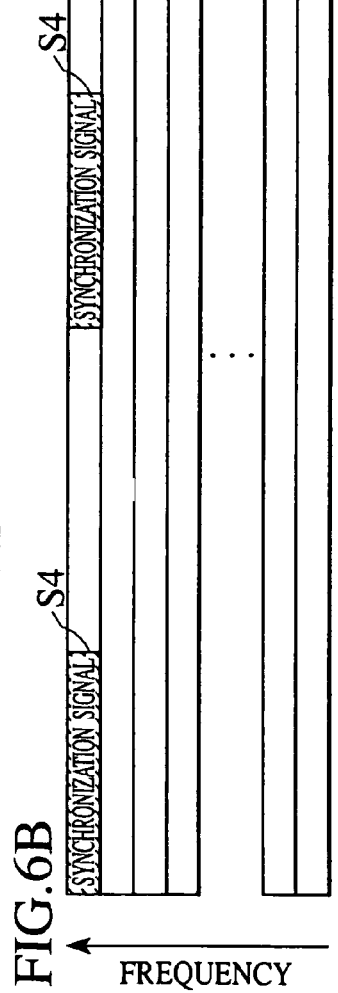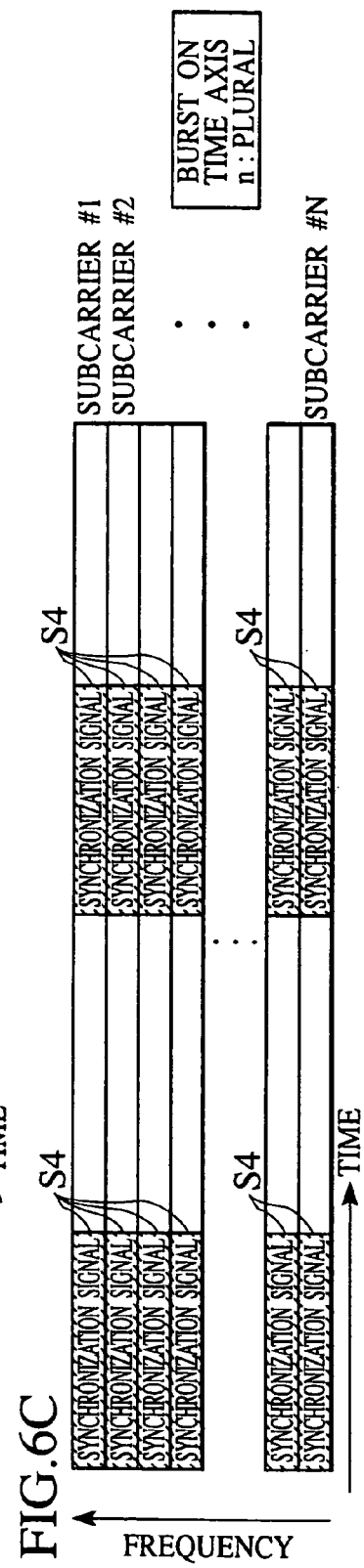

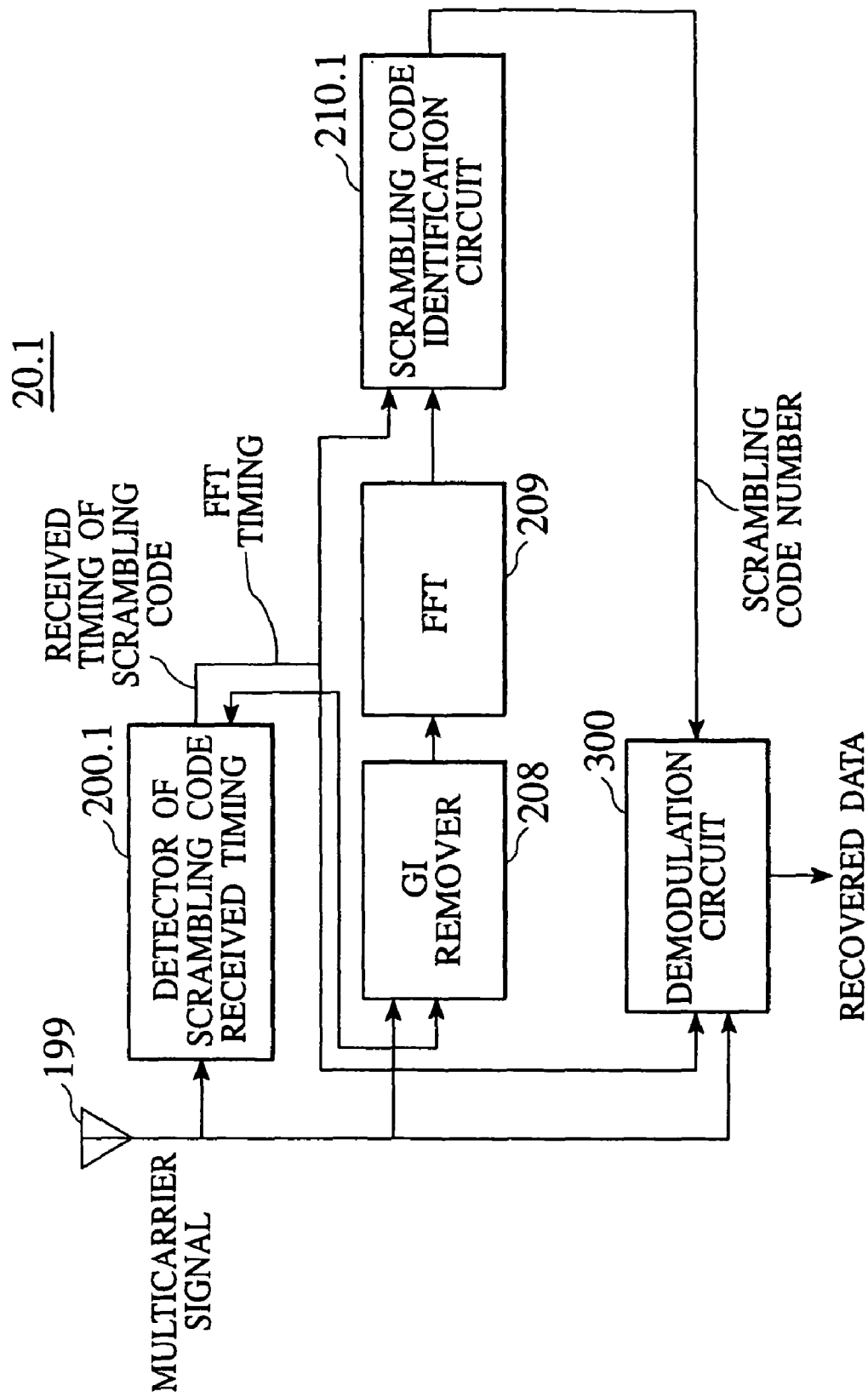

INTERVAL OF
X+Y SAMPLING-PERIODS

AN EXCLUSION WINDOW IS SET BEFORE AND AFTER A
DETECTED FFT TIMING BY W/2 SAMPLING PERIODS
(EXCLUSION WINDOWS #1 AND #2 ARE NOT OVERLAPPING)

AN EXCLUSION WINDOW IS SET BEFORE AND AFTER A
DETECTED FFT TIMING BY W/2 SAMPLING PERIODS
(EXCLUSION WINDOWS #1 AND #2 ARE OVERLAPPING)

AN EXCLUSION WINDOW IS EXTENDED FROM A DETECTED TIMING
TO TWO POINTS EACH HAVING A CORRELATION VALUE ΔdB
SMALLER THAN THE CORRELATION VALUE OF DETECTED TIMING

AN EXCLUSION WINDOWS IS NARROWED IF A SEQUENCE OF
CORRELATION VALUES INCLINED STEEPLY AND IS WIDENED
IF IT INCLINED GENTLY

AN EXCLUSION WINDOWS IS EXTENDED FROM
A DETECTED TIMING TO AN INFLECTION POINT AS LONG AS
A SEQUENCE OF CORRELATION VALUES DECREASES

NEW TIMING CANDIDATES ARE DEFINED AT POINTS
±A AND ±2A SAMPLING-PERIODS AWAY FROM A DETECTED TIMING

NEW TIMING CANDIDATES ARE DEFINED AT POINTS
EACH HAVING A CORRELATION VALUE ΔdB SMALLER THAN
THE CORRELATION VALUE OF A DETECTED TIMING CANDIDATE

TRANSMITTER, TRANSMITTING METHOD, RECEIVER, AND RECEIVING METHOD FOR MC-CDMA COMMUNICATION SYSTEM

CROSS-REFERENCE TO RELATED APPLICATIONS

This application is based upon and claims the benefit of priority from the prior Japanese Patent Applications No. 2000-337992, filed on Nov. 6, 2000, and No. 2001-258451, filed on Aug. 28, 2001; the entire contents of which are incorporated herein by reference.

FIELD OF THE INVENTION

The present invention relates to a transmission technique and a receiving technique for a multicarrier CDMA (Code Division Multiple Access) communication system.

BACKGROUND OF THE INVENTION

Hereinafter, the term "scrambling code" in this specification is equivalent with the term "long code" in the claim.

Multicarrier transmission system such as multicarrier CDMA (Code Division Multiple Access) or OFDM (Orthogonal Frequency Division Multiplexing) modulates a source information signal with a plurality of subcarriers and inserts guard intervals (GIs) to modulated signal in order to reduce waveform distortion due to multiple delayed-paths.

FIG. 1 shows a conventional transmitter 1000 for Multicarrier CDMA (refers to 'MC-CDMA', hereinafter) systems. The transmitter 1000 provides a plurality of data channel generation circuit 100. In each data channel generation circuit 100, a transmission data generator 101 generates a transmission data sequence. An encoder 102 encodes the generated data sequence. A data modulator 103 modulates the encoded data sequence. The modulated data symbol sequence is multiplexed with a pilot by a multiplexer 104. A serial-parallel converter 105 converts the multiplexed symbol sequence into a sequence of N/SF symbols allocated along a frequency axis.

A copier 106 copies each of the sequence of N/SF symbols so that a total length of the copies is equal to a period of the short code. A short code generator 107 generates the short code uniquely assigned for each subscriber. The copies allocated along the frequency axis are multiplied with the short code by multipliers 108, respectively.

A combiner 109 combines the outputs from each data channel generation circuit 100.1-100.x and outputs N combined signals. The N combined symbols are respectively input to other multipliers 111. A scrambling code generator 110 generates a scrambling code (a long code) and outputs to respective multipliers 111. Each multiplier 111 multiplies the respective combined signals with the scrambling code, to provide N symbols scrambled by the scrambling code.

An IFFT unit 113 carries out inverse fast Fourier transform to the N combined symbols and transforms into an orthogonal multicarrier signal. A GI adder 114 inserts guard intervals to the transformed multicarrier signal. This multicarrier signal is transmitted as a wireless signal.

A receiver for MC-CDMA system receives the multicarrier signal transmitted from the transmitter and removes the GIs from the multicarrier signal. The receiver further carries out FFT (Fast Fourier Transform) to separate the received multicarrier signal into the N subcarrier components and recovers the original data sequence. Before carrying out FFT, the receiver must detect FFT timing.

To detect the FFT timing, the OFDM employs a technique by using a correlation characteristic of a guard interval. This technique is disclosed in "A Simultaneous Estimation of Symbol Synchronization and Frequency Offset of Multicarrier Modulation Signals" by Mori, Okada, Hara, Komaki, and Morinaga in IEICE Technical Reelement RCS95-70, pp. 9-16 (1995-09). Another technique is proposed that transmits a timing detection signal twice, and on a receiver side, detects a correlation between two symbols. This technique is disclosed in "Study on Synchronization Method for High-Speed Wireless LAN OFDM System" by Onizawa, Mizoguchi, Kumagai, Takanashi, and Morikura in IEICE Technical Reelement RCS97-210, pp. 137-142 (1998-01).

In MC-CDMA systems, each subscriber is identified according to a short code allocated to each subscriber. Therefore, multiple subscribers may simultaneously carry out communications in the same frequency band.

A mobile communication system employing the MC-CDMA must employ scrambling codes to identify respective base stations. Therefore, the receiver for the multicarrier CDMA system must be able to identify a scrambling code as well as to detect a FFT timing. Accordingly, each mobile station must detect correlations in connection with all scrambling codes prepared by the system and detect a scrambling code related to a signal from a base station to which the mobile station must be connected. For flexible allocation of scrambling codes for each base station, the system must prepare several hundreds of scrambling codes. This raises a problem that a mobile station must spend long time to detect a proper scrambling code before starting communication with a target base station. Studies on the multicarrier CDMA, however, are mostly related to the evaluation of link levels, and none are related to the identification of scrambling codes.

SUMMARY OF THE INVENTION

In order to solve the problems set forth above, an object of the present invention is to provide a transmission technique and a receiving technique for a mobile communication system of MC-CDMA using scrambling codes capable of correctly detecting a specific scrambling code on a receiver side at high speed.

Another object of the present invention is to provide a signal receiving technique for a mobile communication system of MC-CDMA using scrambling codes capable of determining a received timing of a synchronization signal from an optimum cell by providing plural candidates for an optimum base station.

In order to accomplish the objects, a first aspect of the present invention is a transmitter of multicarrier signal for a mobile communication system, comprising: a data channel generator multiplying a plurality of transmission data sequences by a plurality of short codes, respectively; a long code multiplier multiplying the plurality of transmission data sequences multiplied by the plurality of the short codes by a common long code, respectively; a synchronization signal generator multiplying a transmission data sequence for synchronization signal only by a spreading code for synchronization signal; and a transmission element transmitting, by using a plurality of subcarriers, the transmission data sequences doubly multiplied by the short code and the long code, and transmitting the synchronization signal multiplied only by the spreading code for synchronization signal.

A second aspect of the present invention is a multicarrier signal transmission method for a mobile communication system, comprising: transmitting, by using a plurality of subcarriers, a data sequence doubly multiplied by a short code and a long code; and transmitting, by using one for a plurality of subcarriers, a synchronization signal multiplied only by a spreading code for synchronization signal.

A third aspect of the present invention is a receiver of multicarrier signal for a mobile communication system, the system transmits, by using a plurality of subcarriers, a data sequence doubly multiplied by a short code and a long code chosen from a long code group, comprising: a receiving element receiving the multicarrier signal containing the subcarriers, at least one of which a synchronization signal is transmitted therein, multiplied only by a spreading code for synchronization signal; a correlator detecting correlation values between the received multicarrier signal and a synchronization signal replica; and a timing detector detecting an FFT timing and a received timing of long code according to the correlation values.

A fourth aspect of the present invention is a receiver of multicarrier signal for a mobile communication system, the system transmits, by using a plurality of subcarriers, a data sequence doubly multiplied by a short code and a long code chosen from a long code group, comprising: a receiving element receiving the multicarrier signal containing the subcarriers, at least one of which a synchronization signal is transmitted therein, multiplied only by a spreading code for synchronization signal; a first correlator detecting correlation values between the received multicarrier signal and synchronization signal replicas; a timing detector detecting an FFT timing and a received timing of long code according to the correlation values; an FFT unit carrying out FFT at the detected FFT timing, to separate the received multicarrier signal into a plurality of subcarrier components; a second correlator detecting, at the detected received timing of long code, correlation values between the subcarrier components and a plurality of replicas of data sequence doubly multiplied by a short code and each long code chosen from a long code group; a code detector detecting, according to the detected correlation values, a long code that is scrambling the received multicarrier signal; and a demodulation circuit demodulating the data sequence from the received multicarrier signal by using the received timing of long code and the long code.

A fifth aspect of the present invention is a receiver of multicarrier signal for a mobile communication system, the system transmits, by using a plurality of subcarriers, a data sequence doubly multiplied by a short code and a long code chosen from a long code group, comprising: a receiving element receiving the multicarrier signal containing the subcarriers, at least one of which a synchronization signal is transmitted therein, multiplied only by a spreading code for synchronization signal; a subcarrier separator carrying out FFT operations at a plurality of FFT timing candidates to separate the received multicarrier signal into a plurality of subcarrier components; a correlator detecting correlation values between the subcarrier components that carry the synchronization signal and a synchronization signal replica; and a timing detector detecting a received timing of long code and an FFT timing according to the correlation values.

A sixth aspect of the present invention is a receiver of multicarrier signal for a mobile communication system, the system transmits, by using a plurality of subcarriers, a data sequence doubly multiplied by a short code and a long code chosen from a long code group, comprising: a receiving element receiving the multicarrier signal containing the subcarriers, at least one of which a synchronization signal is transmitted therein, multiplied only by a spreading code for synchronization signal; a subcarrier separator carrying out FFT operations at a plurality of FFT timing candidates to separate the received multicarrier signal into a plurality of subcarrier components; a first correlator detecting correlation values between the subcarrier components that carry the synchronization signal and a synchronization signal replica; a timing s detecting a received timing of long code and an FFT timing according to the correlation values; an FFT unit carrying out FFT operation at the detected FFT timing to separate the received multicarrier signal into a plurality of subcarrier components; a second correlator detecting, at the detected received timing of long code, correlation values between the subcarrier components and a plurality of replicas of data sequence doubly multiplied by a short code and each long code chosen from a long code group; a code detector detecting, according to the detected correlation values, a long code that is scrambling the received multicarrier signal; and a demodulation circuit demodulating the data sequence from the received multicarrier signal by using the received timing of long code and the long code.

A seventh aspect of the present invention is a receiver of multicarrier signal for a mobile communication system, the system transmits, by using a plurality of subcarriers, a data sequence doubly multiplied by a short code and a long code chosen from a long code group, comprising: a receiving element receiving the multicarrier signal containing the subcarriers, at least one of which a synchronization signal is transmitted therein, multiplied only by a spreading code for synchronization signal; a subcarrier separator separating the received multicarrier signal into a plurality of subcarrier components; a correlator detecting correlation values between the subcarrier components that carry the synchronization signal and a synchronization signal replica; and a timing detector detecting a received timing of long code according to the correlation values.

A eighth aspect of the present invention is a receiver of multicarrier signal for a mobile communication system, the system transmits, by using a plurality of subcarriers, a data sequence doubly multiplied by a short code and a long code chosen from a long code group, comprising: a receiving element receiving the multicarrier signal containing the subcarriers, at least one of which a synchronization signal is transmitted therein, multiplied only by a spreading code for synchronization signal; a subcarrier separator separating the received multicarrier signal into a plurality of subcarrier components; a first correlator detecting correlation values between the subcarrier components that carry the synchronization signal and a synchronization signal replica; and a timing detector detecting a received timing of long code according to the correlation values; a second correlator detecting, at the detected received timing of long code, correlation values between the subcarrier components and a plurality of replicas of data sequence doubly multiplied by a short code and each long code chosen from a long code group; a code detector detecting, according to the detected correlation values, a long code that is scrambling the received multicarrier signal; and a demodulation circuit demodulating a data sequence from the received multicarrier signal by using the received timing of long code and the long code.

A ninth aspect of the present invention is a receiver of multicarrier signal for a mobile communication system, the system transmits, by using a plurality of subcarriers, a data sequence doubly multiplied by a short code and a long code chosen from a long code group, comprising: a receiving element receiving the multicarrier signal containing the subcarriers, at least one of which a synchronization signal is transmitted therein, multiplied only by a spreading code for synchronization signal; a subcarrier separator carrying out FFT operations at a plurality of FFT timing candidates to separate the received multicarrier signal into plural groups each of which contains a plurality of subcarrier components; a first correlator detecting correlation values between the subcarrier components that carry the synchronization signal and a synchronization signal replica for each groups of subcarriers; a timing detector detecting a plurality of received timing candidates of a long code; a second correlator detecting, at each received timing candidate of the long code, correlation values between the subcarrier components and a plurality of replicas of data sequence doubly multiplied by a short code and each long code chosen from a long code group; a code candidate detector detecting, according to the detected correlation values, a plurality of candidates of long code for scrambling a multicarrier signal; a timing and code detector detecting a received timing of long code among the received timing candidates and detecting a long code among the candidates of long code; and a demodulation circuit demodulating the data sequence from the received multicarrier signal by using the received timing of long code and the long code.

A tenth aspect of the present invention is a receiver of multicarrier signal for a mobile communication system, the system transmits, by using a plurality of subcarriers, a data sequence doubly multiplied by a short code and a long code chosen from a long code group, comprising: a receiving element receiving the multicarrier signal containing the subcarriers, at least one of which a synchronization signal is transmitted therein, multiplied only by a spreading code for synchronization signal; an FFT timing detector detecting a correlation for a guard interval of the received multicarrier signal, to detect an FFT timing; a subcarrier separator carrying out FFT at the detected FFT timing to separate the received multicarrier signal into a plurality of subcarrier components; a correlator detecting correlation values between subcarriers that carry a synchronization signal among the separated subcarriers and a synchronization signal replica; and a timing detector detecting a received timing of long code according to the correlation values.

A eleventh aspect of the present invention is a receiver of multicarrier signal for a mobile communication system, the system transmits, by using a plurality of subcarriers, a data sequence doubly multiplied by a short code and a long code chosen from a long code group, comprising: a receiving element receiving the multicarrier signal containing the subcarriers, at least one of which a synchronization signal is transmitted therein, multiplied only by a spreading code for synchronization signal; an FFT timing detector detecting a correlation for a guard interval of the received multicarrier signal, to detect an FFT timing; a subcarrier separator carrying out FFT at the detected FFT timing to separate the received multicarrier signal into a plurality of subcarrier components; a first correlator detecting correlation values between subcarriers that carry a synchronization signal among the separated subcarriers and a synchronization signal replica; a timing detector detecting a received timing of long code according to the correlation values; a second correlator detecting, at the detected received timing of long code, correlation values between the subcarrier components and a plurality of replicas of data sequence doubly multiplied by a short code and each long code chosen from a long code group; a code detector detecting, according to the detected correlation values, a long code that is scrambling the received multicarrier signal; and a demodulation circuit demodulating the data sequence from the received multicarrier signal by using the received timing of long code and the long code.

A twelfth aspect of the present invention is a multicarrier signal receiving method for a mobile communication system, the system transmits, by using a plurality of subcarriers, a data sequence doubly multiplied by a short code and a long code chosen from a long code group, comprising: a receiving step of receiving the multicarrier signal containing the subcarriers, at least one of which a synchronization signal is transmitted therein, multiplied only by a spreading code for synchronization signal; a correlation detection step of detecting correlation values between the received multicarrier signal and synchronization signal replicas; and a timing detection step of detecting an FFT timing and a received timing of long code according to the correlation values.

According to a thirteenth aspect of the present invention, a method as in the twelfth aspect of the present invention further comprises: a separation step of carrying out FFT at the detected FFT timing, to separate the received multicarrier signal into a plurality of subcarrier components; a correlation detection step of detecting, at the detected received timing of long code, correlation values between the subcarrier components and a plurality of replicas of data sequence doubly multiplied by a short code and each long code chosen from a long code group; and a code detection step of detecting, according to the detected correlation values, a long code that is scrambling the received multicarrier signal.

A fourteenth aspect of the present invention is a multicarrier signal receiving method for a mobile communication system, the system transmits, by using a plurality of subcarriers, a data sequence doubly multiplied by a short code and a long code chosen from a long code group, comprising: a receiving step of receiving the multicarrier signal containing the subcarriers, at least one of which a synchronization signal is transmitted therein, multiplied only by a spreading code for synchronization signal; a separation step of separating the received multicarrier signal into a plurality of subcarrier components; a correlation detection step of detecting correlation values between the subcarrier components that carry the synchronization signal and a synchronization signal replica; and a timing detection step of detecting a received timing of long code according to the correlation values.

A fifteenth aspect of the present invention is a multicarrier signal receiving method for a mobile communication system, the system transmits, by using a plurality of subcarriers, a data sequence doubly multiplied by a short code and a long code chosen from a long code group, comprising: a receiving step of receiving the multicarrier signal containing the subcarriers, at least one of which a synchronization signal is transmitted therein, multiplied only by a spreading code for synchronization signal; a separation step of carrying out FFT on the received multicarrier signal at a plurality of FFT timing candidates, to separate the received multicarrier signal into a plurality of subcarrier components for each FFT timing candidate; a first correlation detection step of detecting correlation values between the subcarrier components that carry the synchronization signal and a synchronization signal replica; a timing detection step of detecting a received timing of long code according to the correlation values; a second correlation detection step of detecting, at the detected received timing of long code, correlation values between the subcarrier components and a plurality of replicas of data sequence doubly multiplied by a short code and each long code chosen from a long code group; and a timing and code detection step of detecting an FFT timing, a received timing of long code, and the long code that is scrambling the received multicarrier signal according to the detected correlation values for each of the FFT timing candidates in the second correlation detection step.

A sixteenth aspect of the present invention is a multicarrier signal receiving method for a mobile communication system, the system transmits, by using a plurality of subcarriers, a data sequence doubly multiplied by a short code and a long code chosen from a long code group, comprising: an FFT timing detection step of detecting a correlation for a guard interval of a received multicarrier signal, to detect an FFT timing; a separation step of carrying out FFT at the FFT timing, to separate the received multicarrier signal into a plurality of subcarrier components; a correlation detection step of detecting correlation values between subcarriers that carry a synchronization signal among the separated subcarriers and a synchronization signal replica; and a timing detection step of detecting a received timing of long code according to the correlation values.

According to a seventeenth aspect of the present invention, a method as in the sixteenth aspect of the present invention further comprises: a correlation detection step of detecting, at the detected received timing of long code, correlation values between the subcarrier components and the data sequence doubly multiplied by the short code and the long code chosen from the long code group; and a code detection step of detecting, according to the detected correlation values, a long code that is scrambling the received multicarrier signal.

A eighteenth aspect of the present invention is a receiver of multicarrier signal for a mobile communication system, the system transmits, by using a plurality of subcarriers, a data sequence doubly multiplied by a short code and a long code chosen from a long code group, comprising: a receiving element receiving the multicarrier signal containing the subcarriers, at least one of which a synchronization signal is transmitted therein, multiplied only by a spreading code for synchronization signal; and an FFT timing detector detecting a plurality of FFT timing candidates according to a correlation characteristic of a guard interval contained in the received multicarrier signal; wherein the FFT timing detector comprises: a multiplier multiplying the received multicarrier signal by a delayed signal by one symbol length of the received multicarrier signal, to provide a product; an integrator integrating the product over one guard interval at every guard interval, to provide a plurality of correlation values; a first memory storing the correlation values and corresponding timings thereto; a second memory storing a plurality of FFT timing candidates consecutively given; a search range setter setting search ranges for respective FFT timing candidates according to the correlation values in the first memory and the FFT timing candidates in the second memory; and a timing detector firstly selecting a maximum correlation value and a corresponding timing from the values in the first memory as an FFT timing candidate #1 and storing the FFT timing candidate #1 in the second memory, subsequently making the search rang setter set a new search range according to the values stored in the first memory and the FFT timing candidate previously stored in the second memory, selecting a maximum correlation value and a corresponding timing from the values within the search range previously set as an FFT timing candidate #2 and storing the FFT timing candidate #2 in the second memory, and repeating the same operations of setting a new search range and selecting an FFT timing candidate of next number until detecting a predetermined number of FFT timing candidates.

According to a nineteenth aspect of the present invention, a receiver as in the eighteenth aspect of the present invention, further comprises: a plurality of FFT units, each of which carries out FFT operations to the received multicarrier signal at each of detected plural FFT timing candidates to separate the received multicarrier signal into a plurality of subcarrier components; a plurality of first correlators, each of which detects correlation values between the subcarrier components that carry the synchronization signal and a synchronization signal replica for each groups of subcarriers; a plurality of timing detectors, each of which detects a plurality of received timing candidates of long code; a plurality of second correlators, each of which detects, at each received timing candidate of long code, correlation values between the subcarrier components and a plurality of replicas of data sequence doubly multiplied by a short code and each long code chosen from a long code group; a plurality of code candidate detectors, each of which detects, according to the detected correlation values, a plurality of candidates of long code for scrambling a multicarrier signal; a timing and code detector detecting a received timing of long code among the received timing candidates and detecting a long code among the candidates of long code; and a demodulation circuit demodulating the data sequence from the received multicarrier signal by using the received timing of long code and the long code.

According to a twentieth aspect of the present invention, a receiver as in the eighteenth aspect of the present invention, further comprises: a plurality of first FFT units, each of which carries out FFT operations to the received multicarrier signal at each of detected plural FFT timing candidates to separate the received multicarrier signal into a plurality of subcarrier components; a plurality of first correlators, each of which detects correlation values between the subcarrier components that carry the synchronization signal and a synchronization signal replica for each group of subcarriers; a timing detector detecting a received timing of long code and an FFT timing according to the correlation values; a second FFT unit carrying out FFT operation at the detected FFT timing to the received multicarrier signal to separate a plurality of subcarriers; a second correlator detecting, at the received timing of long code, correlation values between the subcarrier components and a replica of data sequence doubly multiplied by a short code and each long code chosen from a long code group; a code detector detecting, according to the detected correlation values, a long code for scrambling a multicarrier signal; and a demodulation circuit demodulating the data sequence from the received multicarrier signal by using the received timing of long code and the long code.

A twenty first aspect of the present invention is a multicarrier signal receiving method for a mobile communication system, the system transmits, by using a plurality of subcarriers, a data sequence doubly multiplied by a short code and a long code chosen from a long code group, comprising: an FFT timing detection step of detecting a plurality of FFT timing candidates according to a correlation characteristic of a guard interval contained in a received multicarrier signal.

According a twenty second aspect of the present invention, a method as in the twenty first aspect of the present invention, further comprises: a step of setting additional FFT timing candidates before and behind each of the determined FFT timing candidates.

According a twenty third aspect of the present invention, a method as in the twenty first aspect of the present invention further comprises: a step of carrying out FFT at a plurality of the FFT timing candidates, to separate the received multicarrier signal into a plurality of subcarrier components; a step of detecting correlation values between subcarriers that carry a synchronization signal among the separated subcarriers and a synchronization signal replica; a step of detecting one or a plurality of received timing candidates of the long code according to the detected correlation values; a step of detecting, at respective timings of the detected received timing candidates of the long code, correlation values between the subcarrier components and a plurality of replicas of data sequence doubly multiplied by each long code chosen from a long code group and a short code; and a step of detecting an FFT timing, a received timing of long code, and a long code that is scrambling the received multicarrier signal according to the detected correlation values.

A twenty fourth aspect of the present invention is a multicarrier signal receiving method for a mobile communication system, the system transmits, by using a plurality of subcarriers, a data sequence doubly multiplied by a short code and a long code chosen from a long code group, comprising: detecting correlation values between the subcarrier components separated from a received multicarrier signal and a plurality of replicas of data sequence doubly multiplied by each long code chosen from a long code group and a short code, by: integrating the product coherently over Navg symbols along a time axis for each subcarrier, where Navg is an integer equal to or larger than 1; accumulating coherently the integrated value of each subcarrier for Ncs consecutive subcarriers along a frequency axis, where Ncs is an integer satisfying 1<=Ncs<=N, and N is the number of the subcarriers; and detecting averaged correlation values by averaging Nps accumulated value of every Ncs subcarriers by squared form along the frequency axis, wherein Nps is an integer satisfying 1<=Nps<=Nc/Ncs.

BRIEF DESCRIPTION OF THE DRAWINGS

FIGS. 2A and 2B respectively show a scrambling code pattern according to the prior art;

FIGS. 4A and 4B respectively show an example of a synchronization signal structure according to the first embodiment;

FIGS. 5A and 5B respectively show another example of the synchronization signal structure according to the first embodiment;

FIGS. 6A, 6B and 6C respectively show a another example of the synchronization signal structure according to the first embodiment;

FIG. 10 is a block diagram of a third embodiment of a receiver for a mobile communication system of MC-CDMA according to the present invention;

DETAILED DESCRIPTION OF THE INVENTION

Embodiments of the present invention will be explained in detail with reference to the accompanying drawings.

FIGS. 2A and 2B respectively show an example of an ordinary scrambling code pattern of an MC-CDMA transmission system. A scrambling code, which is referred to as a long code in the claims, has specific patterns along both frequency and time axes depending on a base station to which the scrambling code is allocated. FIG. 2A shows an example of using a long code, a chip length of which is longer than the number of subcarriers. FIG. 2B shows an example of using a long code, a chip length of which is equal to the number of subcarriers and which is consecutively shifted by one symbol along a frequency axis.

Figure 1:
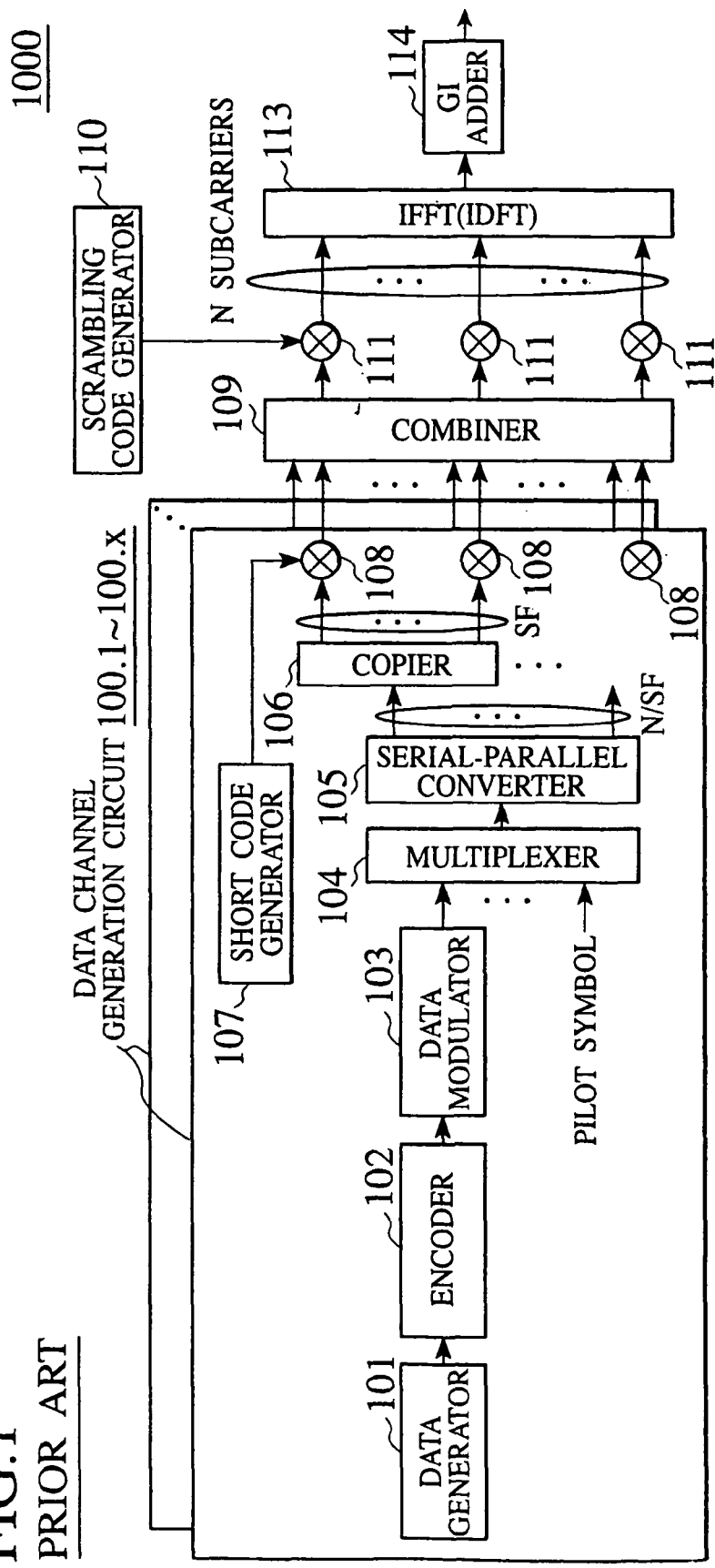
FIG. 1 is a block diagram of a transmitter for a mobile communication system of MC-CDMA according to a prior art.
Figure 3:
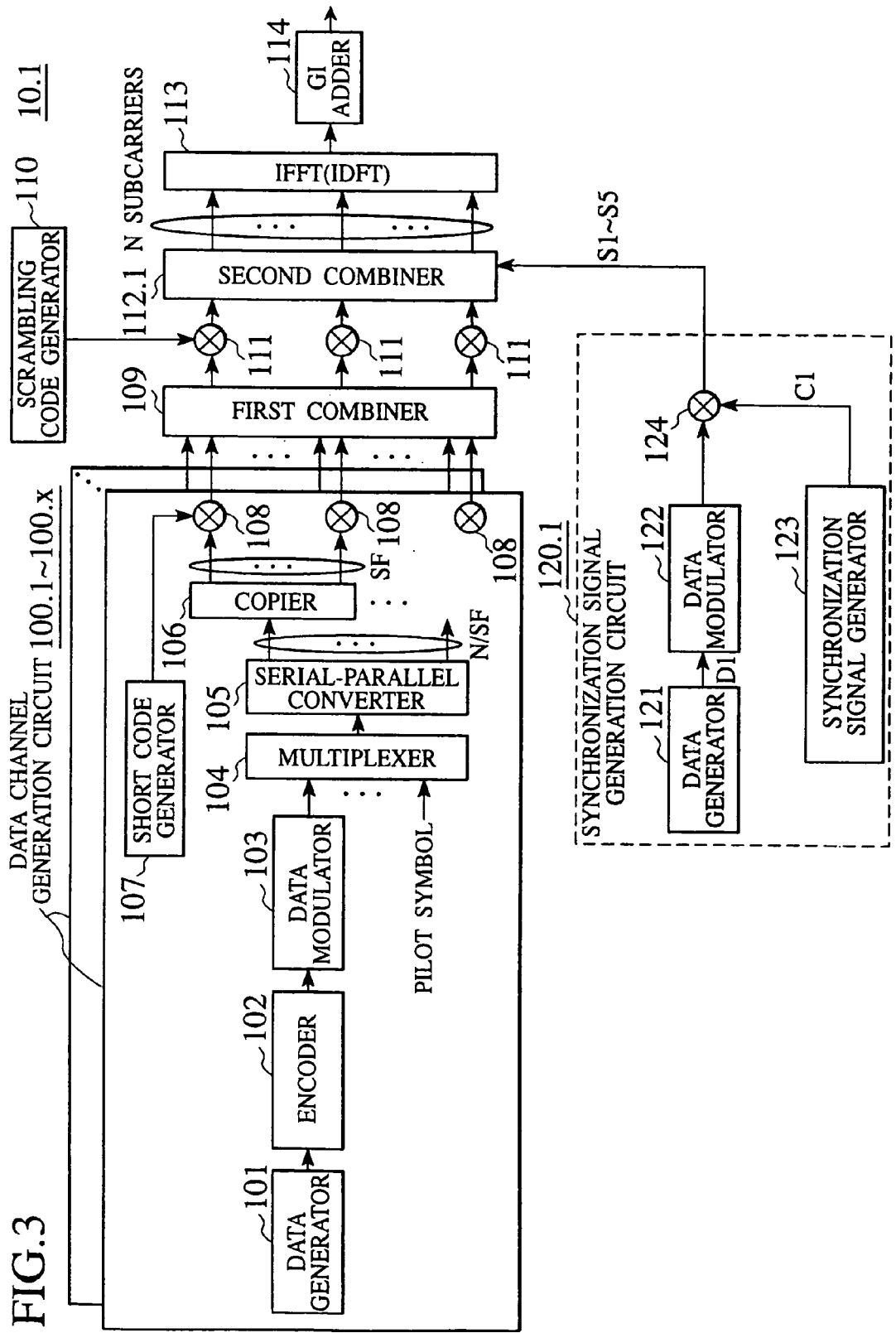
FIG. 3 is a block diagram of a first embodiment of a transmitter for a mobile communication system of MC-CDMA according to the present invention.

FIG. 3 shows a first embodiment of a transmitter for an MC-CDMA communication system. The transmitter 10.1 is accommodated in each base station transmitting wireless multicarrier signal. The transmitter 10.1 provides multiple data channel generation circuits 100.1-100.x. In each data channel generation circuit 100, an encoder 102 encodes a transmission data sequence from a transmission data generator 101. The encoded data sequence from the encoder 102 is modulated by a data modulator 103 and multiplexed by a multiplexer 104 with a pilot symbol.

A serial-parallel converter 105 carries out serial-parallel conversion to the serial data sequence and outputs a sequence of N/SF symbols allocated along a frequency axis. A copier 106 copies each of the sequence of N/SF symbols so that a total length of the copies is equal to a length of a short code. This sequence length is equivalent with a period of the short code.

A short code generator 107 generates the short code. The copies allocated along the frequency axis are multiplied with the short code by multipliers 108, respectively.

A first combiner 109 combines every multiplied signals of the same channel from each data channel generation circuit 100.1-100.x and outputs N combined symbols. The N combined symbols are respectively input to another multipliers 111. A scrambling code generator 110 generates a scrambling code and outputs to respective multipliers 111. Each multiplier 111 multiplies the respective combined symbols with the scrambling code along the frequency axis.

By a second combiner 112, the N multiplied symbols with the scrambling code (long code) from the respective multipliers 111 are additionally combined with a synchronization signal from a synchronization signal generation circuit 120.1. An IFFT unit 113 carries out inverse fast Fourier transform to the N symbols and transforms into an orthogonal multicarrier signal. A GI adder 114 inserts guard intervals to the transformed multicarrier signal. This multicarrier signal is transmitted into the air as a wireless signal.

The generation of the synchronization signal by the circuit 120.1 will be explained. A synchronization signal data sequence D1 is usually common to all base stations and may consist of all '1' sequence. A data generator 121 generates this synchronization signal data sequence D1 and a data modulator 122 modulates the synchronization signal data sequence D1. The modulated data sequence is multiplied with a spreading code for synchronization signal C1 by a multiplier 124 to provide a synchronization signal S1 for the second combiner 112. The spreading code for synchronization signal C1 is that of generated by a synchronization signal generator 123.

A transmission method of multicarrier signal carried out by the multicarrier signal transmitter 10.1 shown in FIG. 3 will be explained. FIG. 4A shows a first example of synchronization signal S1 continuously transmitted along a time axis on a plurality of subcarriers and FIG. 4B shows the synchronization signal S1 continuously transmitted along a time axis on a single subcarrier. The synchronization signal S1 is output from the synchronization signal generation circuit 120.1 shown in FIG. 3. The synchronization signal S1 is yielded through multiplication of the spreading code for synchronization signal C1 with the synchronization data sequence D1.

In the transmitter 10.1, the second combiner 112.1 continuously combines the synchronization signal S1 with a single or multiple specific subcarrier(s) along the time axis. The IFFT unit 113 carries out the inverse fast Fourier transform to the combined signals from the second combiner 112.1 and transforms them into the multicarrier signal, and the GI adder 114 inserts the guard intervals of a fixed period to the multicarrier signal from the IFFT unit 113 on every FFT timings.

FIG. 5A shows a third example of a synchronization signal structure transmitted by the transmitter 10.1 shown in FIG. 3. The synchronization signal structure shown in FIG. 5A also transmits a synchronization signal S2 along the time axis on a single subcarrier. The synchronization signal S2 generated by the synchronization signal generation circuit 120.1 has a specific pattern along a time axis. A pattern length of the synchronization signal S2 is equal to an iteration period of scramble pattern τ. The specific pattern is realizable by a scramble code pattern for the synchronization signal. Accordingly, for a receiver, detecting a received timing of the synchronization signal S2 results in detecting a received timing of multiplication start timing of the scrambling code.

FIG. 5B shows a fourth example of a synchronization signal structure transmitted by the transmitter 10.1 shown in FIG. 3. The data frame transmits a synchronization signal S3 along the time axis. The synchronization signal S3 from the synchronization signal generation circuit 120.1 also has a specific pattern along the time axis. A period of the synchronization signal S3 is equal to a half of the iteration period of scramble pattern τ. For a receiver, detecting a received timing of the synchronization signal S3 results in confining a received timing of multiplication start timing of a scrambling code to be detected within a limited interval.

FIGS. 6A to 6C show a fifth example of a synchronization signal structure transmitted by the transmitter 10.1 shown in FIG. 3, in which FIG. 6A shows a synchronization signal S4 simultaneously transmitted in a burst manner on a plurality of subcarriers, FIG. 6B shows a synchronization signal S4 transmitted in a burst manner on a single subcarrier, and FIG. 6C shows a synchronization signal S4 simultaneously transmitted in a burst manner on all subcarriers.

Figures 7A, 7B:
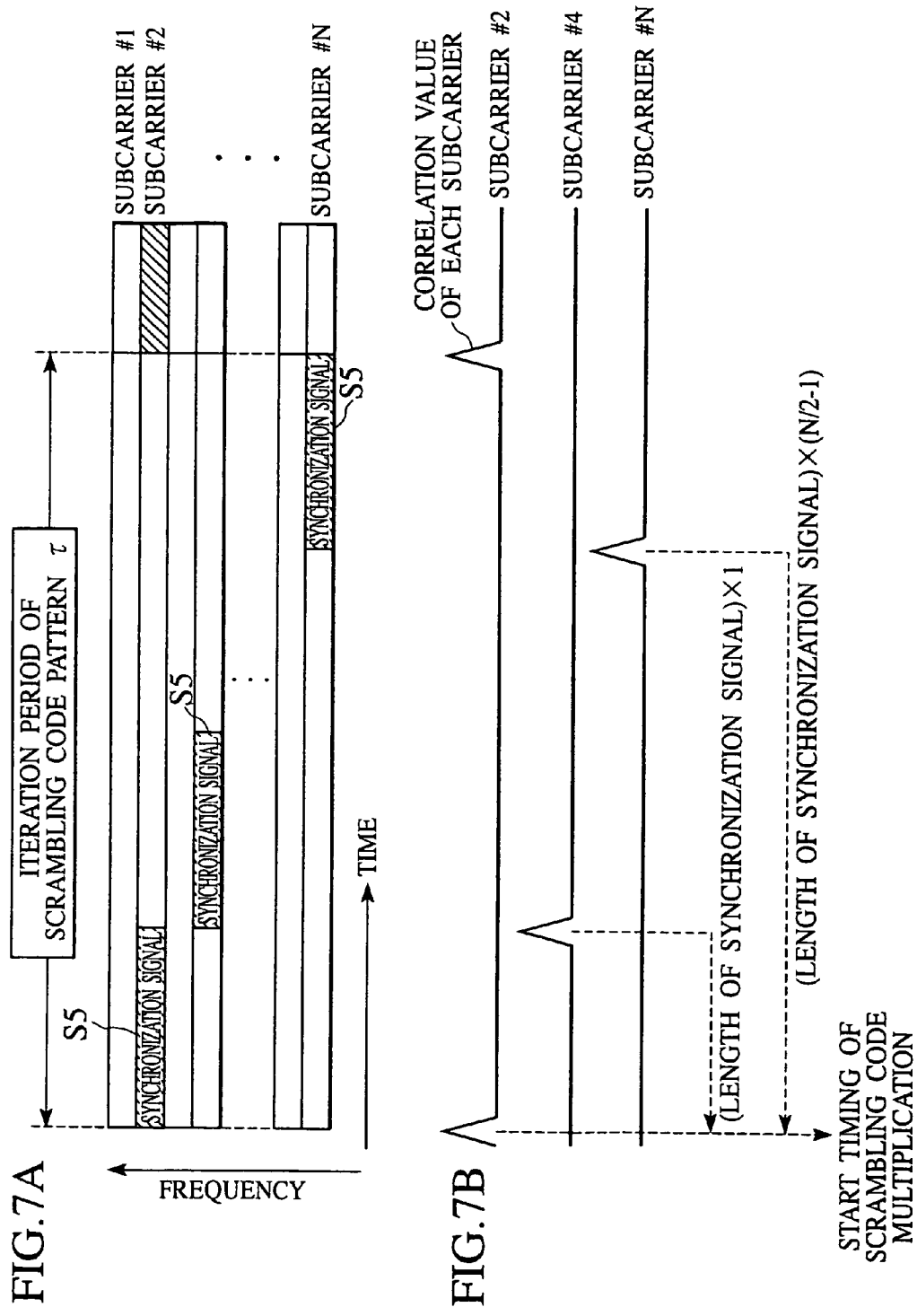
FIG. 7A shows a another example of the synchronization signal structure according to the first embodiment of the present invention.
FIG. 7B is a detection method by correlation property of synchronization signals to be detected by a receiver.

FIG. 7A shows a sixth example of a synchronization signal structure transmitted by the transmitter 10.1 shown in FIG. 3. A synchronization signal S5 is transmitted in a burst manner on multiple subcarriers at different timings. Accordingly, as shown in FIG. 7B, for a receiver, detecting multiple subcarriers in which the synchronization signals S5 are transmitted and each received timing thereof results in detecting a received timing of multiplication start timing of the scrambling code.

Figure 8:
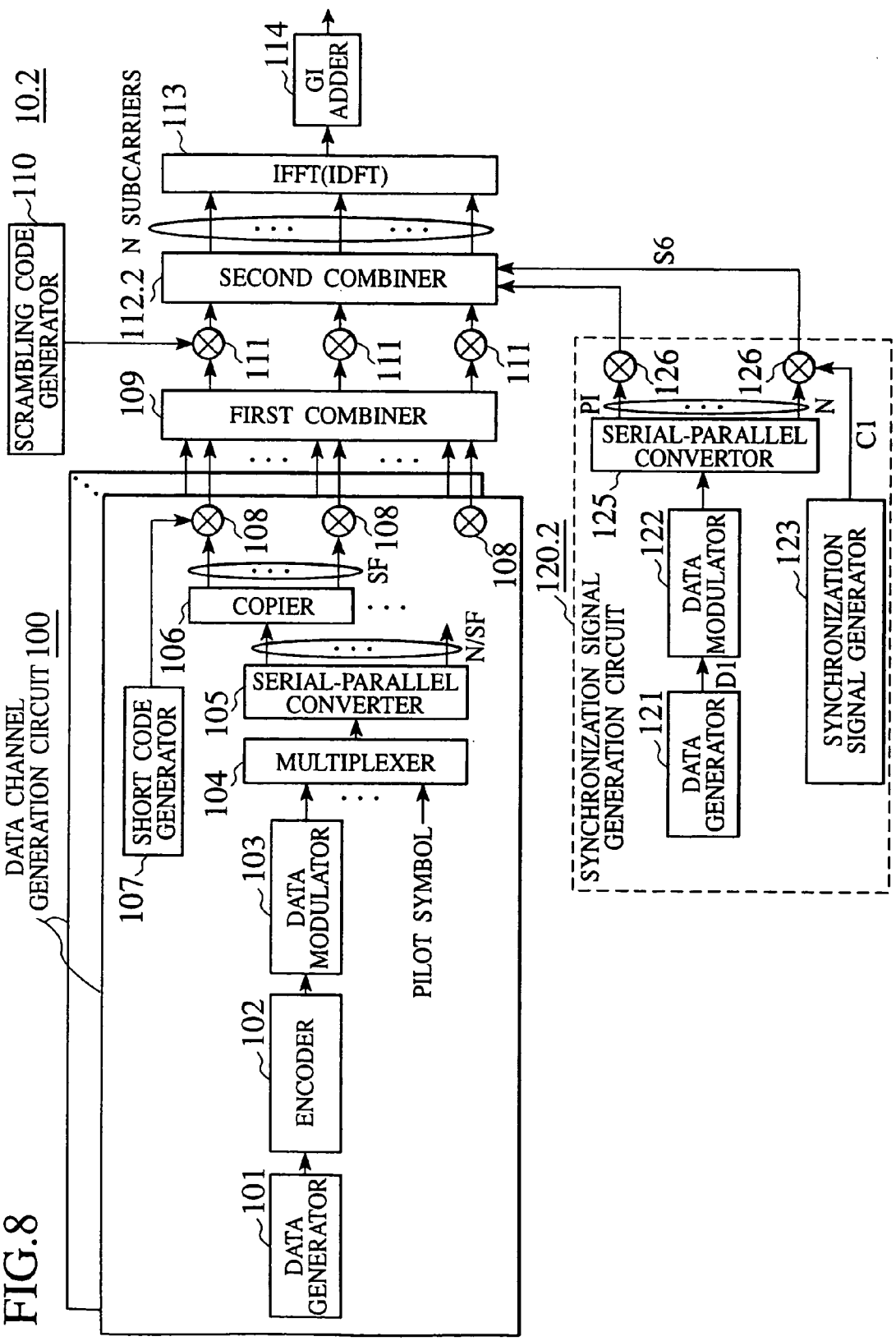
FIG. 8 is a block diagram of a second embodiment of a transmitter for a mobile communication system of MC-CDMA according to the present invention.

A second embodiment of a multicarrier signal transmitter for an MC-CDMA system will be explained. In FIG. 8 showing a transmitter of multicarrier signal 10.2 of the second embodiment, blocks given the common numerals with the blocks shown in FIG. 3 are identical. A feature of the multicarrier signal transmitter of the second embodiment is that a synchronization signal generation circuit 120.2 provides a serial-parallel converter 125.

A data generator 121 generates a data sequence D1. The data sequence D1 is usually common to all base stations and may consist of all '1' sequence. The synchronization signal data sequence D1 is modulated by a data modulator 122, and the modulated data sequence is converted by a serial-parallel converter 125 into N symbols along a frequency axis. Multipliers 126 respectively multiply, along the frequency axis, the N symbols with a scrambling code for synchronization signal C1 that is generated by a synchronization signal generator 123. The multipliers 126 output N parallel synchronization symbols S6 to a second combiner 112.2.

The second combiner 112.2 combines the N symbols of synchronization signals S6 with the N subcarriers at a specific timing. To make a transmit timing of the synchronization signal indicate a scrambling code transmit timing like FIGS. 9A and 9B, each synchronization signal S6 is transmitted in synchronization with the scrambling code transmit timing.

Figure 9A:
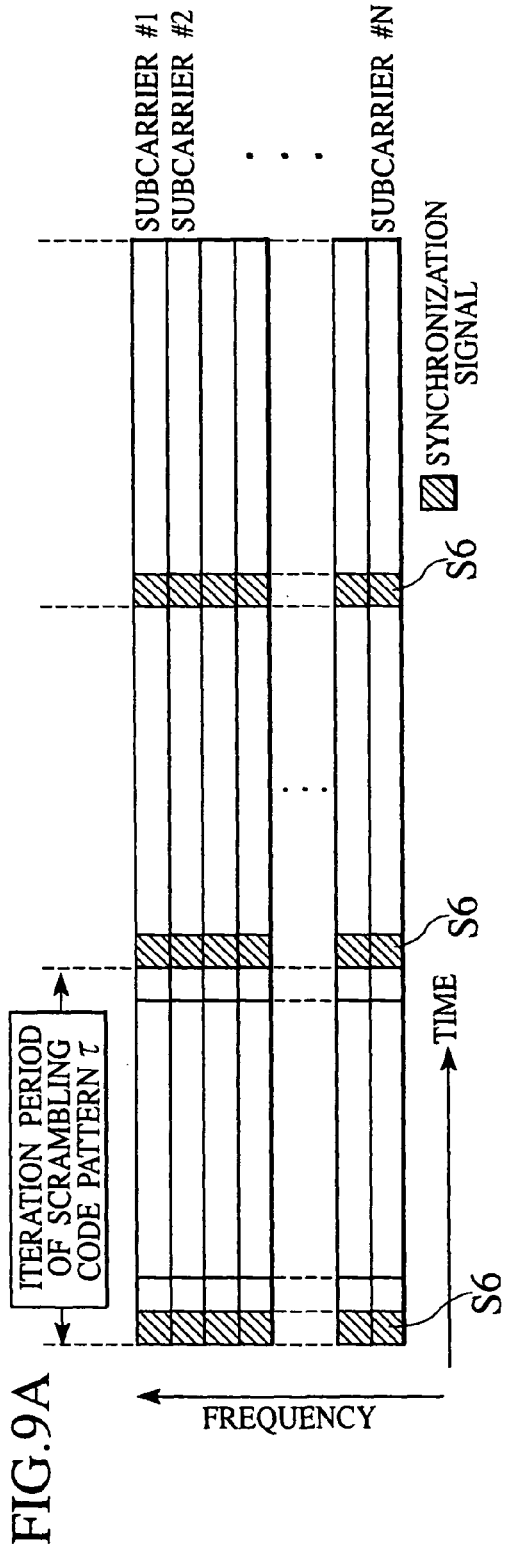
FIGS. 9A and 9B respectively show an example of a synchronization signal structure according to the second embodiment.
Figure 9B:
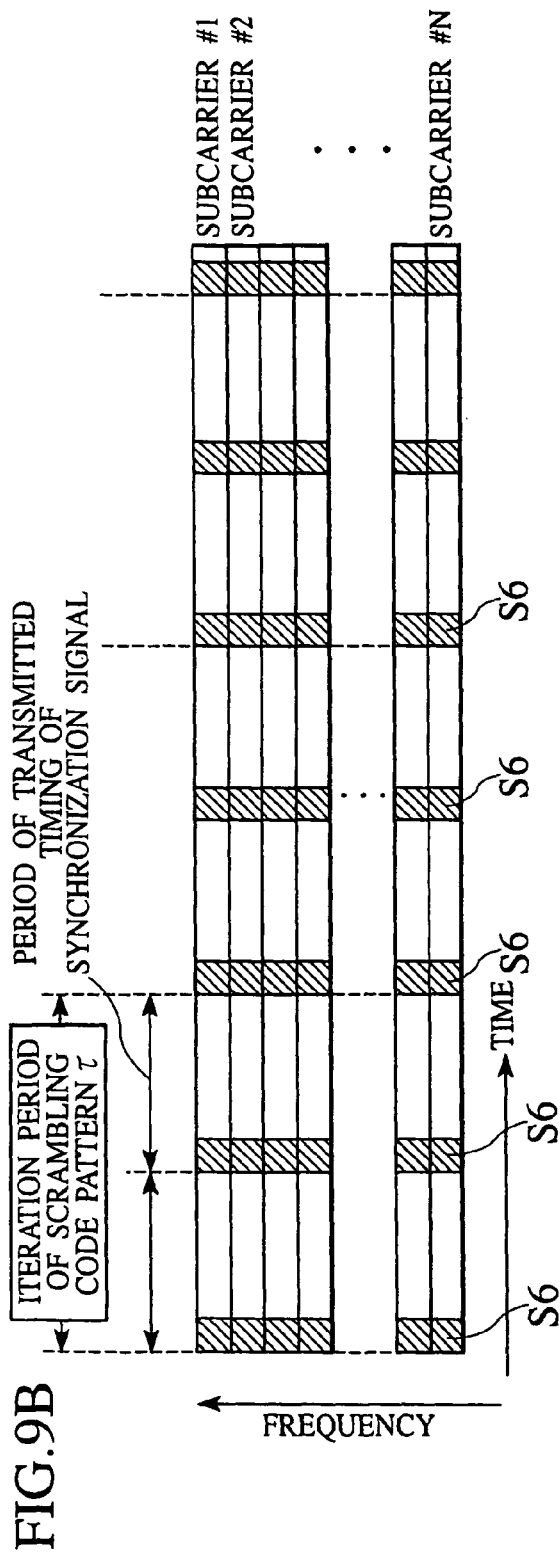

In a transmission method of multicarrier signal shown in FIGS. 9A and 9B, a transmitter of multicarrier signal 10.2 simultaneously transmits a synchronization signal S6 in a burst manner on all subcarriers. In FIG. 9A, a start timing of a scrambling code pattern coincides with a transmit timing of the synchronization signal S6. Accordingly, for a receiver, detecting the received timing of the synchronization signal S6 results in detecting the received timing of multiplication start timing of the scrambling code. In FIG. 9B, a synchronization signal S6 is transmitted twice within an iteration period of scramble pattern τ. Namely, an interval between synchronization signal transmit timings is equal to a half of the iteration period of scramble pattern τ. Accordingly, for a receiver, detecting the received timing of synchronization signal results in confining a received timing of multiplication start timing of a scrambling code to be detected within a limited interval.

Figure 11:
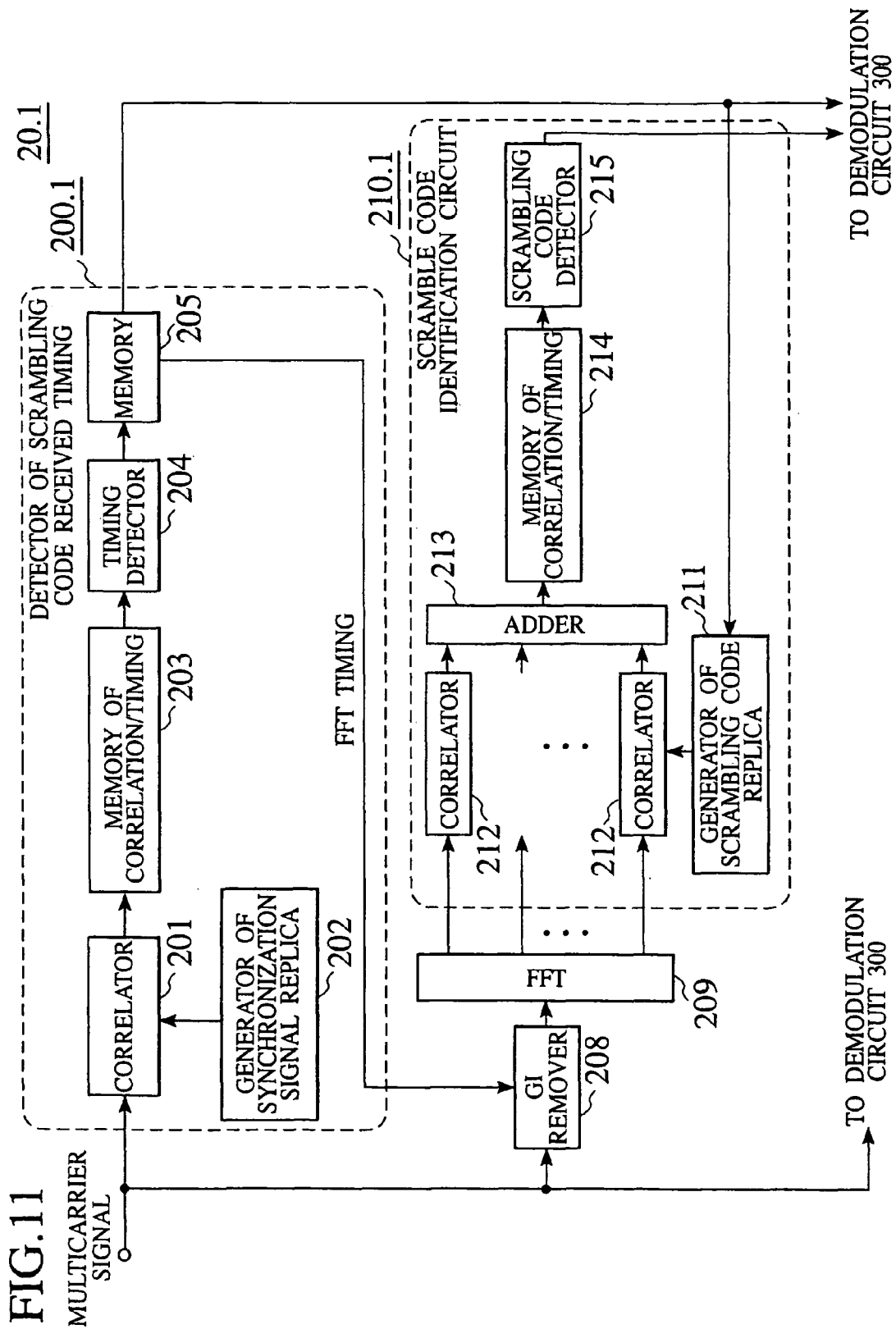
FIG. 11 shows a precise block diagram of a received timing detector of scrambling code and a scrambling code identification circuit employed by the third embodiment of the receiver.
Figure 12:
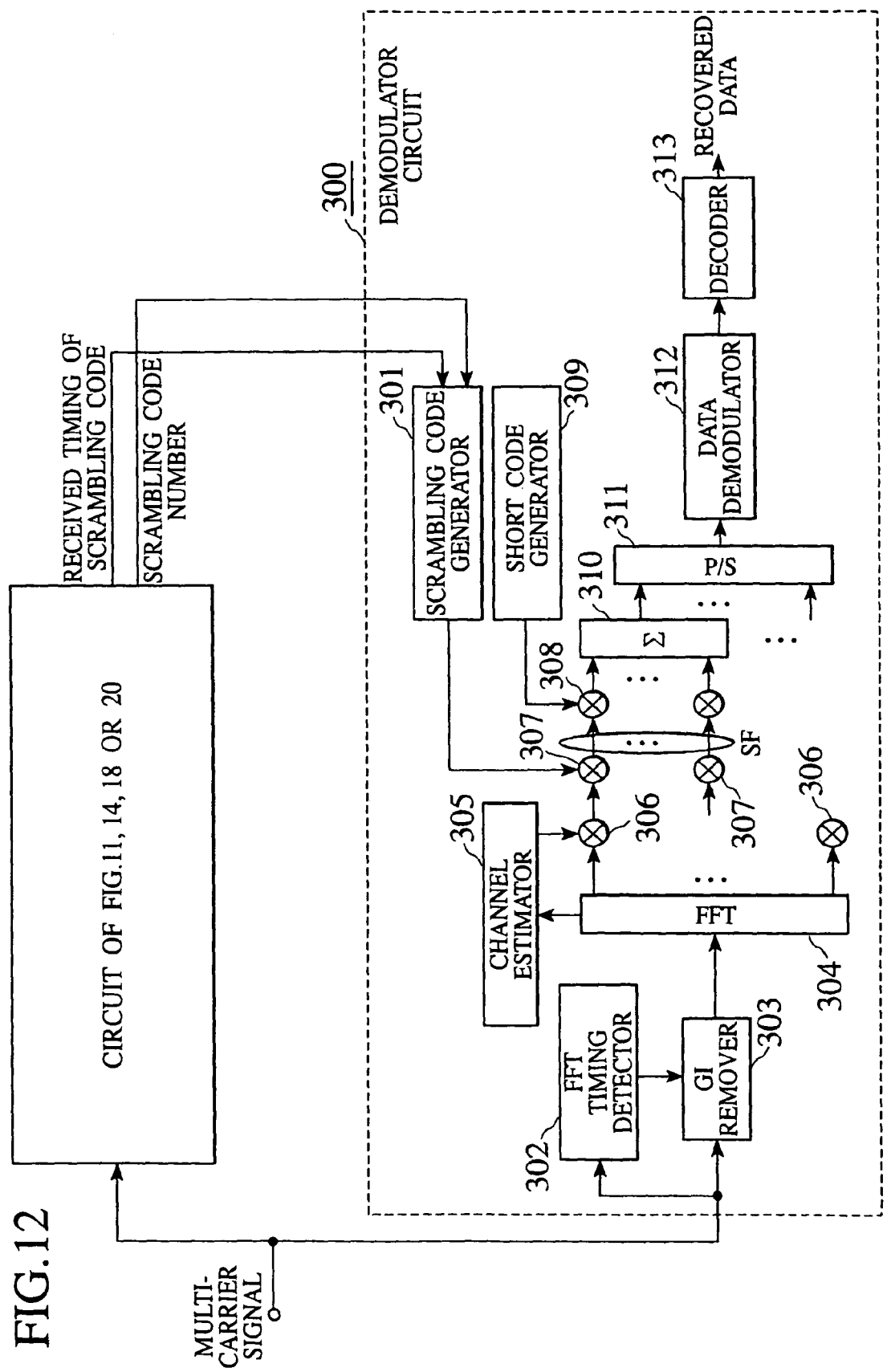
FIG. 12 shows a precise block diagram of a demodulation circuit employed by the third embodiment of the receiver.

A third embodiment of a receiver for MC-CDMA transmission system will be explained referring to FIGS. 10-12. A receiver for MC-CDMA transmission system 20.1 comprises an antenna for multicarrier wireless signal 199, a detector of scrambling code received timing 200.1, a GI remover 208, an FFT unit 209, a scrambling code identification circuit 210.1 and a demodulation circuit 300. The detector of scrambling code received timing 200.1 inputs the multicarrier signal received by the antenna 199 and detects a scrambling code received timing and an FFT timing. The GI remover 208 removes guard intervals from the multicarrier signal according to the detected FFT timing. The FFT unit 209 carries out fast Fourier transforms to the multicarrier signal and separates to N subcarrier components. The scrambling code identification circuit 210.1 having an inner configuration as shown in FIG. 11 identifies a scrambling code that is multiplied on the multicarrier signal received by the antenna 199. The demodulation circuit 300 having an inner configuration as shown in FIG. 12 demodulates the received multicarrier signal to an original data sequence by using the received timing of scrambling code from the detector of scrambling code received timing 200.1 and the scrambling code from the scrambling code detector 210.1.

As precisely shown in FIG. 11, the detector of scrambling code received timing 200.1 inputs a multicarrier signal received by the antenna 199 to a correlator 201. A generator of synchronization signal replica 202 generates synchronization signal replicas, which are supplied to the correlator 201. The correlator 201 detects correlation values between the received multicarrier signal and the replicas of synchronization signal. Each correlation value having a peak and a corresponding timing are stored in a correlation/timing memory 203. A timing detector 204 selects a maximum correlation value and a corresponding timing from the values stored in the correlation/timing memory 203. The selected timing is stored as a received timing of scrambling code in a memory 205. The received timing of scrambling code is used to calculate an FFT timing, which is also stored in the memory 205. The memory 205 provides the FFT timing to the GI remover 208 and the received timing of scrambling code to the scrambling code identification circuit 210 and the demodulation circuit 300.

After the detection of the scrambling code received timing by the detector of scrambling code received timing 200.1, the memory 205 provides the FFT timing to the GI remover 208. The GI remover 208 uses the FFT timing to remove the guard intervals from the received multicarrier signal. The GI-free multicarrier signal is input to the FFT unit 209, which separates the signal into N subcarrier components.

The scrambling code identification circuit 210.1 sets to each correlator 212 each of phases of scrambling code replicas generated by a generator of scrambling code replica 211 according to the received timing of scrambling code from the detector of scrambling code received timing 200.1. Each correlator 212 is provided for each of the N subcarriers. Each correlator 212 detects correlation value between each of the scrambling code replicas generated by the generator of scrambling code replica 211 and each of the N subcarrier components from the FFT unit 209. The detected correlation values are sent to an adder 213. The adder 213 adds up the correlation values of the N subcarriers for each of the scrambling code replicas, and the sum and a corresponding scrambling code number are stored in a correlation/code number memory 214. A scrambling code detector 215 selects a maximum correlation value and a corresponding code number from the values stored in the correlation/code number memory 214. The selected scrambling code number is sent to a demodulation circuit 300.

In the demodulation circuit 300 as precisely shown in FIG. 12, the received multicarrier signal from the antenna 199 is input to a FFT timing detector 302 and a GI remover 303, and the received timing of scrambling code detected in the detector of scrambling code received timing 200.1 and the scrambling code number identified in the scrambling code identification circuit 210.1 are input to a scrambling code generator 301.

The FFT timing detector 302 detects a FFT timing, i.e., an symbol timing from the received multicarrier signal. According to the FFT timing, guard intervals are removed from the received multicarrier signal, and the GI-free multicarrier signal is separated into N subcarrier components by an FFT unit 304. A channel estimator 305 estimates a channel variation of each subcarrier. Each of the N subcarriers is compensated by each estimated channel variation by each multiplier 306. Along a direction of the subcarriers, symbols on the variation-compensated subcarriers are multiplied by a scrambling code from the scrambling code generator 301 at multipliers 307. The symbols multiplied by the scrambling code are further multiplied by multipliers 308 with a corresponding short code generated by a short code generator 309 along the direction of the subcarriers. A summation unit 310 sums every SF symbols from the multipliers 308. The summed symbols are converted to parallel signals by a parallel-serial converter 311 and the converted serial signal. The serial signal after parallel-serial conversion is recovered to the original transmission data sequence through a data demodulator 312 and a decoder 313.

Figure 13:
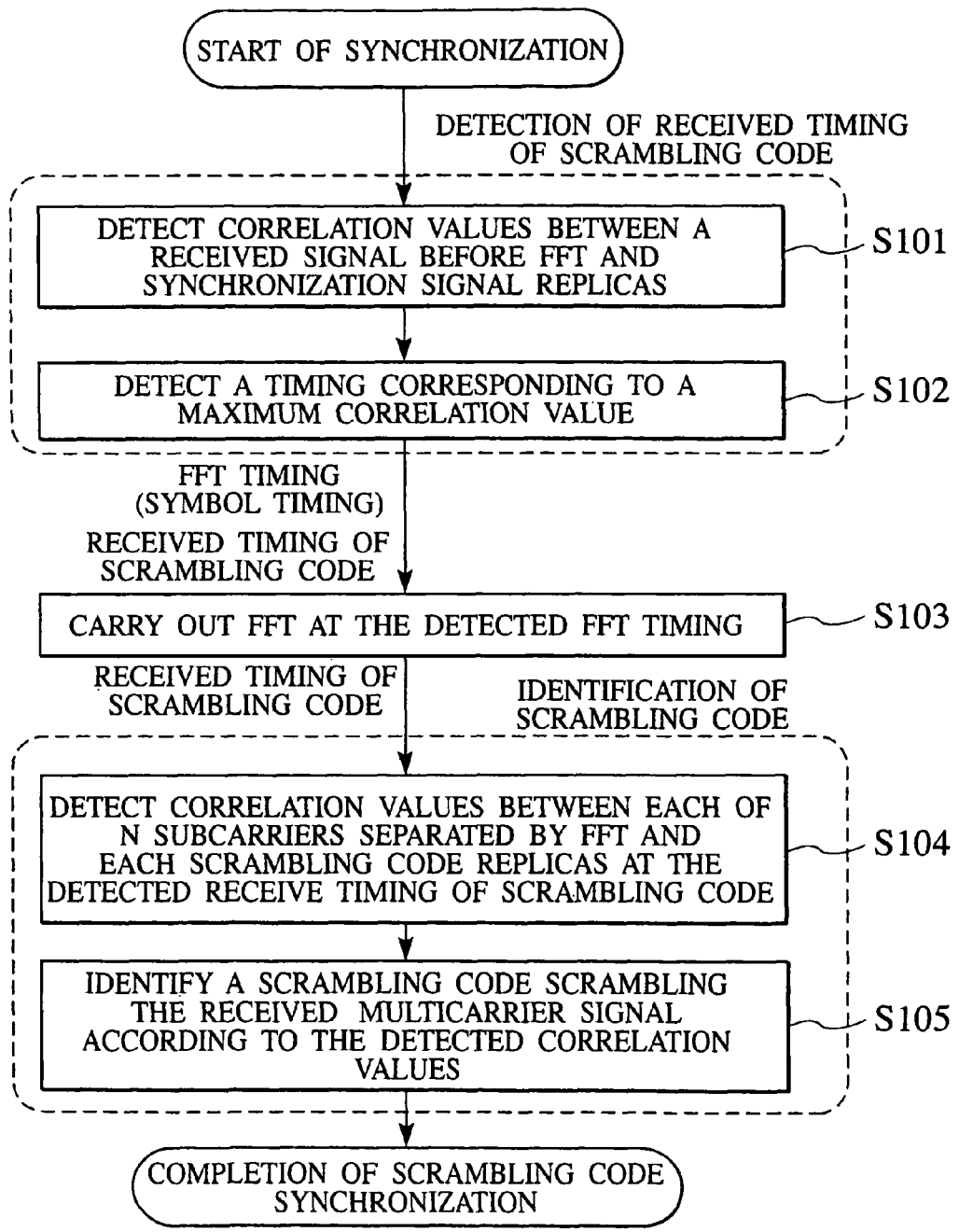
FIG. 13 is a flowchart showing a processing method for a received multicarrier signal carried out by the third embodiment of the receiver.

Referring to FIG. 13, a receiving method by the receiver 20.1 for an MC-CDMA transmission system will be explained. Step S101 detects correlation values between a received multicarrier signal containing all before-FFT subcarriers and a synchronization signal replica. Step S102 finds a timing corresponding to a maximum value among the detected correlation values, and based on which, obtains an FFT timing, i.e., a symbol timing and a received timing of scrambling code.

At the detected FFT timing, step S103 carries out an FFT to separate the multicarrier signal into N subcarrier components. Step S104 detects, at the detected received timing of scrambling code, a correlation value between each of the separated subcarrier components and each scrambling code replica. Step S105 identifies a scrambling code corresponding to a maximum correlation value as a scrambling code that is scrambling (spreading) the received multicarrier signal.

The demodulation circuit 300 in the receiver 20.1 descrambles the received multicarrier signal by using the identified scrambling code and recovers an original data sequence from the descrambled signal.

Figure 14:
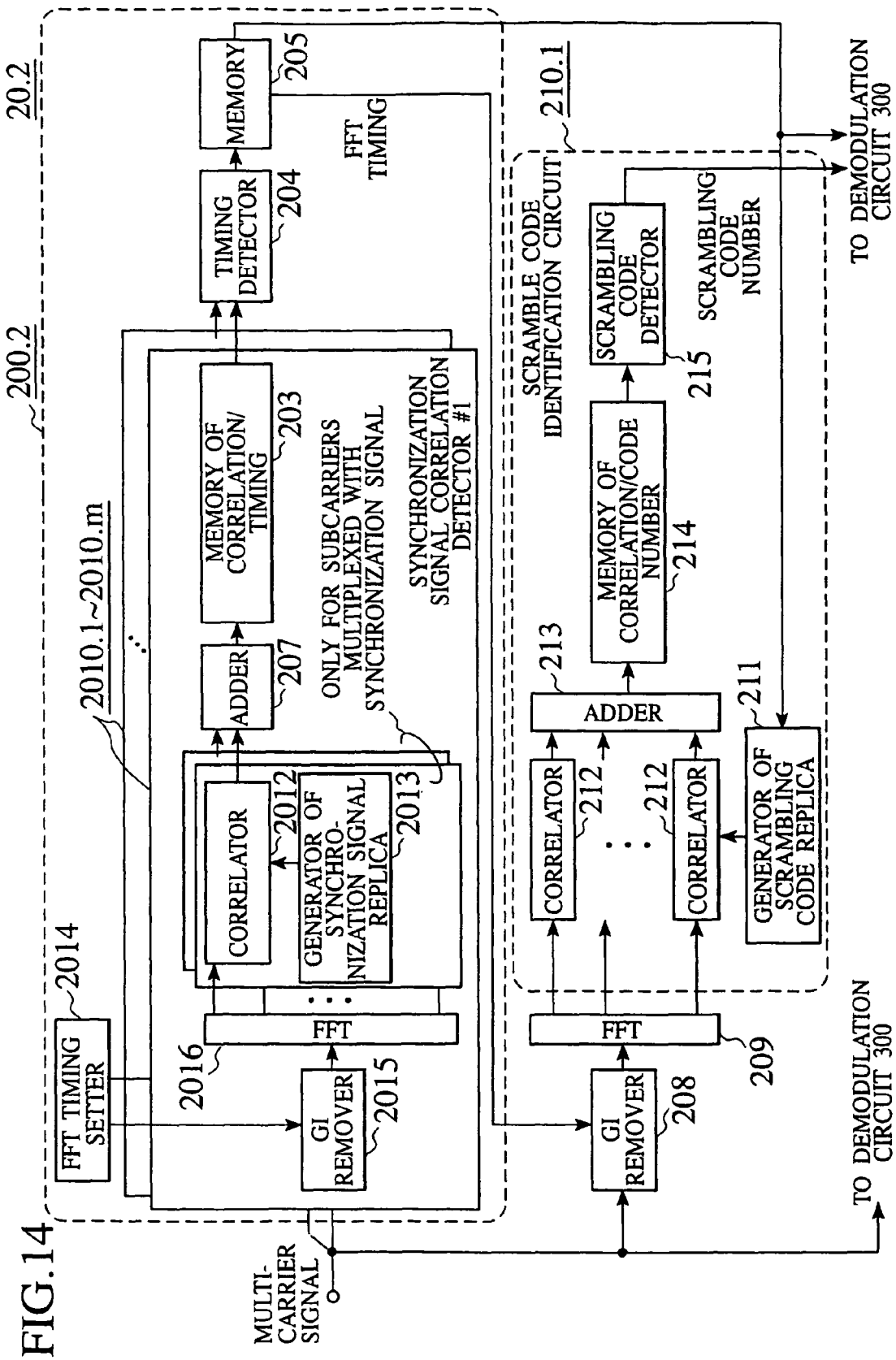
FIG. 14 is a block diagram of a fourth embodiment of a receiver for a mobile communication system of MC-CDMA according to the present invention.

Referring to FIG. 14, a receiver for an MC-CDMA transmission system as a fourth embodiment of the present invention will be explained. A functional configuration of the receiver 20.2 of this embodiment is identical with that of the receiver 20.1 of the third embodiment of the present invention shown in FIG. 10, though an inner configuration of a detector of scrambling code received timing 200.2 is slightly different from that of the third embodiment precisely shown in FIG. 11.

The detector of scrambling code received timing 200.2 inputs a multicarrier signal received by an antenna 199 (not shown in FIG. 14 but identical with that of FIG. 10) to each of multiple synchronization signal correlation detectors 2010.1-201.m. An FFT timing setter 2014 sets respectively different FFT timings for respective synchronization signal correlation detectors 2010.1-2010.m. A GI remover 2015 of each correlation detector 2010 removes guard intervals (GIs) from the multicarrier signal according to the set FFT timing. The GI-free multicarrier signal is input to an FFT unit 2016, which separates the signal into N subcarrier components. Each of subcarriers carrying synchronization signal thereon is input to each of multiple correlators 2012. Each of generators of synchronization signal replica 2013 generates a synchronization signal replica and input to the correlator 2012. Each correlator 2012 detects a correlation value and a corresponding timing of the synchronization signal and output the detected correlation value into an adder 207. The adder 207 adds up all of the detected correlation values from respective correlators 2012 in the same synchronization signal correlation detector 2010.x. A correlation/timing memory 203 stores the sum from the adder 207 and a corresponding timing.

A timing detector 204 detects a maximum correlation value and a corresponding timing among the correlation values, each of them is stored in each correlation/timing memory 203 of the synchronization signal correlation detectors 2010.1-2010.m. The detected timing is stored as a scrambling code received timing in a memory 205. According to the scrambling code received timing, a final FFT timing is calculated and also stored in the memory 205.

After the detection of the scrambling code received timing by the detector of scrambling code received timing 200.2, the memory 205 provides the FFT timing to the GI remover 208. By the same operations as explained referring to FIG. 11, the GI remover 208 removes guard intervals (GIs) from the received multicarrier signal, an FFT unit 209 carries out FFT operation to the GI-free multicarrier signal and an scrambling code identification circuit 210.1 identifies a scrambling code. In addition, a demodulation circuit 300 demodulates the received multicarrier signal into an original data sequence by the same operations as explained referring to FIG. 12.

Figure 15:
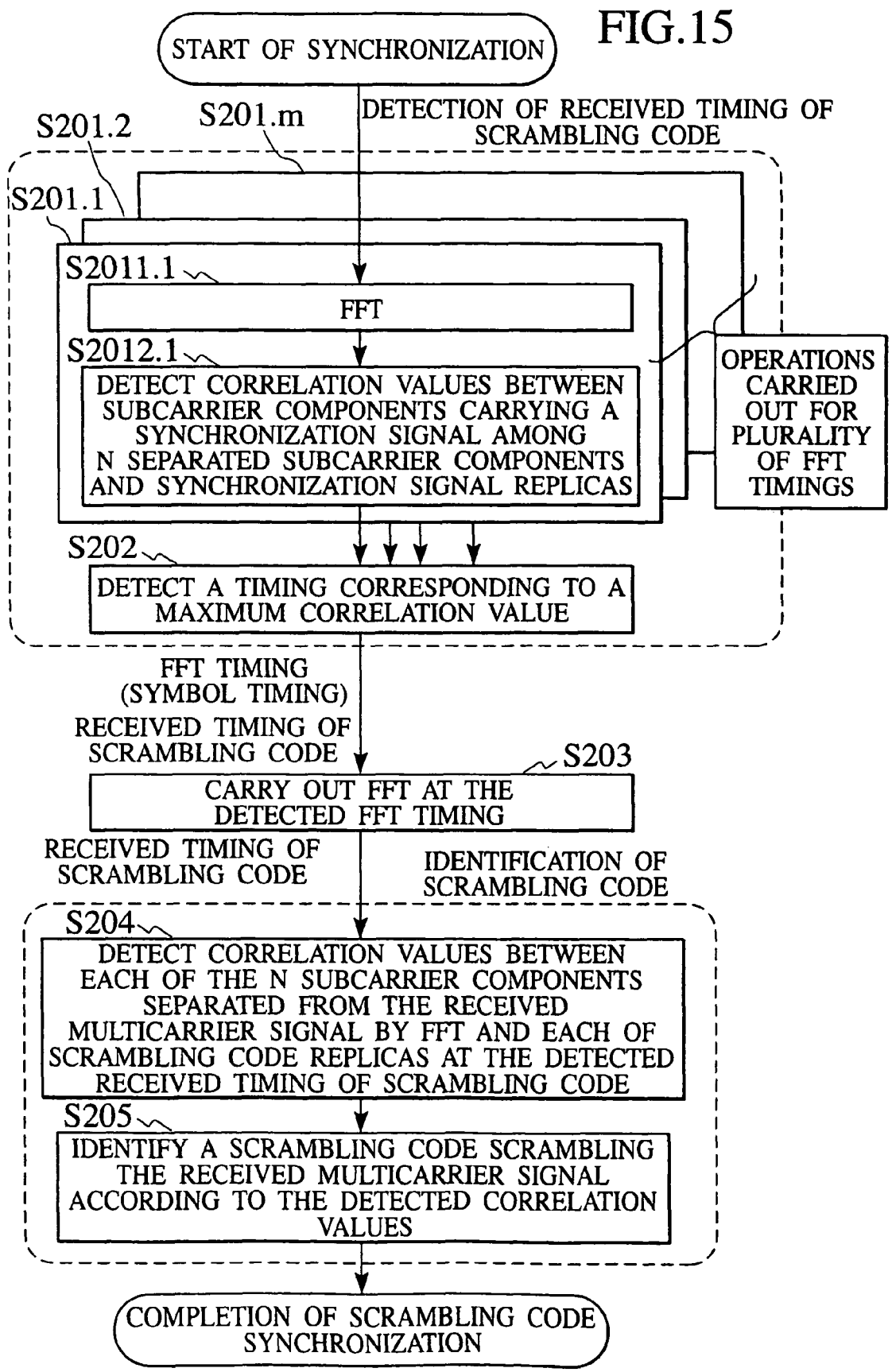
FIG. 15 is a flowchart showing a processing method for a received multicarrier signal carried out by the fourth embodiment of the receiver.

FIG. 15 is a flowchart showing a receiving method for MC-CDMA transmission carried out by the receiver 20.2. Step S2011.1 carries out FFT at a given FFT timing, to separate a received multicarrier signal into N subcarrier components. For the given FFT timing, step S2012.1 detects correlation values between subcarrier components that contain a synchronization signal among the subcarrier components and the synchronization signal replicas. These operations are carried out for a plurality of FFT timings in steps S201.1 to S201.m. Step S202 detects a timing corresponding to a maximum correlation value as a scrambling code received timing. The FFT timing that provides the maximum correlation value is set as a final FFT timing.

At the detected FFT timing, step S203 carries out FFT, to separate the received multicarrier signal into N subcarrier components. According to the detected scrambling code received timing, step S204 detects correlation values between each of the separated subcarrier components and each of scrambling code replicas. Step S205 determines a scrambling code corresponding to a maximum correlation value as a scrambling code that is scrambling the received multicarrier signal.

The demodulation circuit 300 in the receiver 20.2 descrambles the received multicarrier signal by using the identified scrambling code and recovers an original data sequence from the descrambled signal.

Figure 16:
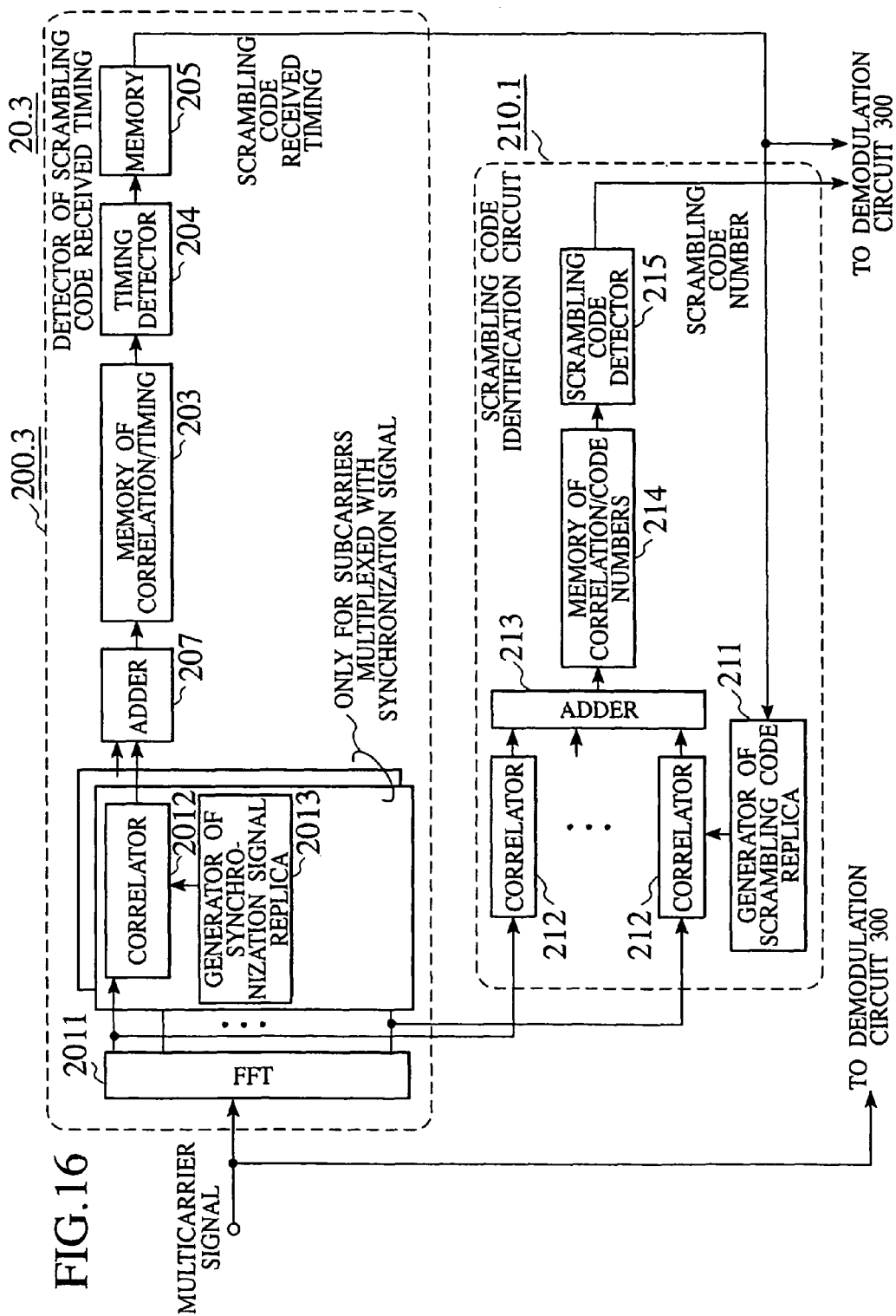
FIG. 16 is a block diagram of a fifth embodiment of a receiver for a mobile communication system of MC-CDMA according to the present invention.

Referring to FIGS. 16 and 12, a receiver for an MC-CDMA transmission system as a fifth embodiment of the present invention will be explained. The receiver 20.3 comprises an antenna for multicarrier wireless signal 199 (not shown in FIG. 16 but identical with that of FIG. 10), a detector of scrambling code received timing 200.3, a scrambling code identification circuit 210.1 and a demodulation circuit 300.

The detector of scrambling code received timing 200.3 inputs a received multicarrier signal and separates it to multiple subcarrier components by a FFT unit 2011. Each of limited subcarriers, which are carrying synchronization signal thereon, is input to each of multiple correlators 2012. Each of generators of synchronization signal replica 2013 generates synchronization signal replicas and input to each of the correlators 2012. Each correlator 2012 detects a correlation value and a corresponding timing of the synchronization signal and output the detected correlation value into an adder 207. The adder 207 adds up every detected correlation values with the same synchronization signal timing from respective correlators 2012. A correlation/timing memory 203 stores the sums from the adder 207 and corresponding timings.

A timing detector 204 detects a maximum correlation value and a corresponding timing among the sums of the correlation values stored in the correlation/timing memory 203. The detected timing is stored as a scrambling code received timing in a memory 205.

After the detection of the scrambling code received timing by the detector of scrambling code received timing 200.3, the memory 205 provides the detected scrambling code received timing to an scrambling code identification circuit 210.1 of the same configuration as shown in FIG. 11. Each subcarrier components separated by the FFT unit 2011 is input to each correlator 212 of the scrambling code identification circuit 210.1. A scrambling code replica generator 211 generates multiple scrambling code replicas one by one at a time and inputs to each correlator 212.

Each correlator 212 detects correlation value between the given scrambling code replica from the replica generator 211 and each of the separated subcarrier components from the FFT unit 2011. The detected correlation values are sent to an adder 213. The adder 213 adds up the correlation values of the N subcarriers for each of the scrambling code replicas, and the sum and a corresponding scrambling code number are stored in a correlation/code number memory 214. A scrambling code detector 215 selects a maximum correlation value and a corresponding code number from the values stored in the correlation/code number memory 214. The selected scrambling code number is sent to the demodulation circuit 300.

Demodulation operation to the received multicarrier signal carried out in the demodulation circuit 300 is identical with that explained referring to FIG. 12 hereinbefore.

Figure 17:
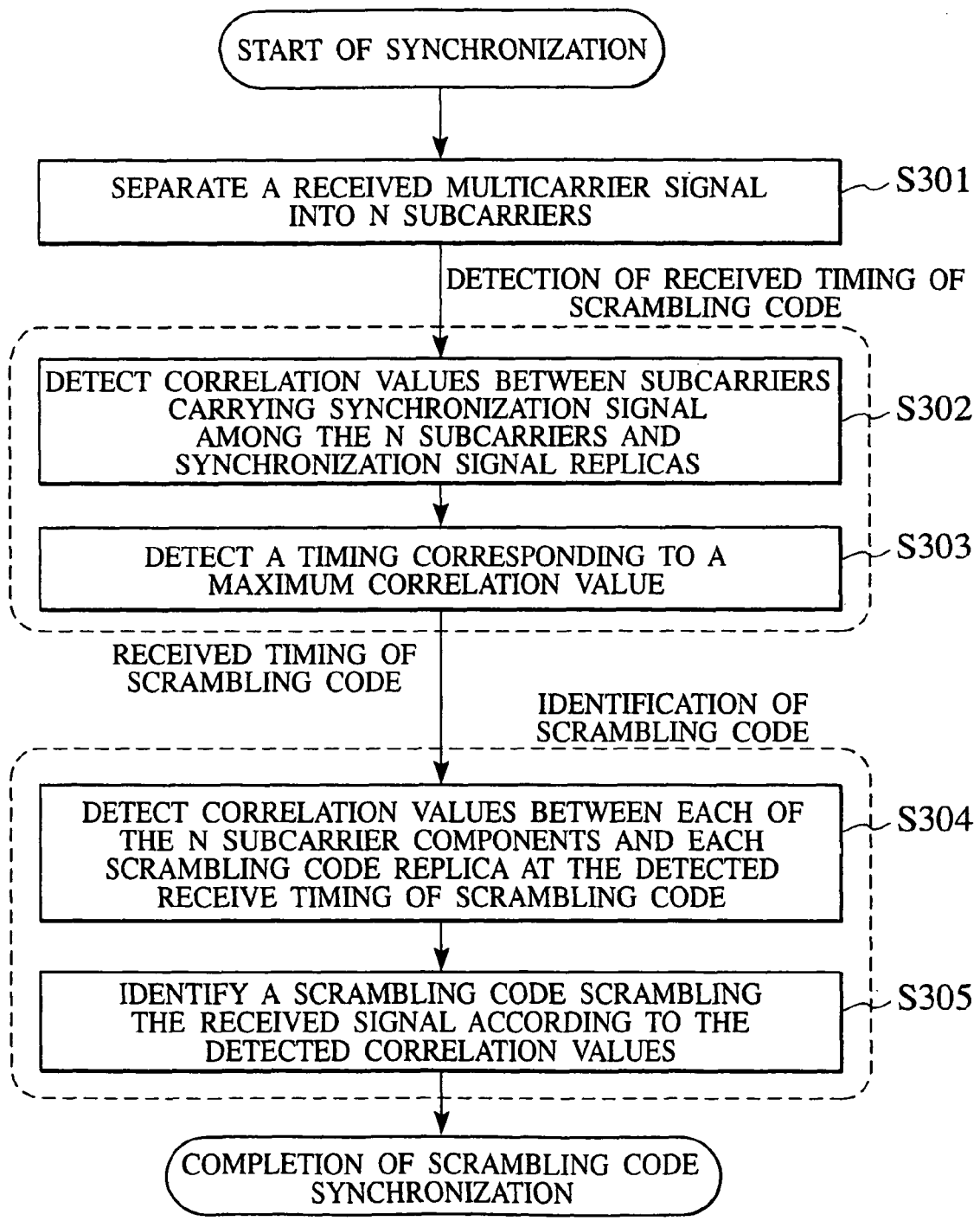
FIG. 17 is a flowchart showing a processing method for a received multicarrier signal carried out by the fifth embodiment of the receiver.

FIG. 17 is a flowchart showing a receiving method for MC-CDMA transmission carried out by the receiver 20.3 shown in FIG. 16. Step S301 separates a received multicarrier signal into N subcarrier components through the DFT unit 201 or the like. Step S302 detects correlation values between subcarriers that carry a synchronization signal among the separated subcarrier components and synchronization signal replicas. Step S303 detects a timing corresponding to a maximum correlation value as a scrambling code received timing among the correlation values.

According to the detected scrambling code received timing, step S304 detects correlation values between the separated subcarrier components and each of scrambling code replicas. Step S305 determines a scrambling code replica corresponding to a maximum correlation value as a scrambling code that is scrambling the received signal.

The demodulation circuit 300 in the receiver 20.3 also descrambles the received multicarrier signal by using the identified scrambling code and recovers an original data sequence from the descrambled signal.

Figure 18:
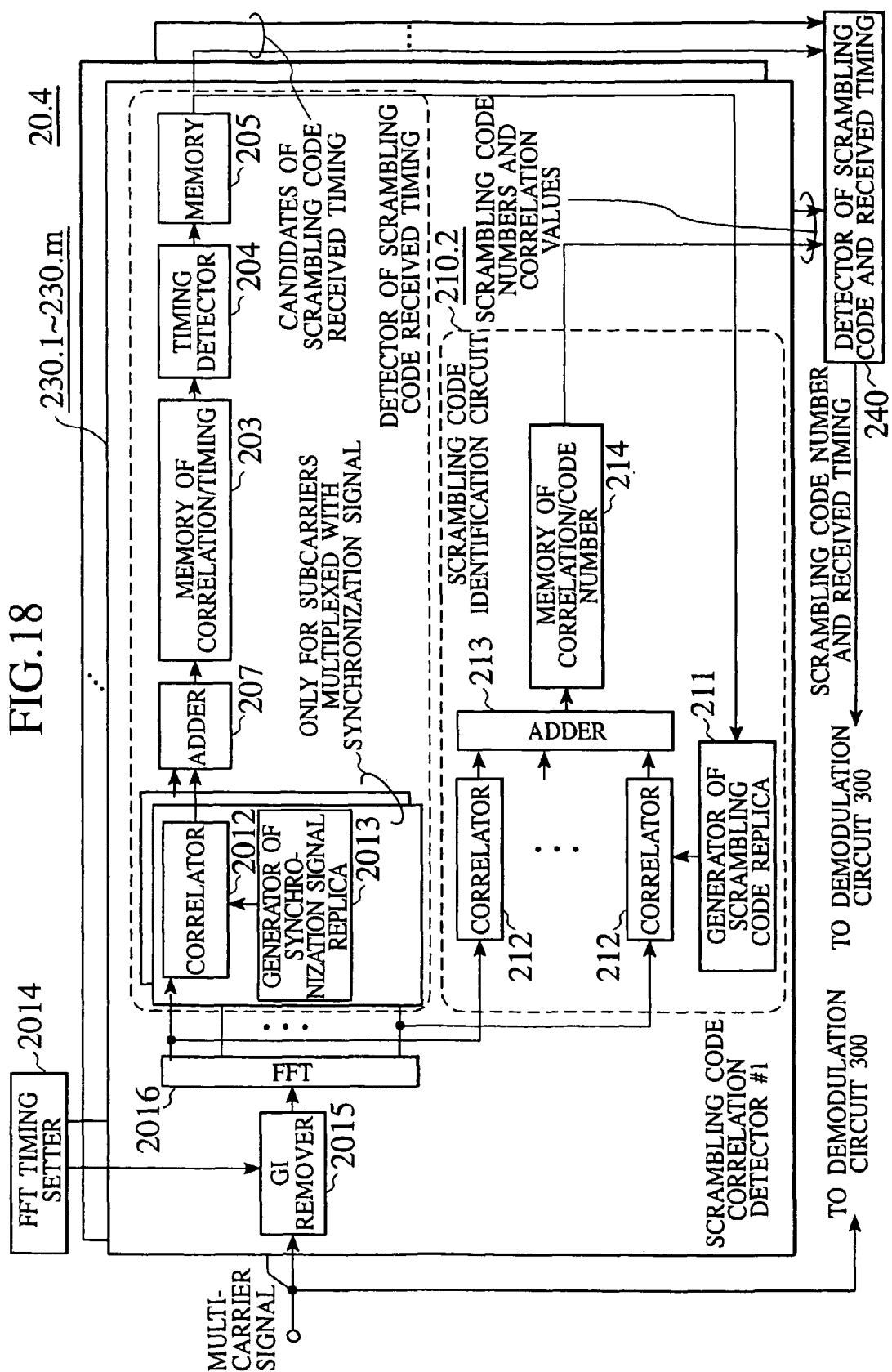
FIG. 18 is a block diagram of a sixth embodiment of a receiver for a mobile communication system of MC-CDMA according to the present invention.

Referring to FIGS. 18 and 12, a receiver for an MC-CDMA transmission system as a sixth embodiment of the present invention will be explained. The receiver 20.4 comprises an antenna for multicarrier wireless signal 199 (not shown in FIG. 18 but identical with that of FIG. 10), m scrambling code correlation detectors 2301.1-2301.m, an FFT timing setter 2014 for setting respectively different FFT timings to respective m correlation detectors 2301.1-2301.m, a detector of scrambling code and received timing 240 and a demodulation circuit 300. Each of the scrambling code correlation detectors 230.1-230.m comprises a GI remover 2015, an FFT unit 2016, a timing of scrambling code detector 200.3, which is the same as that of FIG. 16, and a scrambling code identification circuit 210.2. A precise configuration of the demodulation circuit 300 is the same as that of FIG. 12.

A multicarrier signal received by the antenna 199 is input to each scrambling code correlation detector 230.x. The FFT timing setter 2014 sets respectively different FFT timings for the scrambling code correlation detectors 230.1-230.m, respectively. In each scrambling code correlation detector 230.x, the GI remover 2015 removes guard intervals (GIs) from the multicarrier signal according to the set FFT timing. The GI-free multicarrier signal is supplied to an FFT unit 2016, which separates the signal into N subcarrier components. Thereafter, operations carried out by a correlator 2012, a replica of synchronization signal generator 2013, and an adder 207 are the same as those of FIG. 16. A correlation/timing memory 203 stores correlation values and corresponding timings from the adder 207.

A timing detector 204 selects a maximum correlation value and a corresponding timing from the values stored in the correlation/timing memory 203. The selected timing is stored as a candidate of scrambling code received timing in a memory 205.

After detecting the candidate of scrambling code received timing, in the scrambling code identification circuit 210.2, a scrambling code replica generator 211 sets a scrambling code replica according to the candidate of scrambling code received timing provided by the detector of scrambling code received timing 200.3. Each correlator 212 detects correlation values between the scrambling code replica generated by the scrambling code replica generator 211 and the respective subcarriers output from the FFT unit 2016. The detected correlation values are supplied to an adder 213. The adder 213 adds up the correlation values. The sum and a corresponding scrambling code number are stored in a correlation/code number memory 214.

The detector of scrambling code and received timing 240 selects a maximum correlation value and a corresponding code number from the values respectively stored in the correlation/code memories 214. According to the maximum correlation value, an optimum received timing of scrambling code is selected among the values respectively stored in the memories 205 in the respective scrambling code correlation detectors 230.1-230.m. The selected scrambling code number and scrambling code received timing are transferred to the demodulation circuit 300.

Demodulation operation to the received multicarrier signal carried out in the demodulation circuit 300 is identical with that explained referring to FIG. 12 herein-before.

Figure 19:
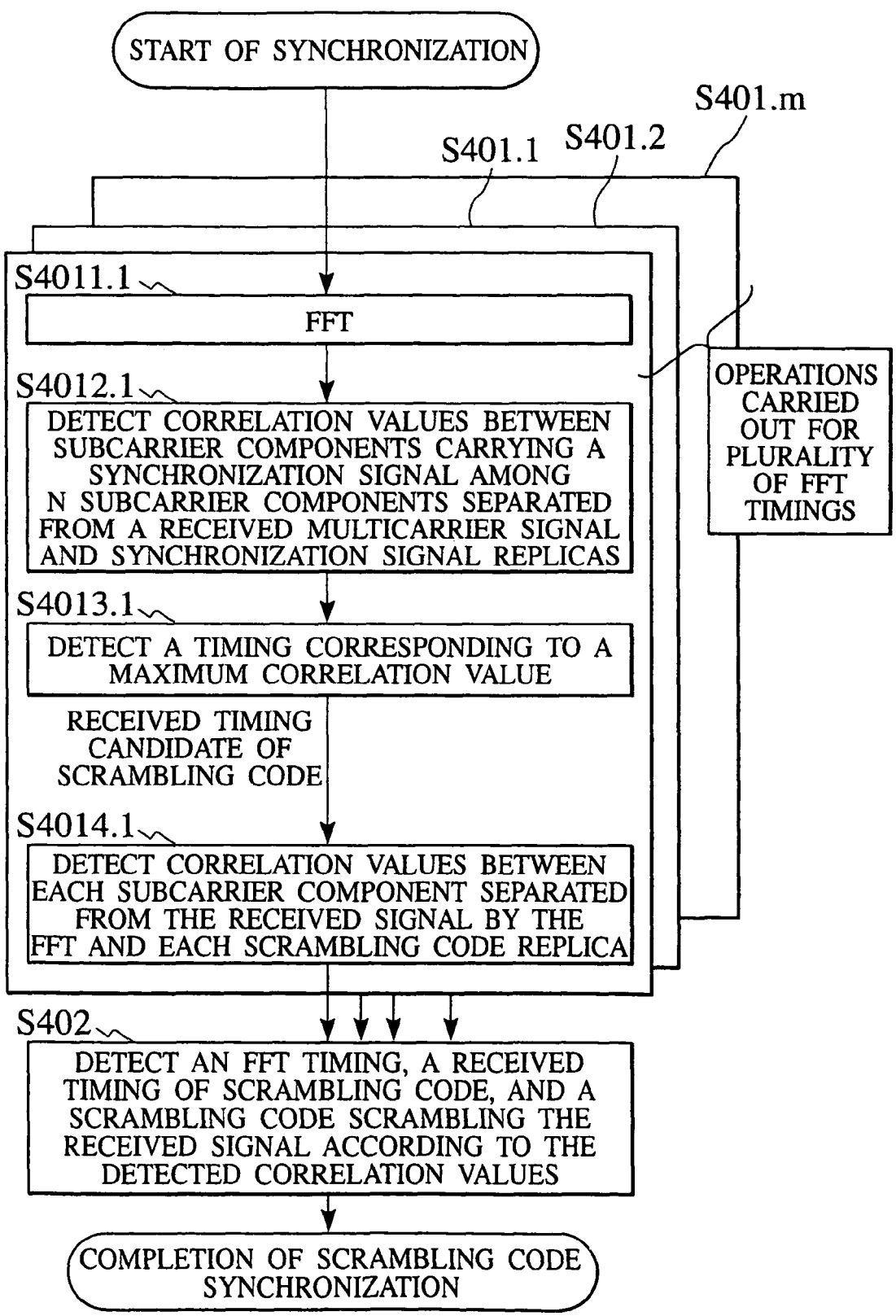
FIG. 19 is a flowchart showing a processing method for a received multicarrier signal carried out by the sixth embodiment of the receiver.

FIG. 19 is a flowchart showing a receiving method for MC-CDMA transmission carried out by the receiver 20.4 shown in FIG. 18. Step S4011.1 carries out FFT at a given FFT timing, to separate a received multicarrier signal into N subcarrier components. For the given FFT timing, step S4012.1 detects correlation values between respective subcarriers that contain a synchronization signal among the N subcarriers and the synchronization signal replica. For the given FFT timing, step S4013.1 detects a timing corresponding to a maximum correlation value as a candidate of scrambling code received timing. At the candidate of scrambling code received timing, step S4014.1 detects correlation values between each of the N subcarriers and each of scrambling code replicas. These operations are carried out for a plurality of FFT timings set by the FFT timing setter 2014 (Steps S401.1 to S401.m).

Based on the correlation values detected at all FFT timings, step S402 finds an optimum FFT timing, a received timing of scrambling code and a scrambling code number that is scrambling the received multicarrier signal.

The demodulation circuit 300 in the receiver 20.4 also descrambles the received multicarrier signal by using the identified scrambling code and recovers an original data sequence from the descrambled signal.

Figure 20:
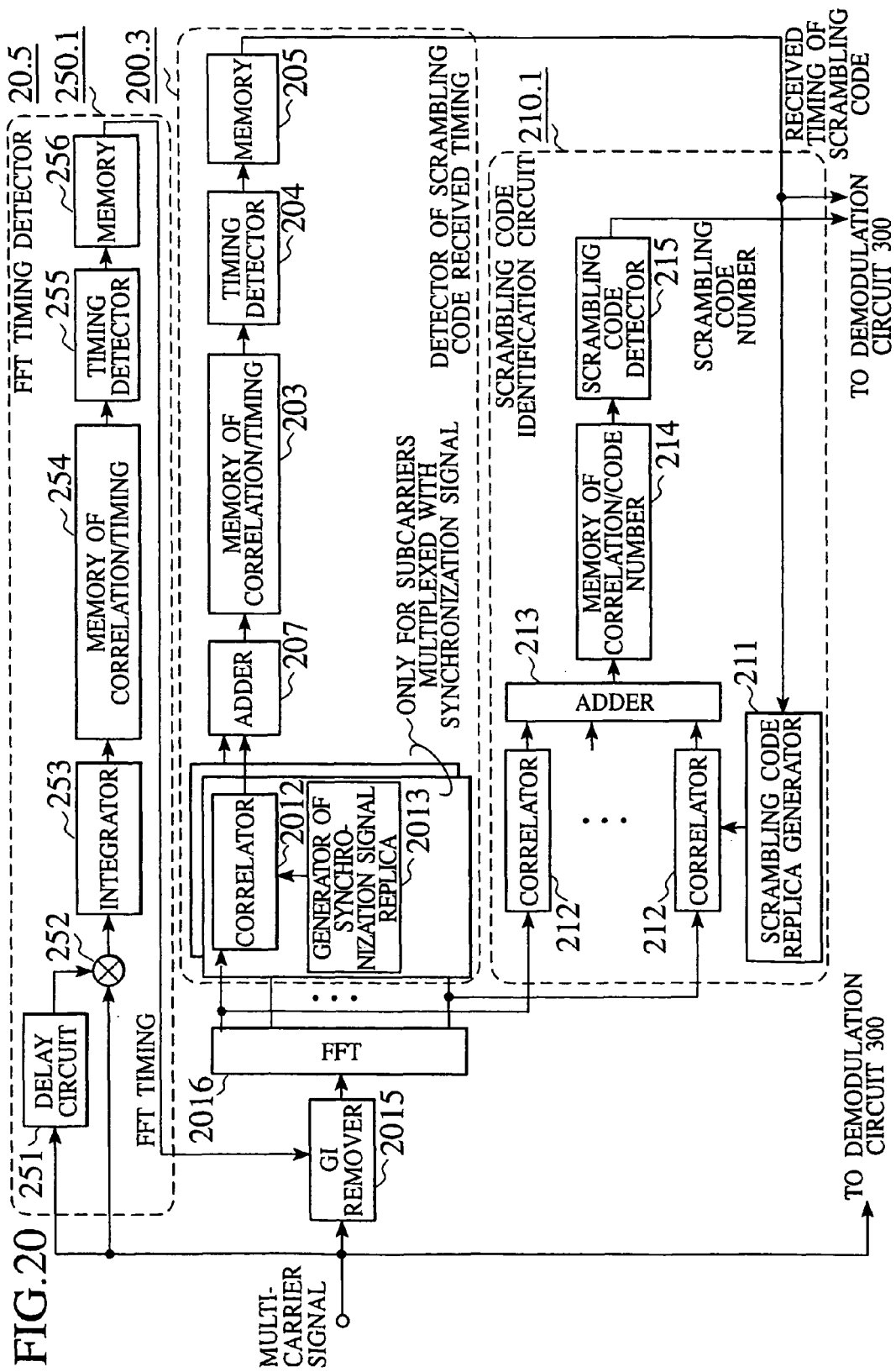
FIG. 20 is a block diagram of a seventh embodiment of a receiver for a mobile communication system of MC-CDMA according to the present invention.

Referring to FIGS. 20 and 12, a receiver for an MC-CDMA transmission system as a seventh embodiment of the present invention will be explained. The receiver 20.5 comprises an antenna for wireless multicarrier signal 199 (not shown in FIG. 20 but identical with that of FIG. 10), an FFT timing detector 250.1, a GI remover 2015, an FFT unit 2016, a detector of scrambling code received timing 200.3 a scrambling code identification circuit 210.1 and a demodulation circuit 300. The GI remover 2015, the FFT unit 2016 and the detector of scrambling code received timing 200.3 are identical with those of FIG. 18, and the scrambling code identification circuit 210.1 is identical with that of FIG. 16. The demodulation circuit 300 is identical with that of FIG. 12.

A multicarrier signal received by the antenna 199 is input to the FFT timing detector 250.1. A delay circuit 251 delays the input multicarrier signal by one symbol time-length. A multiplier 252 multiplies the input multicarrier signal by the delayed signal from the delay circuit 251. The product signal is sent to an integrator 253. The integrator 253 integrates the product signal over every one guard interval and detects correlation values. The detected correlation values and corresponding timings are stored in a correlation/timing memory 254.

A timing detector 255 selects a maximum correlation value and a corresponding timing from the values stored in the correlation/timing memory 254. The selected timing is stored as an FFT timing in a memory 256.

According to the FFT timing stored in the memory 256, the GI remover 2015 removes guard intervals (GIs) from the received multicarrier signal. The guard-interval-free multicarrier signal is supplied to the FFT unit 2016, which separates the signal into N subcarrier components by using the FFT timing from the memory 256 and inputs the subcarriers to the detector of scrambling code received timing 200.3. Operations carried out in the detector of scrambling code received timing 200.3 are the same as those of FIG. 18, and a detected scrambling code received timing is stored in a memory 205.

After the operations for detecting the received timing of scrambling code, the scrambling code identification circuit 210.1 identifies a scrambling code number by the same manner as that of FIG. 16, and the identified scrambling code number is input to the demodulation circuit 300.

Demodulation operation to the received multicarrier signal carried out in the demodulation circuit 300 is identical with that explained referring to FIG. 12.

Figure 21:
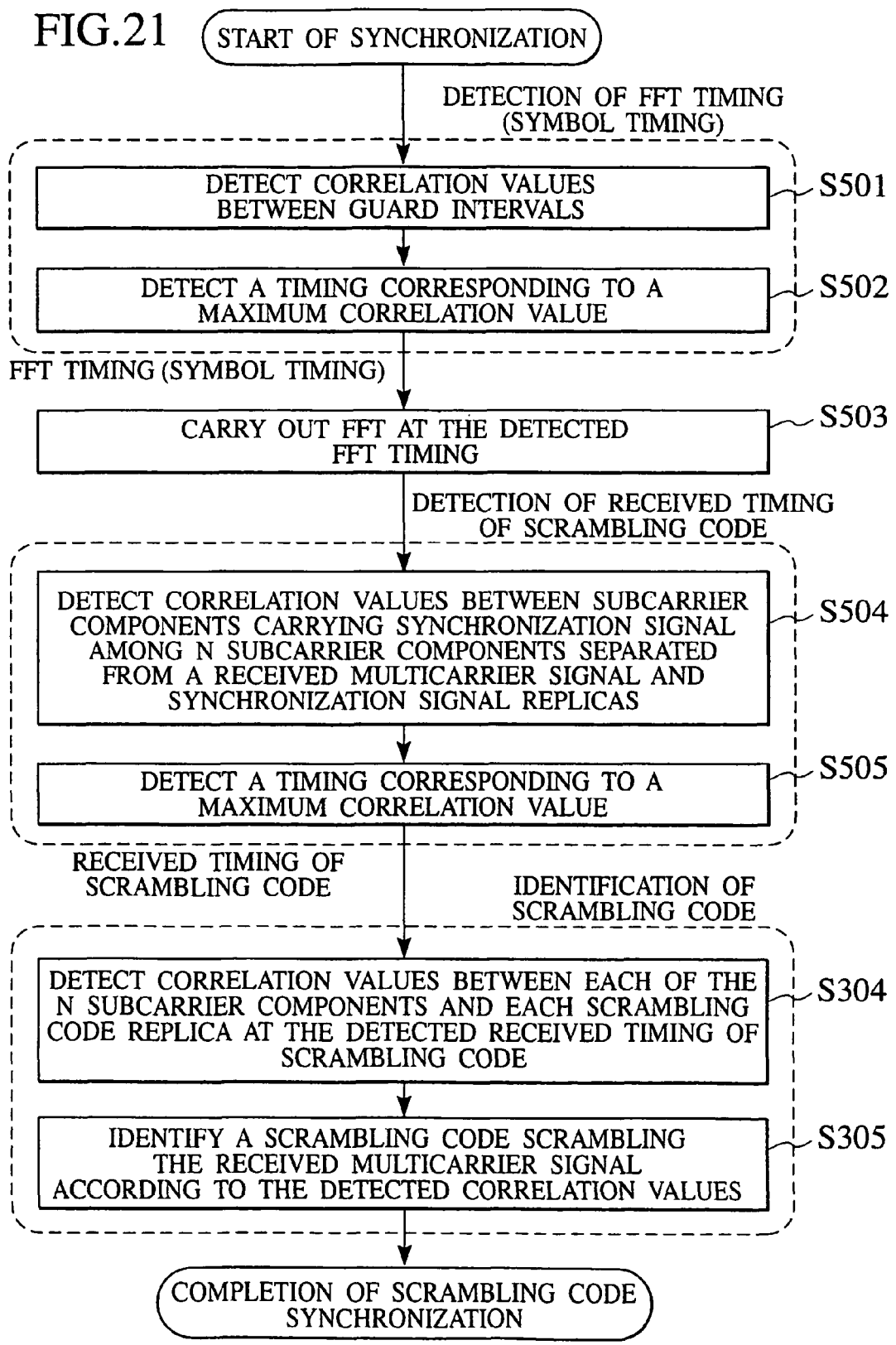
FIG. 21 is a flowchart showing a processing method for a received multicarrier signal carried out by the seventh embodiment of the receiver.

FIG. 21 is a flowchart showing a receiving method for MC-CDMA transmission carried out by the receiver 20.5 shown in FIG. 20. Step S501 detects correlation values between a received signal containing all before-FFT subcarriers and a signal that is formed by delaying the received signal by a symbol length (excluding a guard interval). Step S502 finds a timing corresponding to a maximum correlation value as an FFT timing. At the detected FFT timing, step S503 carries out FFT to separate the received multicarrier signal into N subcarrier components.

Step S504 detects correlation values between m subcarriers that carry a synchronization signal among the separated N subcarriers and the synchronization signal replica. Step S505 determines a timing corresponding to a maximum correlation value as a scrambling code received timing.

Subsequently, detecting a scrambling code that is scrambling the received multicarrier signal is carried out according to steps S304 and S305 of the flowchart of FIG. 17.

The demodulation circuit 300 in the receiver 20.5 also descrambles the received multicarrier signal by using the identified scrambling code and recovers an original data sequence from the descrambled signal.

Referring to FIGS. 22 to 25, a receiver for an MC-CDMA transmission system as an eighth embodiment of the present invention will be explained.

As explained referring to FIGS. 20 and 21 hereinbefore, one of the receiving techniques for MC-CDMA transmission system retrieves one symbol timing (equivalent to an FFT timing) corresponding a maximum value among the plural correlation values, those are accumulated by using correlation of the guard intervals.

For a mobile communication system using the MC-CDMA transmission technique, however, the maximum correlation value to be detected among the plural correlation values is dependent not only on a received signal attenuation, i.e., a distance attenuation and a path loss due to shadowing but also on the total transmission power of each base station. Accordingly, if base stations in the mobile communication system involve different transmission powers, a receiver station may erroneously choose a base station having a large transmission power instead of a correct base station having an optimum receiving level per channel.

Figure 22:
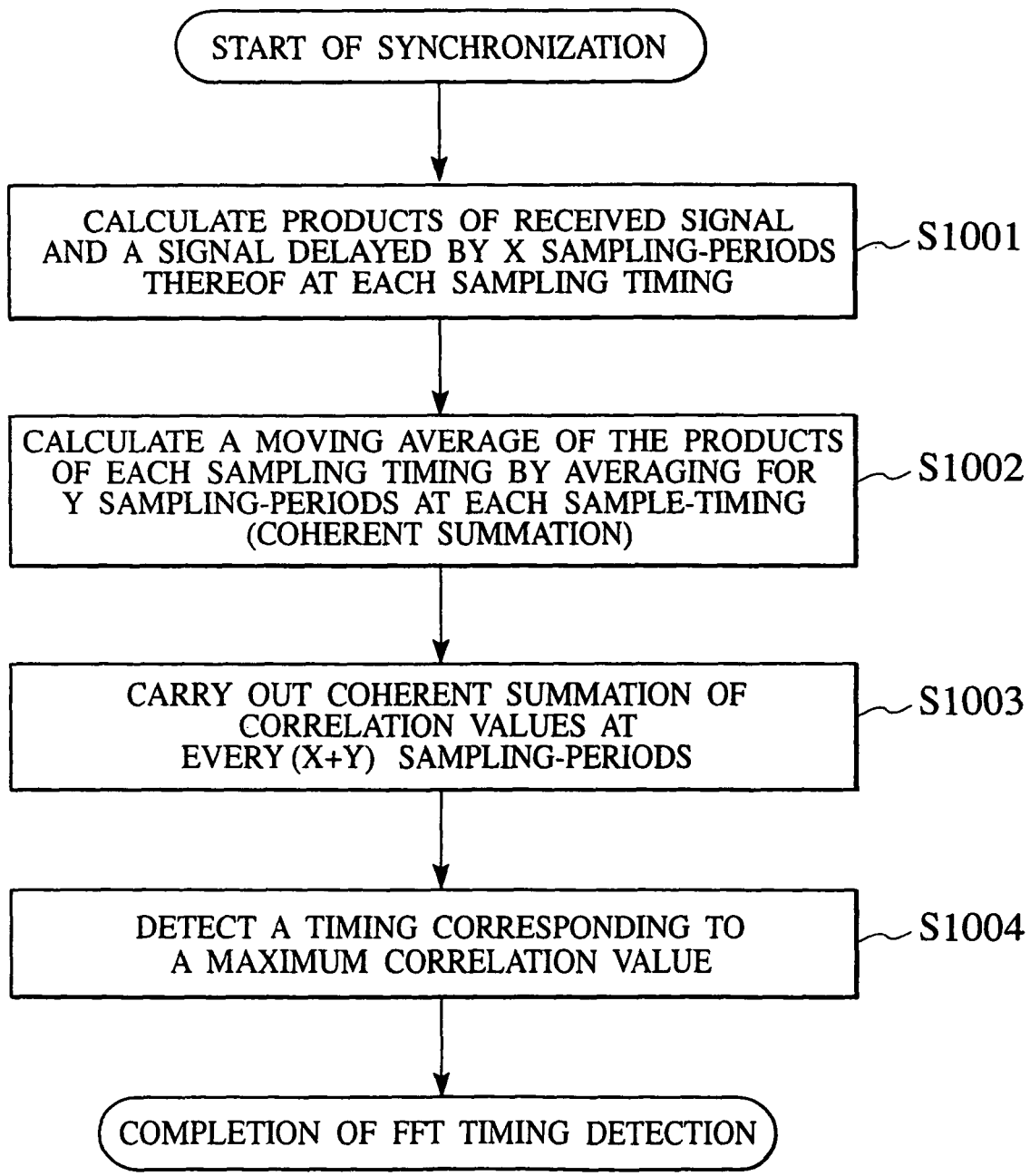
FIG. 22 shows an ordinary processing method for a received multicarrier signal to detect a FFT timing.
Figure 23:
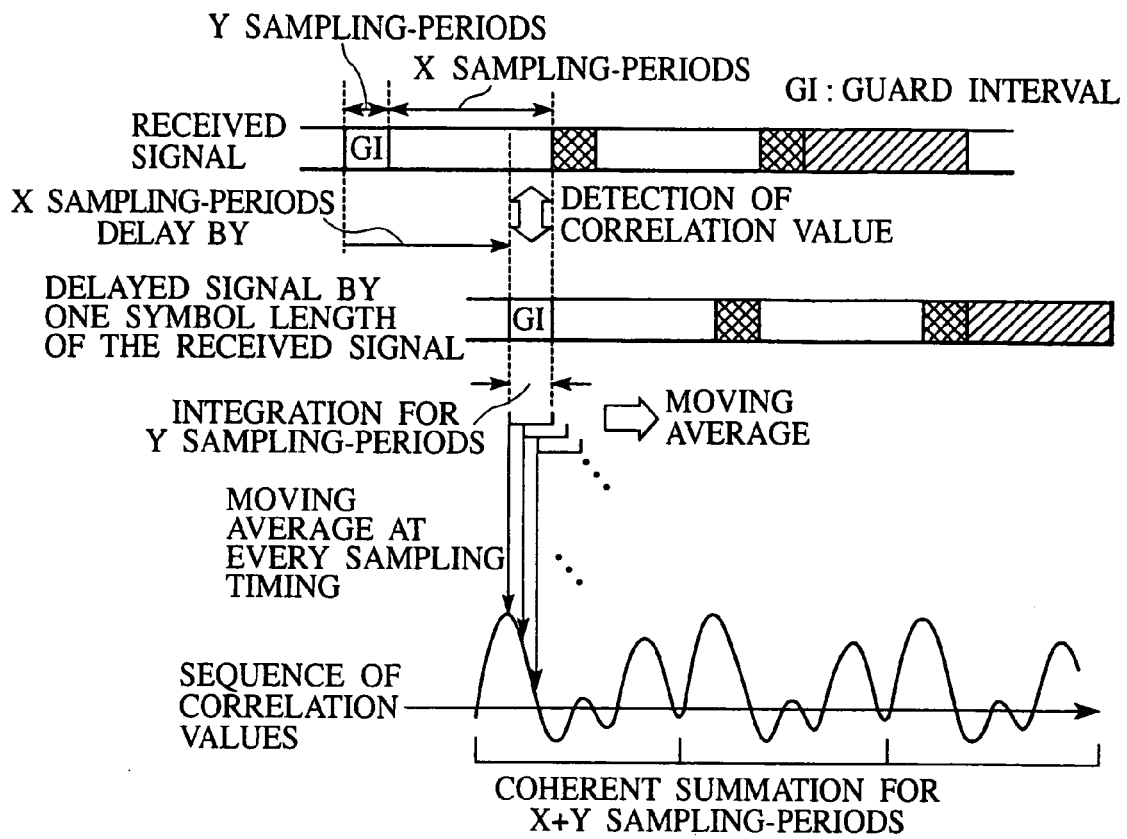
FIG. 23 is an explanatory view showing the ordinary processing method for the received multicarrier signal to detect a FFT timing.

This problem will be precisely explained hereinafter. A flowchart of FIG. 22 shows a method of FFT timing candidate detection by correlation to the guard intervals, which is carried out by the receiver of FIG. 20. FIG. 23 shows the principle of the method.

A synchronization timing of received symbol is a timing to receive the start of information symbol excluding a guard interval and is equivalent to an FFT start timing. In the following explanation, therefore, the received symbol synchronization timing is referred to as "FFT timing." Further, the length of one symbol is defined as X sampling periods, and the length of a guard interval as Y sampling periods.

Figure 24:
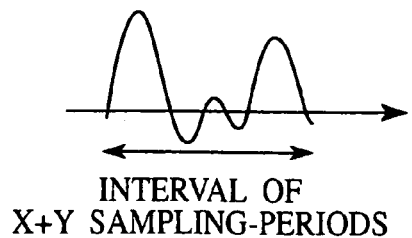
FIG. 24 is a diagram showing an example of a sequence of correlation values detected by the ordinary processing method shown in FIGS. 22 and 23.

According to the flowchart of FIG. 22, step S1001 multiplies, at every sampling timing, a received signal before FFT containing all subcarriers by a delayed signal of the received signal by one symbol length (X sampling periods), to provide products. Step S1002 calculates moving averages of the products in each averaging period that starts from a sampling timing and is equal to Y sampling periods, to provide a sequence of correlation values. Step S1003 carries out coherent summation to the sequence of correlation values for every (X+Y) sampling periods and provides a sequence of correlation values of (X+Y) sampling periods. FIG. 24 shows an example of the sequence of correlation values of (X+Y) sampling periods. Based on the sequence of correlation values of (X+Y) sampling periods of FIG. 24, step S1004 detects, as an FFT timing, a timing corresponding to a maximum correlation value.

The maximum correlation value to be detected in the sequence of correlation values of FIG. 24 is dependent not only on a received signal attenuation, i.e., a distance attenuation and a path loss due to shadowing but also on the total transmission power of each base station (cell). If base stations in the mobile communication system involve different transmission powers, a receiver station (a mobile station) may erroneously choose a base station having a large transmission power instead of a correct base station having an optimum receiving level per channel, i.e., a smallest path loss. If there are base stations 1 and 2 with the base station 1 having less communication channels than the base station 2 and if an optimum base station for a mobile station is the base station 1, there will be a risk for the mobile station of erroneously choosing the base station 2 having a larger number of communication channels.

Figure 25:
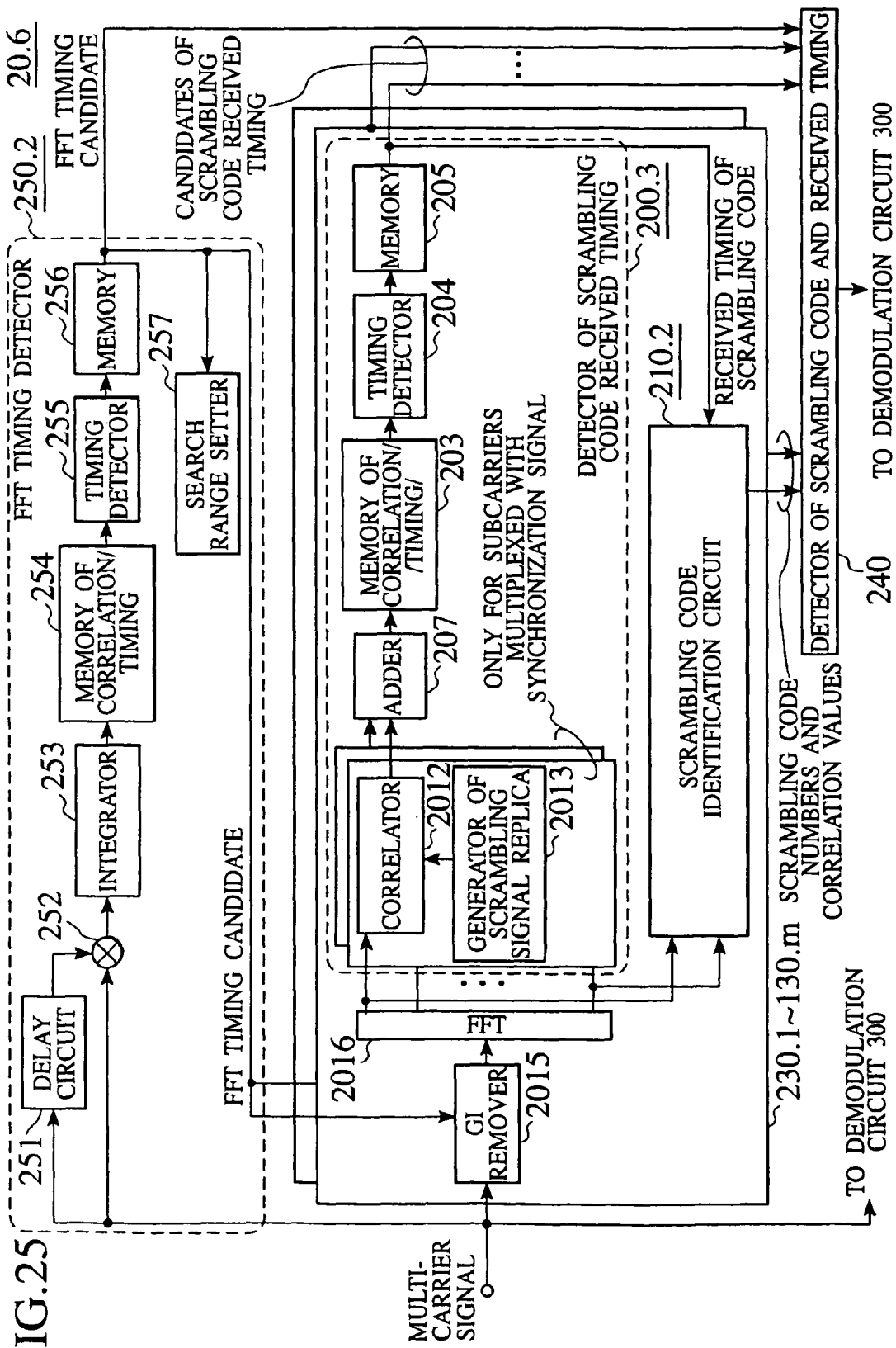
FIG. 25 is a block diagram of an eighth embodiment of a receiver for a mobile communication system of MC-CDMA according to the present invention.

FIG. 25 shows a receiver of the eighth embodiment for MC-CDMA transmission system that solves the problems set forth hereinbefore. The receiver 20.6 comprises an antenna for wireless multicarrier signal 199 (not shown in FIG. 25 but identical with that of FIG. 10), an FFT timing detector 250.2, m scrambling code correlation detectors 230.1-230.m, a scrambling code and received timing detector 240 and a demodulation circuit 300 as shown in FIG. 12.

A multicarrier signal received by the antenna 199 is input to the FFT timing detector 250.2. A delay circuit 251 delays the input multicarrier signal by one symbol time-length. A multiplier 252 multiplies the input multicarrier signal by the delayed signal from the delay circuit 251. The product signal is sent to an integrator 253. The integrator 253 integrates the product signal over every one guard interval and detects correlation values. The detected correlation values and corresponding timings are stored in a correlation/timing memory 254.

A timing detector 255 selects a maximum correlation value and a corresponding timing from the values stored in the correlation/timing memory 254. The selected timing is stored as an FFT timing candidate #1 in a memory 256. A search range setter 257 sets a search range according to the FFT timing candidate in the memory 256 and the values in the correlation/timing memory 24. Various methods are usable for this search range setting. Those methods will be explained hereinafter. Within the search range set by the search range setter 257, the timing detector 255 selects a maximum correlation value and a corresponding timing from the values in the correlation/timing memory. The selected timing is stored as an FFT timing candidate #2 in the memory 256. These operations are repeated to detect a predetermined number of FFT timing candidates.

The scrambling code correlation detectors 230.1-230.$m$ are provided for respective m FFT timing candidates detected by the FFT timing detector 250.2. The configuration of each of the scrambling code correlation detectors 230.1- 230.$m$ is identical with that of FIG. 18, and it comprises a GI remover 2015, an FFT unit 2016, a detector of scrambling code received timing 200.3 and a scrambling code identification circuit 210.2.

The respective FFT timing candidates from the FFT timing detector 250.2 are supplied to the respective scrambling code correlation detectors 230.1-230.$m$. Each scrambling code correlation detector 230.$x$ carries out the same operations with those of FIG. 18. Namely, a GI remover 2015 removes guard intervals (GIs) from the multicarrier signal received by the antenna 199 according to the set FFT timing candidate from the FFT timing detector 250.2. The GI-free multicarrier signal is supplied to an FFT unit 2016, which separates the signal into N subcarrier components. Thereafter, operations carried out by a correlator 2012, a replica of synchronization signal generator 2013, and an adder 207 are the same as those of FIG. 16. A correlation/timing memory 203 stores correlation values and corresponding timings from the adder 207. A timing detector 204 selects a maximum correlation value and a corresponding timing from the values stored in the correlation/timing memory 203. The selected timing is stored as a candidate of scrambling code received timing in a memory 205. Consequently, m received timing candidates of scrambling code are obtained by m scrambling code correlation detector 230.1-230.$m$, respectively.

After detecting the candidate of scrambling code received timing, the scrambling code identification circuit 210.2 in each scrambling code correlation detector 230.$x$ carries out operations to obtain a scrambling code number and correlation value. The manner of operations is the same as that of FIG. 18.

The detector of scrambling code and received timing 240 selects a maximum correlation value and a corresponding code number from the values respectively output from the scrambling code identification circuits 210.1. According to the maximum correlation value, an optimum received timing of scrambling code is selected among the received timing candidates respectively output from the scrambling code correlation detectors 230.1-230.$m$. The selected scrambling code number and scrambling code received timing are transferred to the demodulation circuit 300.

Demodulation operation to the received multicarrier signal carried out in the demodulation circuit 300 is identical with that explained referring to FIG. 12 herein-before.

Figure 26:
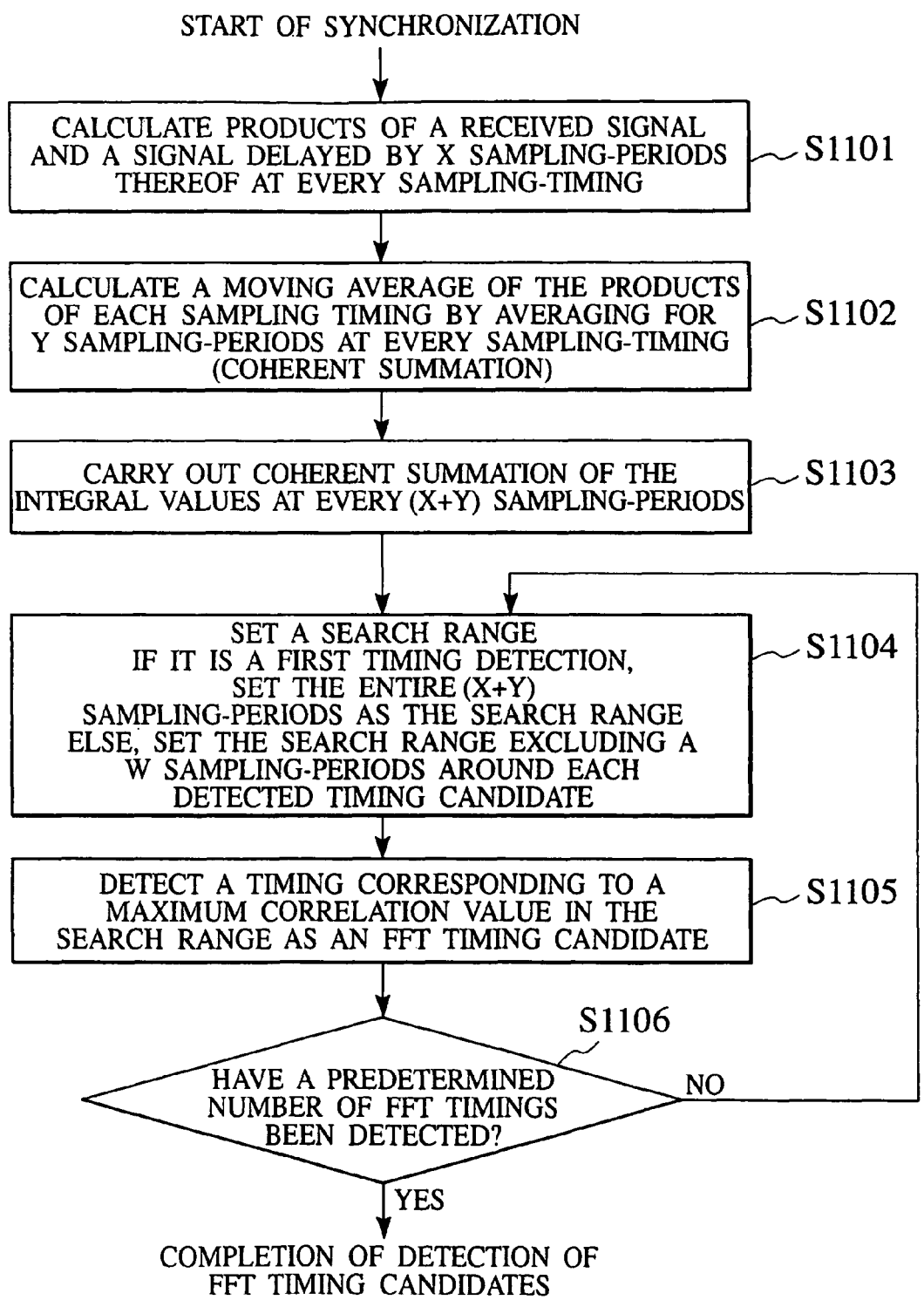
FIG. 26 is a flowchart showing a processing method for detecting FFT timing candidates from a received multicarrier signal carried out by the eighth embodiment of the receiver.

FIG. 26 is a flowchart showing a receiving method for MC-CDMA transmission carried out by the receiver 20.6 shown in FIG. 25. Step S1101 multiplies, at every sampling timing, a received signal before FFT containing all subcarriers by a delayed signal of the received signal by one symbol length (X sampling periods), to provide products. Step S1102 calculates moving averages of the products in each averaging period that starts from a sampling timing and is equal to Y sampling periods, to provide a sequence of correlation values. Step S1103 carries out coherent summation to the sequence of correlation values for every (X+Y) sampling periods and provides a sequence of correlation values of (X+Y) sampling periods. These operation steps are equivalent with those of steps S1002 to S1003 in FIG. 22.

Figure 27:
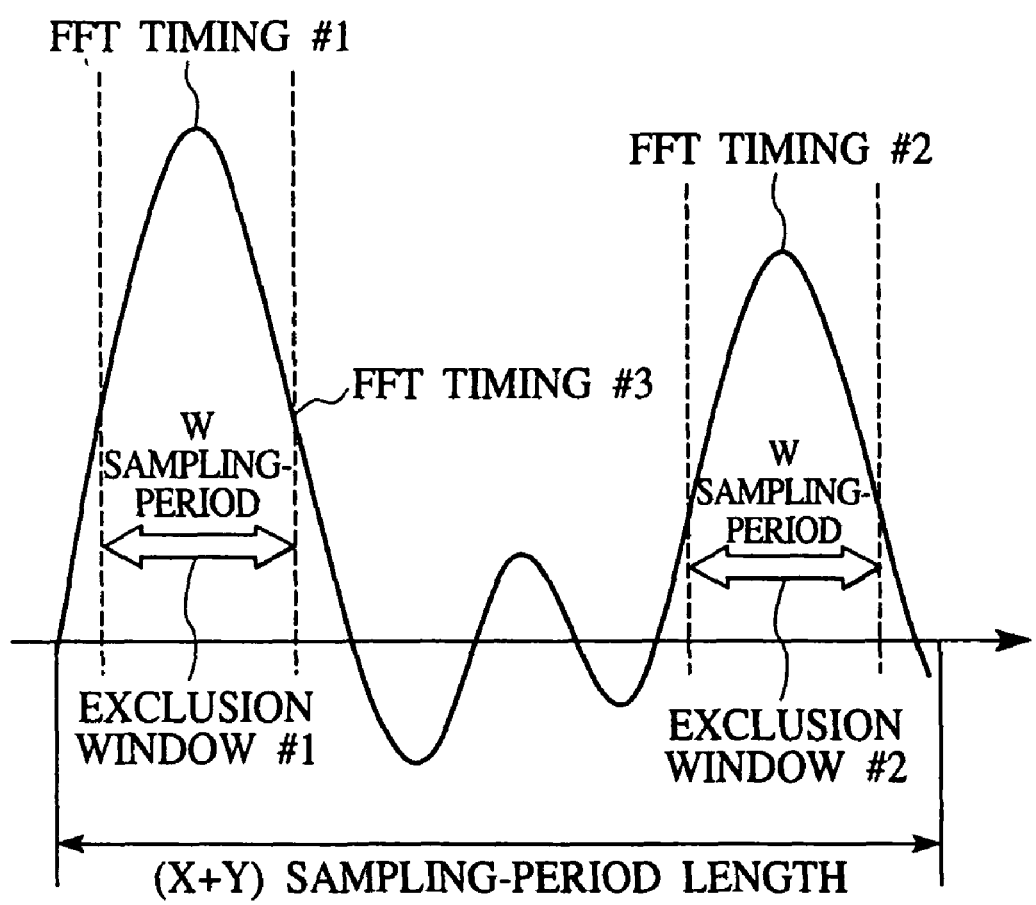
FIG. 27 is an explanatory view showing exclusion windows and FFT timing candidates according to the eighth embodiment.

Subsequently, steps S1104 to S1106 detect a plurality of FFT timing candidates according to the sequence of correlation values for (X+Y) sampling periods as shown in FIG. 24. FIG. 27 shows three FFT timing candidates detected by the FFT timing detector 250.2 of FIG. 25 as set forth hereinafter. A timing corresponding to a maximum correlation value in the sequence of correlation values for (X+Y) sampling periods is defined as an FFT timing candidate #1. A window of W sampling periods is set around the FFT timing candidate #1 as an exclusion window #1, which is excluded from a search range of the next FFT timing candidate for (X+Y) sampling periods to set a new search range of (X+Y−W). In the search range (X+Y−W), a timing corresponding to a maximum correlation value among the remaining correlation values is defined as an FFT timing candidate #2. Similarly, another window of W sampling periods is set around the FFT timing candidate #2 as an exclusion window #2. This exclusion window #2 is also excluded from the search range, to detect a next FFT timing candidate #3.

Figure 28:
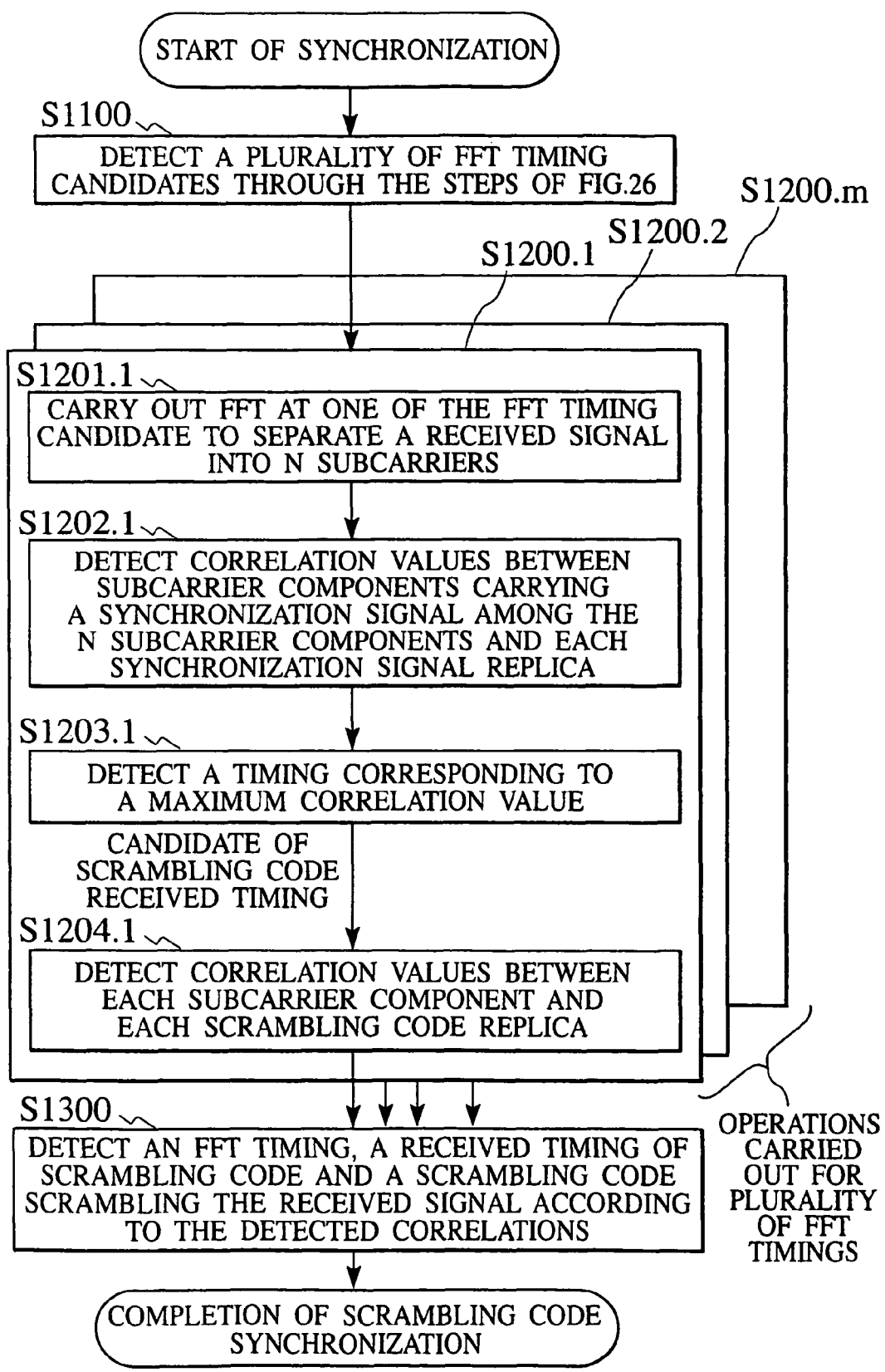
FIG. 28 is a flowchart showing a processing method for a received multicarrier signal carried out by the seventh embodiment of the receiver.

Subsequently, as shown in a flowchart of FIG. 28, a scrambling code identification operation by using the detected m FFT timing candidates is carried out. In FIG. 28, the number of received timing candidates of scrambling code to be detected is equivalent with the number of FFT window timing candidates. Step S1100 detects plural m FFT timing candidates. This step S1100 corresponds to the whole operations shown in FIG. 26.

At each of the detected FFT timing candidates, step S1201.1 carries out FFT to separate a received signal into subcarrier components. Step S1202.1 detects a correlation between subcarriers that carries a synchronization signal among the separated N subcarriers and the synchronization signal replica. For each FFT timing candidate, step S1203.1 sets a timing at which a maximum correlation value appears as a candidate of scrambling code received timing. According to this candidate of scrambling code received timing, step S1204.1 detects a correlation value between each subcarrier and each scrambling code replica. Steps S1201.1 to S1205.1 are carried out for every FFT timing candidates detected by the FFT timing detector 250.2 (S1200.1-S1200.$m$).

According to the scrambling code correlation values detected at all FFT timing candidates, step S1300 finds a scrambling code corresponding to a maximum correlation value and the timing thereof and determines a scrambling code that is scrambling the received multicarrier signal, a received timing of scrambling code, and an FFT timing. Namely, step S1300 simultaneously determines the FFT timing, scrambling code received timing, and scrambling code.

This method of detecting plural FFT timing candidates surely detects the most base station even if it involves a small transmission power and even if plural base stations in the mobile communication system involve different transmission powers.

Figure 29:
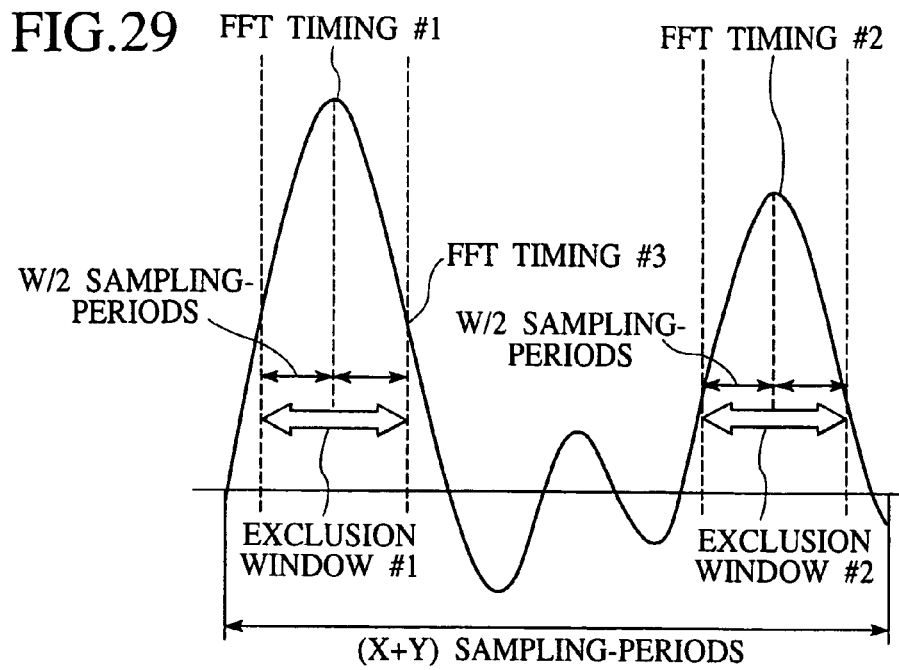
FIG. 29 is an explanatory view showing another exclusion windows and FFT timing candidates according to the eighth embodiment.
Figure 30:
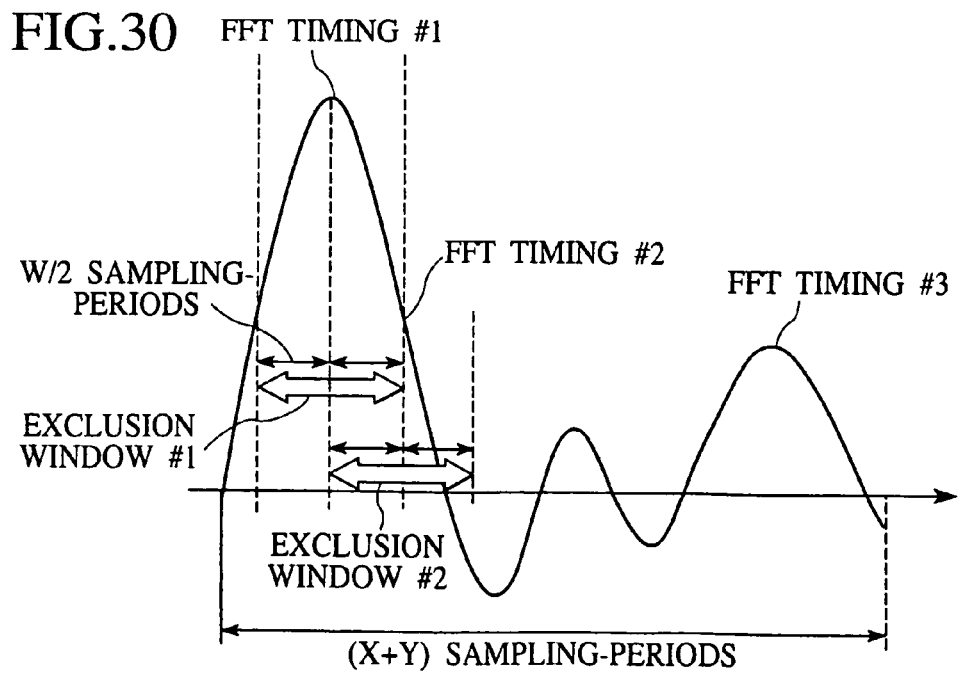
FIG. 30 is an explanatory view showing another exclusion windows and FFT timing candidates according to the eighth embodiment.

There are another methods of detecting plural m FFT timing candidates by the FFT timing detector 250.2 shown in FIG. 25, which are shown by flowcharts of FIGS. 29 and 30. In FIG. 29, exclusion windows #1 and #2 are separated from each other. An FFT timing candidate #1 is detected at first. A window of W/2 sampling periods is set before and behind the FFT timing 1. Namely, a window of W sampling periods is set around the FFT timing candidate #1, to define the exclusion window #1. The exclusion window #1 is excluded to define a new search range of (X+Y−W) sampling periods in which a timing corresponding to a maximum correlation value is detected as an FFT timing candidate #2. Similarly, an another window of W sampling periods is set around the FFT timing candidate #2 as the exclusion window #2 to set a new search range in which an FFT timing candidate #3 is detected.

In FIG. 30, exclusion windows #1 and #2 overlap each other. FFT timing candidates #1 and #2 are detected like the example of FIG. 29. A window of W sampling periods is set around the FFT timing candidate #2 as the exclusion window #2 to define a new search range. Since the exclusion windows #1 and #2 partly overlap each other, the interval to be excluded in FIG. 30 is smaller than 2W sampling periods.

Figure 31:
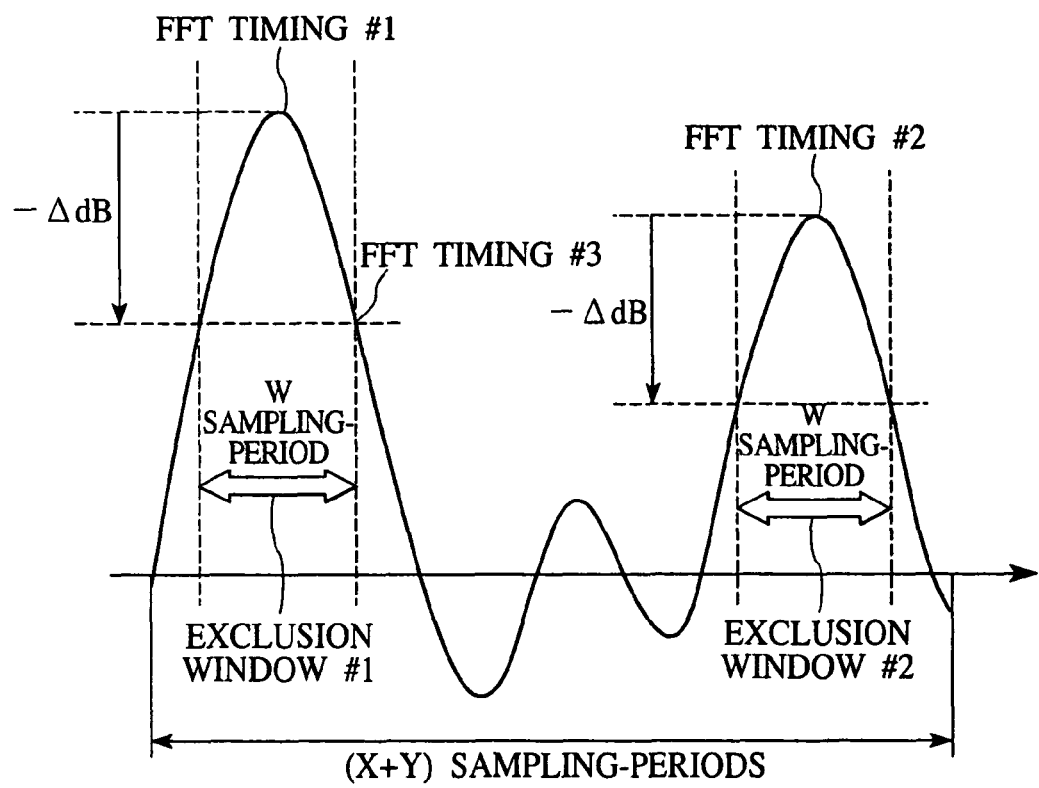
FIG. 31 is an explanatory view showing another exclusion windows and FFT timing candidates according to the eighth embodiment.

FIG. 31 shows an another detection method of plural FFT timing candidates. This method detects three FFT timing candidates (m=3). After detecting an FFT timing candidate #1, a window of W sampling periods is extended from the FFT timing candidate #1 up to two points each being ΔdB smaller than the correlation value of the FFT timing candidate #1. The window of W sampling periods serves as an exclusion window #1 to define a new search range of (X+Y−W) sampling periods in which a maximum correlation value is detected to determine an FFT timing candidate #2. Similarly, an another window of W sampling periods is extended from the FFT timing candidate #2 up to two points each being ΔdB smaller than the correlation value of the FFT timing candidate #2. The window of W' sampling periods serves as an exclusion window #2 to define a new search range in which an FFT timing candidate #3 is detected.

Figure 32:
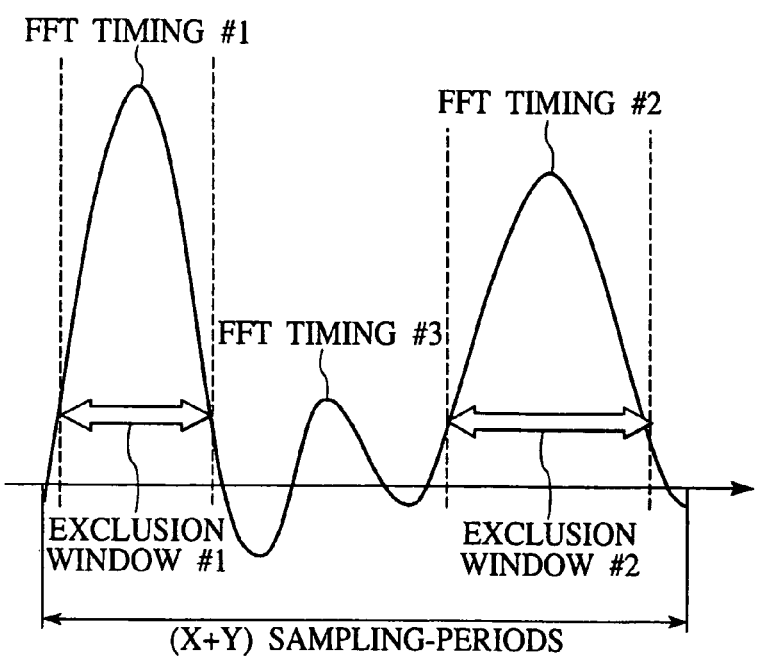
FIG. 32 is an explanatory view showing another exclusion windows and FFT timing candidates according to the eighth embodiment.

FIG. 32 shows another detection methods of plural FFT timing candidates. This method also detects three FFT timing candidates (m=3). In FIG. 32, widths of exclusion windows change each other according to the inclination of a sequence of correlation values around each FFT timing candidate. If the inclination is steep, the exclusion window is narrowed, and if the inclination is gentle, the exclusion window is widened. Namely, if the peak width of an FFT timing candidate is narrow, a narrow exclusion window #1 is defined, and if the peak width is wide, a wide exclusion window #2 is defined.

Figure 33:
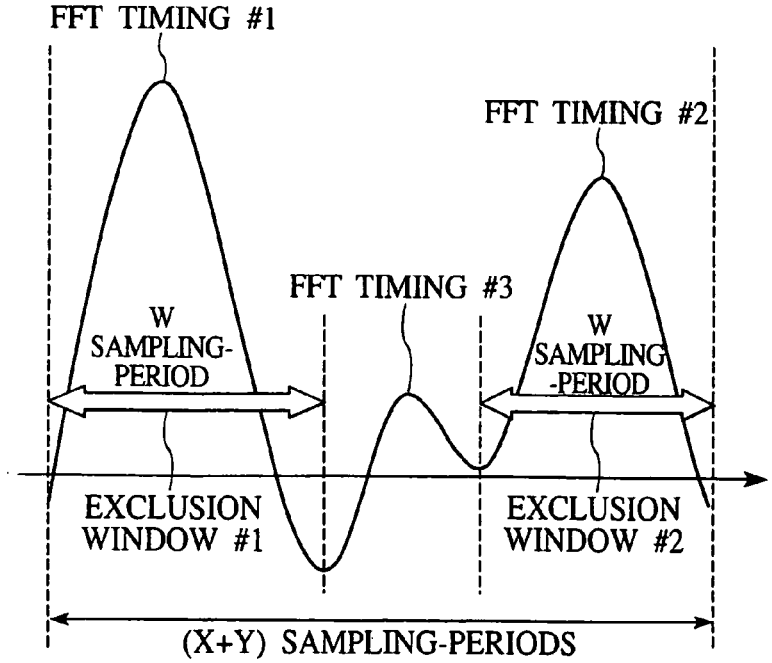
FIG. 33 is an explanatory view showing another exclusion windows and FFT timing candidates according to the eighth embodiment.

FIG. 33 also shows another detection method of plural FFT timing candidates. This method continuously extends an exclusion window from a detected FFT timing (a correlation peak) along a sequence of correlation values as long as the sequence of correlation values decreases. More precisely, an FFT timing candidate #1 is first detected on a sequence of correlation values, and a window of W sampling periods is extended from the FFT timing candidate #1 along the sequence of correlation values as long as the sequence of correlation values decreases. The extended window of W sampling periods serves as an exclusion window #1 to define a new search range of (X+Y−W) sampling periods. In the search range (X+Y−W) sampling periods, a timing corresponding to a maximum correlation value is detected as an FFT timing candidate #2. Similarly, another window of W' sampling periods is extended from the FFT timing candidate #2 as long as the sequence of correlation values decreases. The extended window of W' sampling periods serves as an exclusion window #2 to define a new search range in which an FFT timing candidate #3 is detected.

These methods of FIGS. 32 and 33 are capable of properly setting the exclusion windows even if correlation peaks overlap each other or even if a peak width is changed due to the influence of multipaths.

Figure 34:
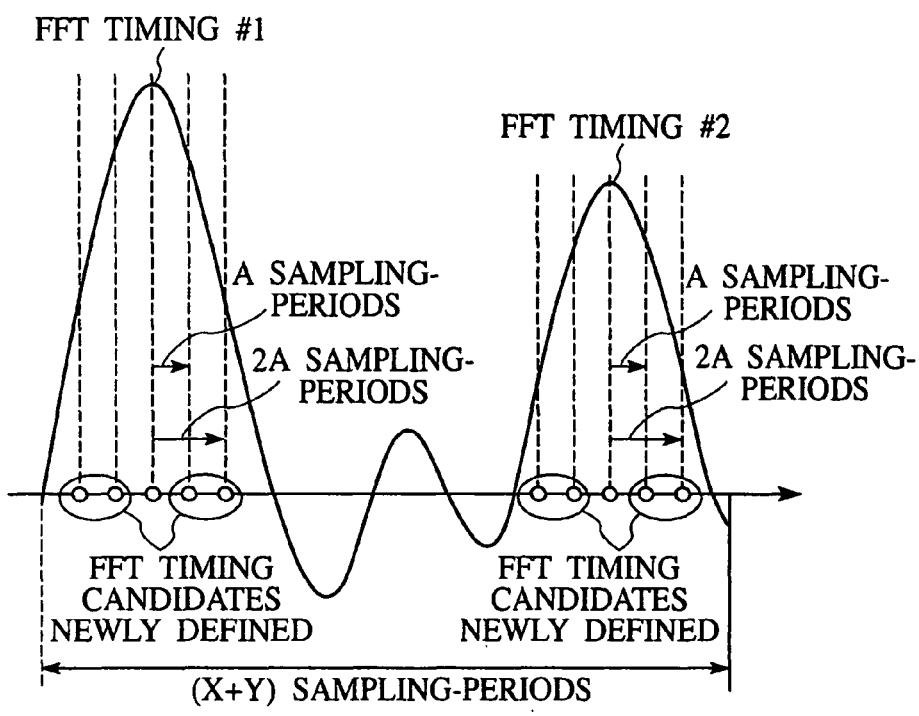
FIG. 34 is an explanatory view showing another exclusion windows and FFT timing candidates according to the eighth embodiment.

FIG. 34 shows an another method of plural FFT timing candidates. This method detects two FFT timing candidates according to any one of the methods of FIGS. 27 to 33, and then, newly defines eight FFT timing candidates. More precisely, FFT timing candidates #1 and #2 are detected according to any one of the methods of FIGS. 27 to 33. ±A sampling periods and (2A sampling periods are set around the FFT timing candidates #1 and #2, to define new FFT timing candidates.

Figure 35:
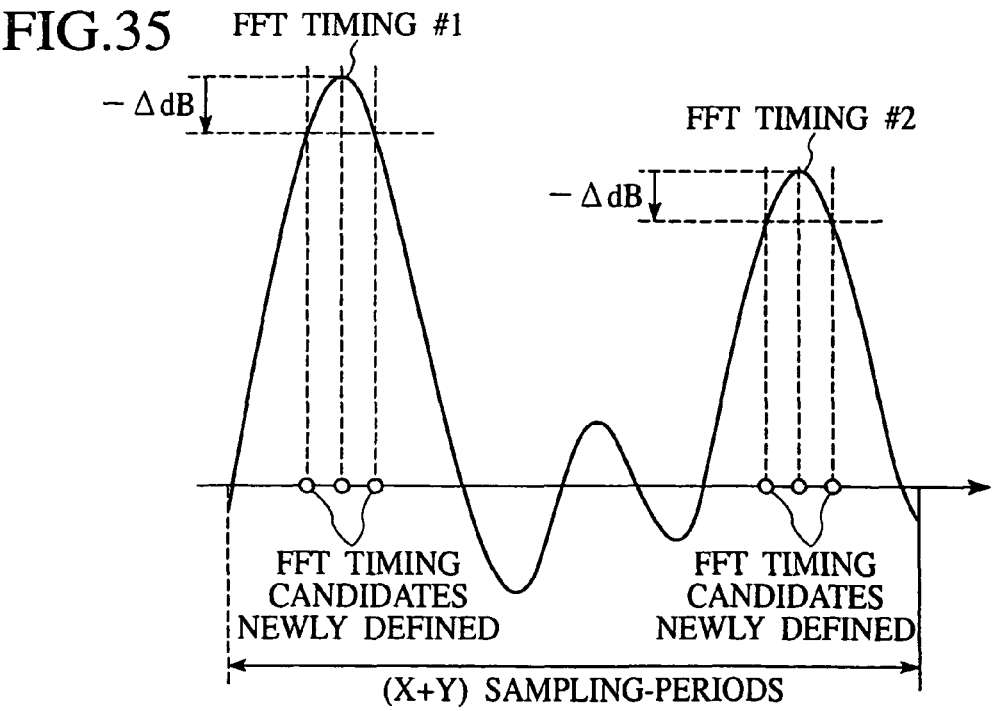
FIG. 35 is an explanatory view showing another exclusion windows and FFT timing candidates according to the eighth embodiment.

FIG. 35 shows an another method of plural FFT timing candidates. This method detects two FFT timing candidates #1 and #2 according to any one of the methods of FIGS. 27 to 33, and then, four additional FFT timing candidates are set. Each of the additional FFT timing candidates is defined as each correlation value thereof to be smaller by (dB than a corresponding one of the correlation values of the FFT timing candidates #1 and #2.

These method of FIGS. 34 and 35 are capable of detecting a correct FFT timing even if a detected timing is greatly shifted from an ideal timing due to overlapping correlation peaks or due to the influence of noise and interference.

Incidentally, after determination of plural m FFT timing candidates by any one of the methods of FIGS. 29 to 35, operations for detecting a scrambling code number and a received timing of scrambling code by using the plural FFT timing candidates are carried out by steps S1200 and S1300 in FIG. 28.

Figure 36:
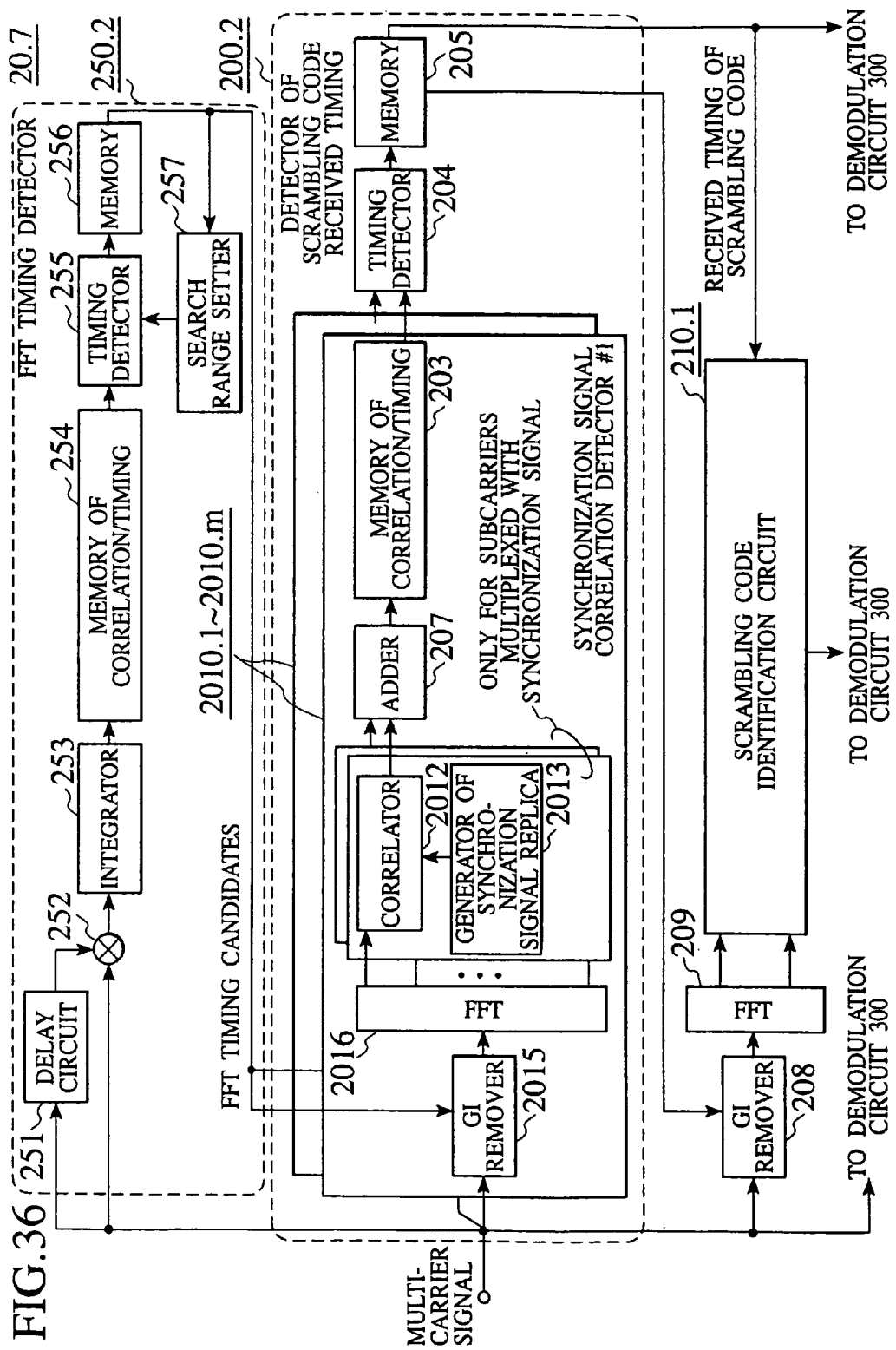
FIG. 36 is a block diagram of a ninth embodiment of a receiver for a mobile communication system of MC-CDMA according to the present invention.

Referring to FIG. 36, a receiver for an MC-CDMA transmission system as an ninth embodiment of the present invention will be explained. The receiver 20.7 comprises an antenna for wireless multicarrier signal 199 (not shown in FIG. 36 but identical with that of FIG. 10), an FFT timing detector 250.2, a detector of scrambling code received timing 200.2, a GI remover 208, an FFT unit 209, a scrambling code identification circuit 210.1 and a demodulation circuit 300. The FFT timing detector 250.2 is identical with that of FIG. 25. The detector of scrambling code received timing 200.2, the GI remover 208, the FFT unit and the scrambling code identification circuit 210.1 are identical with those of FIG. 14. The demodulation circuit 300 is identical with that of FIG. 12.

A multicarrier signal received by the antenna 199 is input to the FFT timing detector 250.2. The FFT timing detector 250.2 detects plural m FFT timing candidates from the received multicarrier signal by the same operations as those of FIG. 25.

The detector of scrambling code received timing 200.2 comprises a GI remover 2015, an FFT unit 2016, m synchronization signal correlation detectors 2010.1-2010.m, a timing detector 204 and memory 205 as those of FIG. 14. This detector of scrambling code received timing 200.2 inputs the receive multicarrier to the respective synchronization signal correlation detectors 2010.1-2010.m. The FFT timing detector 250.2 sets plural m FFT timing candidates to the synchronization signal correlation detectors 2010.1-2010.m, respectively.

In each synchronization signal correlation detector 2010.x, the GI remover 2015 removes guard intervals (GIs) from the multicarrier signal according to the set FFT timing candidate from the FFT timing detector 250.2. The GI-free multicarrier signal is supplied to the FFT unit 2016, which separates the signal into N subcarrier components. Each of subcarriers carrying synchronization signal thereon is input to each of multiple correlators 2012. Each of generators of synchronization signal replica 2013 generates a synchronization signal replica and input to the correlator 2012. Each correlator 2012 detects a correlation value and a corresponding timing of the synchronization signal and output the detected correlation value into an adder 207. The adder 207 adds up all of the detected correlation values from respective correlators 2012 in the same synchronization signal correlation detector 2010.x. A correlation/timing memory 203 stores the sum from the adder 207 and the corresponding timing.

A timing detector 204 detects a maximum correlation value and a corresponding timing among the correlation values, each of them is stored in each correlation/timing memory 203 of the synchronization signal correlation detectors 2010.1-2010.m. The detected timing is stored as a scrambling code received timing in a memory 205. According to the scrambling code received timing, a final FFT timing is calculated and also stored in the memory 205.

After the detection of the scrambling code received timing by the detector of scrambling code received timing 200.2, the memory 205 provides the FFT timing to the GI remover 208. By the same operations as explained referring to FIG. 11, the GI remover 208 removes guard intervals (GIs) from the received multicarrier signal, an FFT unit 209 carries out FFT operation to the GI-free multicarrier signal and an scrambling code identification circuit 210.1 identifies a scrambling code number. In addition, a demodulation circuit 300 demodulates the received multicarrier signal into an original data sequence by the same operations as explained referring to FIG. 12.

Figure 37:
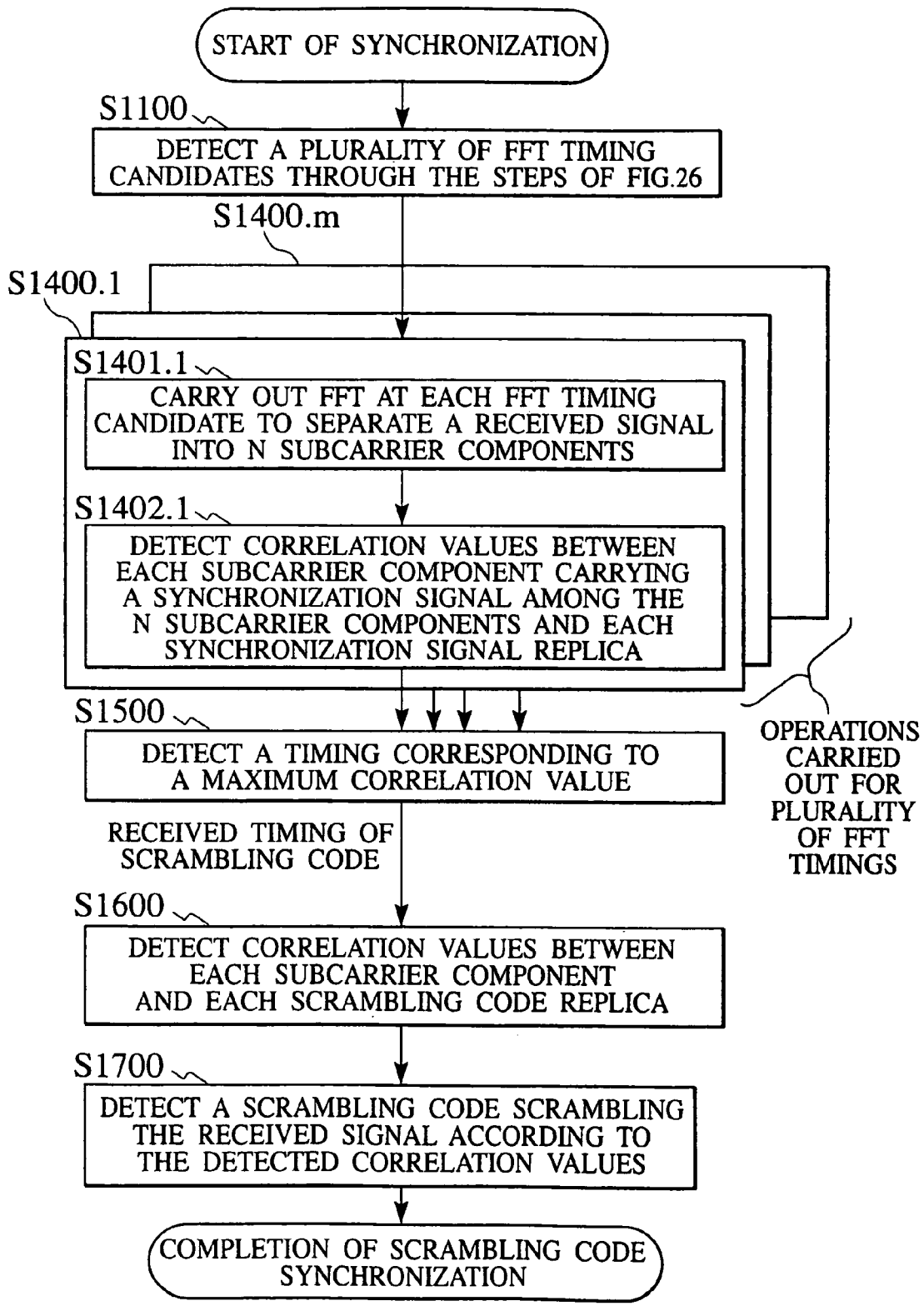
FIG. 37 is a flowchart showing a processing method for a received multicarrier signal carried out by the seventh embodiment of the receiver.

A detection method of scrambling code number and timing carried out by the receiver 20.7 is shown as a flowchart of FIG. 37. Firstly, step S1100 detects plural m FFT timing candidates from the received multicarrier signal by the FFT timing detector 250.2. The precise operation of the FFT timing candidates detection is the same as that of FIG. 26. Still, any one of the detection methods of plural FFT timing candidates shown in FIGS. 27 to 35 is usable.

Subsequently, as shown in the flowchart of FIG. 37, a scrambling code identification operation by using the detected m FFT timing candidates is carried out. Step S1401.1 carries out FFT to separate a received signal into subcarrier components. Step S1402.1 detects a correlation between subcarriers that carries a synchronization signal among the separated N subcarrier components and a synchronization signal replica. For each FFT timing candidate, these steps S1401.1 and S1402.1 are carried out (S1400.1 to S1400.m).

Thereafter, step S1500 finds a scrambling code received timing corresponding to a maximum correlation value. According to the detected received timing of scrambling code, step 1600 detects correlation values between respective scrambling code replicas and the GI-free subcarriers after FFT. Step 1700 determines a scrambling code that is scrambling the received multicarrier signal corresponding to a maximum correlation value of scrambling code. In this method of FIG. 37, the FFT timing and the received timing of scrambling code are detected on step S1500, which is before the determination of the scrambling code itself.

This method of detecting plural FFT timing candidates also surely detects the most suitable base station even if it involves a small transmission power and even if plural base stations in the mobile communication system involve different transmission powers.

Figure 38:
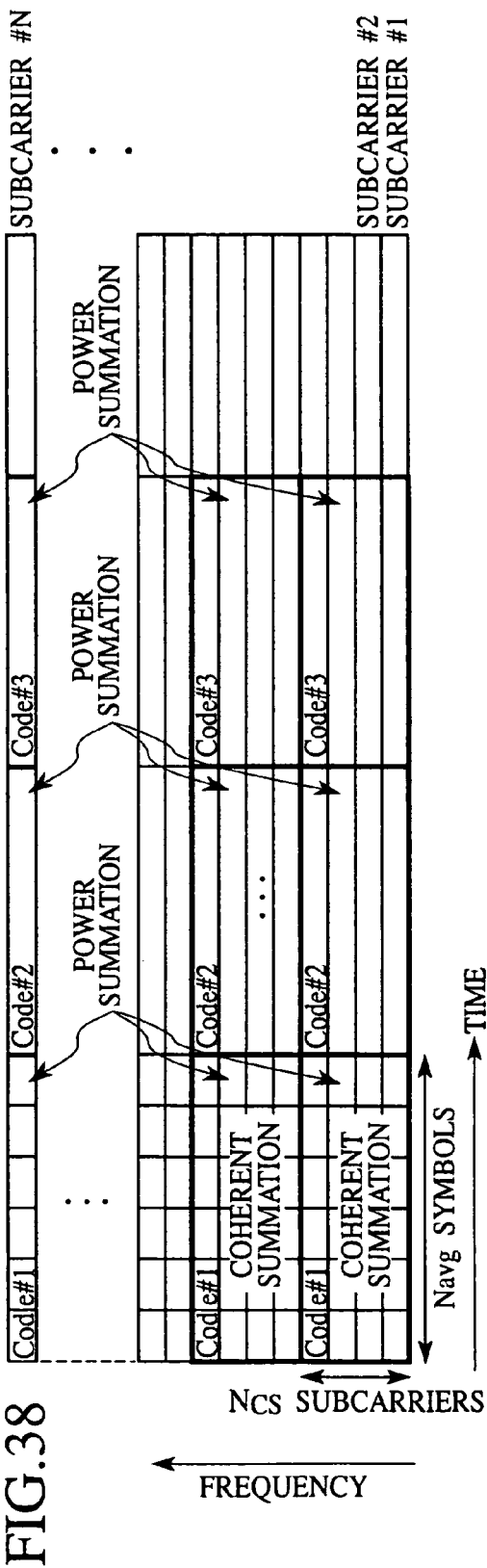
FIG. 38 is an explanatory view showing a correlation detection method of a long code carried out by a receiver according to the present invention.

Hereinafter, a correlation detecting method of scramble code will be explained. It is assumed that the number of subcarriers is N of #1 to #N. An example shown in FIG. 38 is a case of Navg=6, Ncs=4, and Nps=N/Ncs. A coherent summation of each correlation value of the symbol is carried out for every subcarrier during an interval of Navg symbols along a time axis, to provide a coherent sum for each subcarrier. Further, a coherent summation of the coherent sum of each subcarrier is carried out for Ncs subcarriers, to provide a coherent sum of every Ncs subcarriers. Subsequently, a power summation to Nps summed value of every Ncs subcarriers is carried out along a frequency axis, to provide a correlation value of each scrambling code.

In case that Nps=N/Ncs as this example, N subcarriers by Navg symbols are used to detect a correlation value of each scrambling code.

Figure 39:
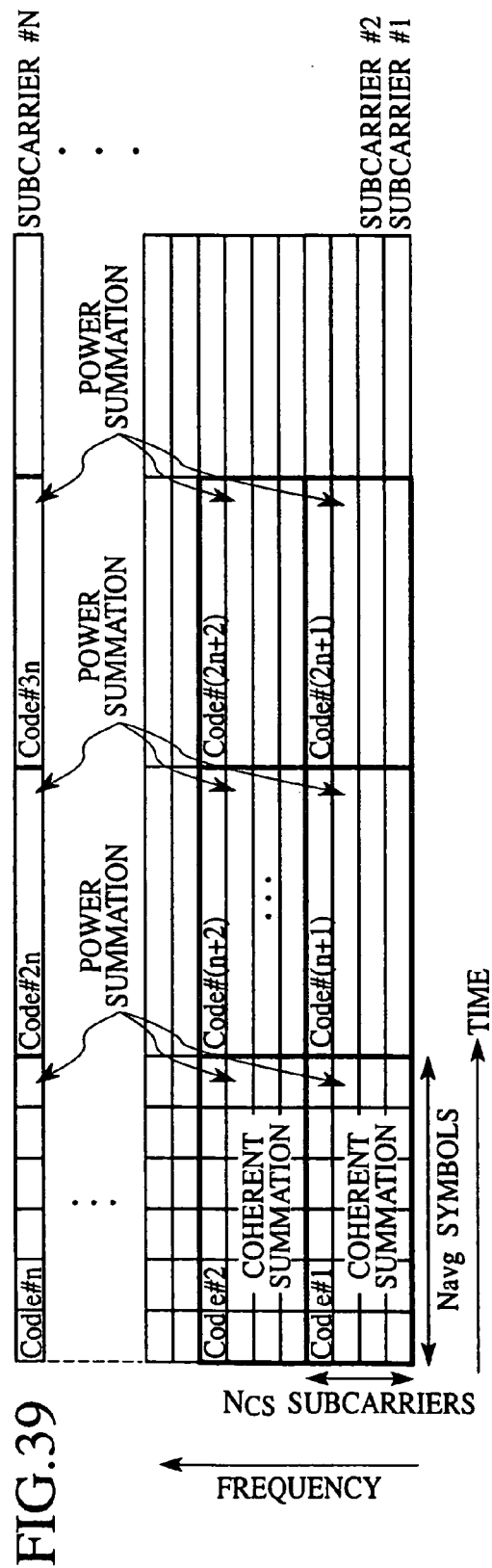
FIG. 39 is an explanatory view showing another correlation detection method of a long code carried out by a receiver according to the present invention.

A second example shown in FIG. 39 is a case of Navg=6, Ncs=4, and Nps=1. In this case, since Nps=1, a summed value of Ncs subcarriers represent a correlation value of each scrambling code, and N subcarriers by Navg symbols are used to detect N/Ncs correlation values of N/Ncs respective scrambling codes.

Figure 40:
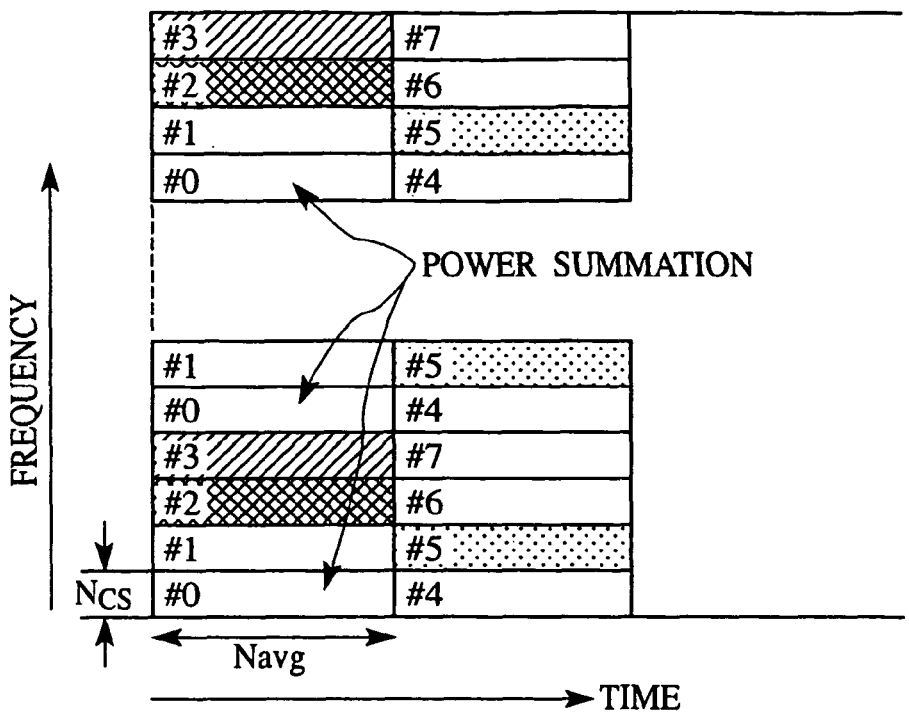
FIG. 40 is an explanatory view showing another correlation detection method of a long code carried out by a receiver according to the present invention.

A third example shown in FIG. 40 is a case of Nps=(N/Ncs)/4. Four correlation values of scrambling codes ((N/Ncs)/Nps=4) are alternately detected at every Ncs subcarriers interval. Nps sets of summed value calculated at every Ncs subcarriers interval are power-summed along a frequency axis for every scrambling code, to provide a correlation value of each scrambling code.

In this example, since Nps=(Nc/Ncs)/4, N subcarriers by Navg symbols are used to detect four correlations values of four respective scrambling codes.

Figure 41:
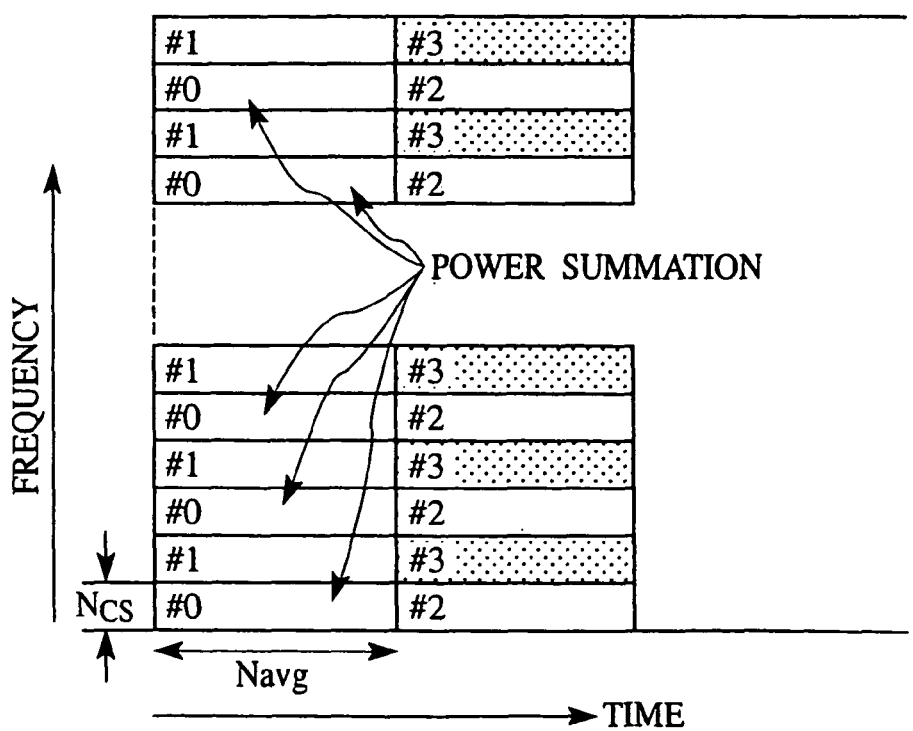
FIG. 41 is an explanatory view showing another correlation detection method of a long code carried out by a receiver according to the present invention.

FIG. 41 is another example of Nps=(N/Ncs)/2 case. In this case, N subcarriers by Navg symbols are used to detect two correlation values of two respective scrambling codes.

As explained above, the present invention realizes high-speed, precise scrambling code synchronization for multicarrier CDMA.

Further, the present invention enables a multicarrier CDMA mobile communication system to select a symbol received timing related to an optimum cell (base station) from among a plurality of candidates even if the communication system involves a plurality of cells having different transmission powers.

What is claimed is:

1. A transmitter of multicarrier signal for a mobile communication system, comprising:
a data channel generator configured to multiply a plurality of transmission data sequences by a plurality of short codes;
a long code multiplier configured to multiply the plurality of transmission data sequences multiplied by the plurality of the short codes by a common long code;
a synchronization signal generator configured to multiply a transmission data sequence for synchronization signal only by a spreading code for synchronization signal; and
a transmitter configured to transmit, using a plurality of subcarriers, the transmission data sequences doubly multiplied by the short code and the long code, and configured to transmit the synchronization signal multiplied only by the spreading code for synchronization signal,
wherein the synchronization signal generator multiplies the synchronization signal by the spreading code for synchronization signal at plural timings in each iteration period of the long code, and the transmitter transmits the synchronization signal multiplied only by the spreading code for synchronization signal at plural timings in each iteration period of the long code.

2. A multicarrier signal transmission method for a mobile communication system, comprising:
transmitting, by using a plurality of subcarriers, a data sequence doubly multiplied by a short code and a long code; and
transmitting, using one of the plurality of subcarriers, a synchronization signal multiplied only by a spreading code for synchronization signals at plural timings in each iteration period of the long code,
wherein the synchronization signal is transmitted at plural times in each iteration period of the long code.

3. The method as in claim 2, wherein a pattern of the spreading code for synchronization signal applied to the synchronization signal indicates a received timing of the long code.

4. The method as in claim 2, wherein a transmitted timing of the synchronization signal indicates a received timing of the long code.

5. The method as in claim 2, wherein a transmitted timing of the synchronization signal and a subcarrier in which the synchronization signal is transmitted indicate a received timing of the long code.

* * * * *